US012634435B2

(12) United States Patent
Deng et al.

(10) Patent No.: US 12,634,435 B2
(45) Date of Patent: May 19, 2026

(54) METHOD, APPARATUS, AND MEDIUM FOR VIDEO PROCESSING

(71) Applicants: Beijing Bytedance Network Technology Co., Ltd., Beijing (CN); Bytedance Inc., Los Angeles, CA (US)

(72) Inventors: Zhipin Deng, Beijing (CN); Kai Zhang, Los Angeles, CA (US); Li Zhang, Los Angeles, CA (US)

(73) Assignees: BEIJING BYTEDANCE NETWORK TECHNOLOGY CO., LTD., Beijing (CN); BYTEDANCE INC., Los Angeles, CA (US)

( * ) Notice: Subject to any disclaimer, the term of this patent is extended or adjusted under 35 U.S.C. 154(b) by 46 days.

(21) Appl. No.: 18/407,165

(22) Filed: Jan. 8, 2024

(65) Prior Publication Data

US 2024/0146907 A1     May 2, 2024

Related U.S. Application Data

(63) Continuation of application No. PCT/CN2022/104448, filed on Jul. 7, 2022.

(30) Foreign Application Priority Data

Jul. 9, 2021    (WO) ................ PCT/CN2021/105524

(51) Int. Cl.
*H04N 19/105* (2014.01)
*H04N 19/119* (2014.01)
(Continued)

(52) U.S. Cl.
CPC ......... *H04N 19/105* (2014.11); *H04N 19/119* (2014.11); *H04N 19/159* (2014.11); *H04N 19/196* (2014.11)

(58) Field of Classification Search
None
See application file for complete search history.

(56) References Cited

U.S. PATENT DOCUMENTS

2008/0187044 A1* 8/2008 Kim ..................... H04N 19/593
                                                        375/E7.125
2013/0083853 A1* 4/2013 Coban .................... H04N 19/51
                                                        375/E7.243
(Continued)

FOREIGN PATENT DOCUMENTS

CN          102223532 A        10/2011
CN          112544082 A        3/2021
(Continued)

OTHER PUBLICATIONS

International Search Report and Written Opinion in PCT/CN2022/104448, mailed Sep. 26, 2022, 7 pages.
(Continued)

*Primary Examiner* — Talha M Nawaz
(74) *Attorney, Agent, or Firm* — Astute IP Law Group

(57) ABSTRACT

Embodiments of the present disclosure provide a method for video processing. The method comprises: determining, during a conversion between a current video block of a video and a bitstream of the video, a geometric partition mode (GPM) partition index for the current video block, the GPM partition index being absent from the bitstream; and performing the conversion based on the GPM partition index. Compared with conventional solutions, the proposed method can advantageously reduce the coding bits while maintaining the coding quality.

11 Claims, 30 Drawing Sheets

(51) Int. Cl.
 *H04N 19/159* (2014.01)
 *H04N 19/196* (2014.01)

(56) References Cited

U.S. PATENT DOCUMENTS

| | | | | |
|---|---|---|---|---|
| 2021/0058617 | A1* | 2/2021 | Reuze | H04N 19/70 |
| 2021/0084309 | A1* | 3/2021 | Zhao | H04N 19/186 |
| 2021/0144374 | A1* | 5/2021 | Esenlik | H04N 19/119 |
| 2021/0144392 | A1* | 5/2021 | Zhang | H04N 19/107 |
| 2021/0195200 | A1 | 6/2021 | Chen et al. | |
| 2022/0060692 | A1* | 2/2022 | Zhang | H04N 19/517 |
| 2022/0086460 | A1* | 3/2022 | Bossen | H04N 19/463 |
| 2022/0103833 | A1 | 3/2022 | Blasi et al. | |
| 2022/0174270 | A1 | 6/2022 | Li et al. | |
| 2022/0312003 | A1 | 9/2022 | Lee et al. | |
| 2022/0385922 | A1 | 12/2022 | Galpin et al. | |
| 2022/0408082 | A1* | 12/2022 | Bordes | H04N 19/70 |
| 2023/0015638 | A1 | 1/2023 | Lee et al. | |
| 2024/0080442 | A1* | 3/2024 | Zhang | H04N 19/46 |

FOREIGN PATENT DOCUMENTS

| | | |
|---|---|---|
| CN | 112840654 A | 5/2021 |
| WO | 2021054805 A1 | 3/2021 |
| WO | 2021129694 A1 | 7/2021 |

OTHER PUBLICATIONS

International Search Report and Written Opinion in PCT/CN2022/101685, mailed Sep. 27, 2022, 9 pages.
Chang et al., "Multiple Reference Line Coding for Most Probable Modes in Intra Prediction", 2019 Data Compression Conference (DCC), 2019, 1 page.
Non-Final Office Action for U.S. Appl. No. 18/535,903, mailed on Apr. 18, 2025, 15 pages.

* cited by examiner

400

0 : Planar
1 : DC

708

1100

1200

1500

4×4 block

6×6 surrounding region samples & gradients padding 1610 prediction samples in the extended area 1620 prediction samples within the CU

1600

List-1 reference picture

MVD1

Current picture

List-0 reference picture

MVD0

1900

2000

2300

2302

DETERMINE A GPM PARTITION INDEX FOR THE CURRENT VIDEO BLOCK, THE GPM PARTITION INDEX BEING ABSENT FROM THE BITSTREAM

2304

PERFORM THE CONVERSION BASED ON THE GPM PARTITION INDEX

2400

2402

DETERMINE MODE INFORMATION OF A TARGET PART OF THE
CURRENT VIDEO BLOCK

2404

PERFORM THE CONVERSION BASED ON THE MODE INFORMATION
AND A HYBRID PREDICTION TOOL

2600

2602

DETERMINE A TEMPLATE CONTAINING A SET OF SAMPLES OUTSIDE A BOUNDARY OF A PICTURE OF THE VIDEO

2604

PERFORM THE CONVERSION BASED ON THE DETERMINED TEMPLATE

METHOD, APPARATUS, AND MEDIUM FOR VIDEO PROCESSING

CROSS-REFERENCE TO RELATED APPLICATIONS

This application is a continuation of International Application No. PCT/CN2022/104448, filed on Jul. 7, 2022, which claims the benefit of International Application No. PCT/CN2021/105524 filed on Jul. 9, 2021. The entire contents of these applications are hereby incorporated by reference in their entireties.

FIELD

Embodiments of the present disclosure relates generally to video coding techniques, and more particularly, to signaling of geometric partition mode (GPM) partition mode, signaling of intra or inter data for a multiple hypothesis video unit, and a rule for a case that a template contains at least one sample outside the picture boundary.

BACKGROUND

In nowadays, digital video capabilities are being applied in various aspects of peoples' lives. Multiple types of video compression technologies, such as MPEG-2, MPEG-4, ITU-TH.263, ITU-TH.264/MPEG-4 Part 10 Advanced Video Coding (AVC), ITU-TH.265 high efficiency video coding (HEVC) standard, versatile video coding (VVC) standard, have been proposed for video encoding/decoding. However, coding efficiency of conventional video coding techniques is generally expected to be further improved.

SUMMARY

In a first aspect, a method for video processing is proposed. The method comprises: determining, during a conversion between a current video block of a video and a bitstream of the video, a geometric partition mode (GPM) partition index for the current video block, the GPM partition index being absent from the bitstream; and performing the conversion based on the GPM partition index.

Based on the method in accordance with the first aspect of the present disclosure, the GPM partition index can be derived at decoder side and/or encoder side, rather than being indicated in the bitstream. Thereby, the proposed method can advantageously reduce the coding bits while maintaining the coding quality.

In a second aspect, another method for video processing is proposed. The method comprises: determining, during a conversion between a current video block of a video and a bitstream of the video, mode information of a target part of the current video block; and performing the conversion based on the mode information and a hybrid prediction tool, the hybrid prediction tool being used for determining a prediction of the current video block based on a plurality of candidate predictions of the current video block.

The method in accordance with the second aspect of the present disclosure can advantageously improve the coding efficiency and the coding quality.

In a third aspect, another method for video processing is proposed. The method comprises: determining, during a conversion between a current video block of a video and a bitstream of the video, a target prediction for the current video block based on geometric partition mode (GPM) or multiple hypothesis prediction (MHP) by blending an intra prediction for the current video block and a further prediction for the current video block; and performing the conversion based on the target prediction.

The method in accordance with the third aspect of the present disclosure enables the GPM and MHP to determine a final prediction of a block based on an intra prediction and a further prediction of the block. Compared with a conventional solution where GPM and MHP only utilize inter predictions, the proposed method can advantageously improve the coding quality.

In a fourth aspect, another method for video processing is proposed. The method comprises: determining, during a conversion between a current video block of a video and a bitstream of the video, a template containing a set of samples outside a boundary of a picture of the video; and performing the conversion based on the determined template.

The method in accordance with the fourth aspect of the present disclosure enables the utilization of a template at least partially outside the picture boundary, which can advantageously extend the application scenario of template-matching-based method. Moreover, the proposed method can advantageously improve the coding efficiency and the coding quality.

In a fifth aspect, an apparatus for processing video data is proposed. The apparatus comprises a processor and a non-transitory memory with instructions thereon. The instructions upon execution by the processor, cause the processor to perform a method in accordance with the first, second, third or fourth aspect of the present disclosure.

In a sixth aspect, a non-transitory computer-readable storage medium is proposed. The non-transitory computer-readable storage medium stores instructions that cause a processor to perform a method in accordance with the first, second, third or fourth aspect of the present disclosure.

In a seventh aspect, a non-transitory computer-readable recording medium is proposed. The non-transitory computer-readable recording medium stores a bitstream of a video which is generated by a method performed by a video processing apparatus. The method comprises: determining a geometric partition mode (GPM) partition index for a current video block of the video, the GPM partition index being absent from the bitstream; and generating the bitstream based on the GPM partition index.

In an eighth aspect, a method for storing a bitstream of a video is proposed. The method comprises: determining a geometric partition mode (GPM) partition index for a current video block of the video, the GPM partition index being absent from the bitstream; generating the bitstream based on the GPM partition index; and storing the bitstream in a non-transitory computer-readable recording medium.

In a ninth aspect, another non-transitory computer-readable recording medium is proposed. The non-transitory computer-readable recording medium stores a bitstream of a video which is generated by a method performed by a video processing apparatus. The method comprises: determining mode information of a target part of a current video block of the video; and generating the bitstream based on the mode information and a hybrid prediction tool, the hybrid prediction tool being used for determining a prediction of the current video block based on a plurality of candidate predictions of the current video block.

In a tenth aspect, another method for storing a bitstream of a video is proposed. The method comprises: determining mode information of a target part of a current video block of the video; generating the bitstream based on the mode information and a hybrid prediction tool, the hybrid prediction tool being used for determining a prediction of the current video block based on a plurality of candidate predictions of the current video block; and storing the bitstream in a non-transitory computer-readable recording medium.

In an eleventh aspect, another non-transitory computer-readable recording medium is proposed. The non-transitory computer-readable recording medium storing a bitstream of a video which is generated by a method performed by a video processing apparatus. The method comprises: determining a target prediction for a current video block of the video based on geometric partition mode (GPM) or multiple hypothesis prediction (MHP) by blending an intra prediction for the current video block and a further prediction for the current video block; and generating the bitstream based on the target prediction.

In a twelfth aspect, another method for storing a bitstream of a video is proposed. The method comprises: determining a target prediction for a current video block of the video based on geometric partition mode (GPM) or multiple hypothesis prediction (MHP) by blending an intra prediction for the current video block and a further prediction for the current video block; generating the bitstream based on the target prediction; and storing the bitstream in a non-transitory computer-readable recording medium.

In a thirteenth aspect, another non-transitory computer-readable recording medium is proposed. The non-transitory computer-readable recording medium stores a bitstream of a video which is generated by a method performed by a video processing apparatus. The method comprises: determining a template containing a set of samples outside a boundary of a picture of the video; and generating the bitstream based on the determined template.

In a fourteenth aspect, another method for storing a bitstream of a video is proposed. The method comprises: determining a template containing a set of samples outside a boundary of a picture of the video; generating the bitstream based on the determined template; and storing the bitstream in a non-transitory computer-readable recording medium.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

Through the following detailed description with reference to the accompanying drawings, the above and other objectives, features, and advantages of example embodiments of the present disclosure will become more apparent. In the example embodiments of the present disclosure, the same reference numerals usually refer to the same components.

Throughout the drawings, the same or similar reference numerals usually refer to the same or similar elements.

DETAILED DESCRIPTION

Principle of the present disclosure will now be described with reference to some embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an example embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

Example Environment

Figure 1:
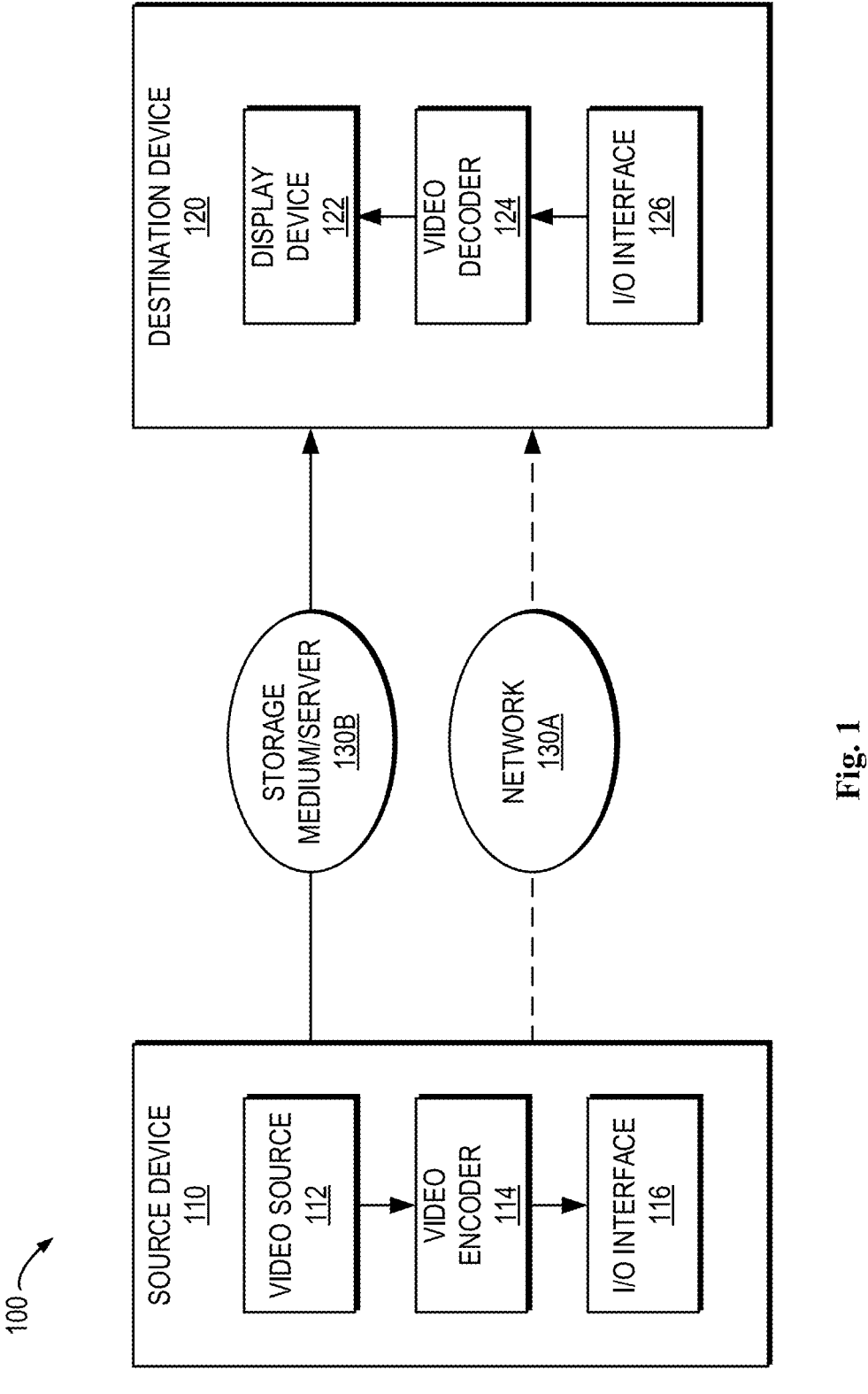
FIG. 1 illustrates a block diagram of an example video coding system in accordance with some embodiments of the present disclosure.

FIG. 1 is a block diagram that illustrates an example video coding system 100 that may utilize the techniques of this disclosure. As shown, the video coding system 100 may include a source device 110 and a destination device 120. The source device 110 can be also referred to as a video encoding device, and the destination device 120 can be also referred to as a video decoding device. In operation, the source device 110 can be configured to generate encoded video data and the destination device 120 can be configured to decode the encoded video data generated by the source device 110. The source device 110 may include a video source 112, a video encoder 114, and an input/output (I/O) interface 116.

The video source 112 may include a source such as a video capture device. Examples of the video capture device include, but are not limited to, an interface to receive video data from a video content provider, a computer graphics system for generating video data, and/or a combination thereof.

The video data may comprise one or more pictures. The video encoder 114 encodes the video data from the video source 112 to generate a bitstream. The bitstream may include a sequence of bits that form a coded representation of the video data. The bitstream may include coded pictures and associated data. The coded picture is a coded representation of a picture. The associated data may include sequence parameter sets, picture parameter sets, and other syntax structures. The I/O interface 116 may include a modulator/demodulator and/or a transmitter. The encoded video data may be transmitted directly to destination device 120 via the I/O interface 116 through the network 130A. The encoded video data may also be stored onto a storage medium/server 130B for access by destination device 120.

The destination device 120 may include an I/O interface 126, a video decoder 124, and a display device 122. The I/O interface 126 may include a receiver and/or a modem. The I/O interface 126 may acquire encoded video data from the source device 110 or the storage medium/server 130B. The video decoder 124 may decode the encoded video data. The display device 122 may display the decoded video data to a user. The display device 122 may be integrated with the destination device 120, or may be external to the destination device 120 which is configured to interface with an external display device.

The video encoder 114 and the video decoder 124 may operate according to a video compression standard, such as the High Efficiency Video Coding (HEVC) standard, Versatile Video Coding (VVC) standard and other current and/or further standards.

Figure 2:
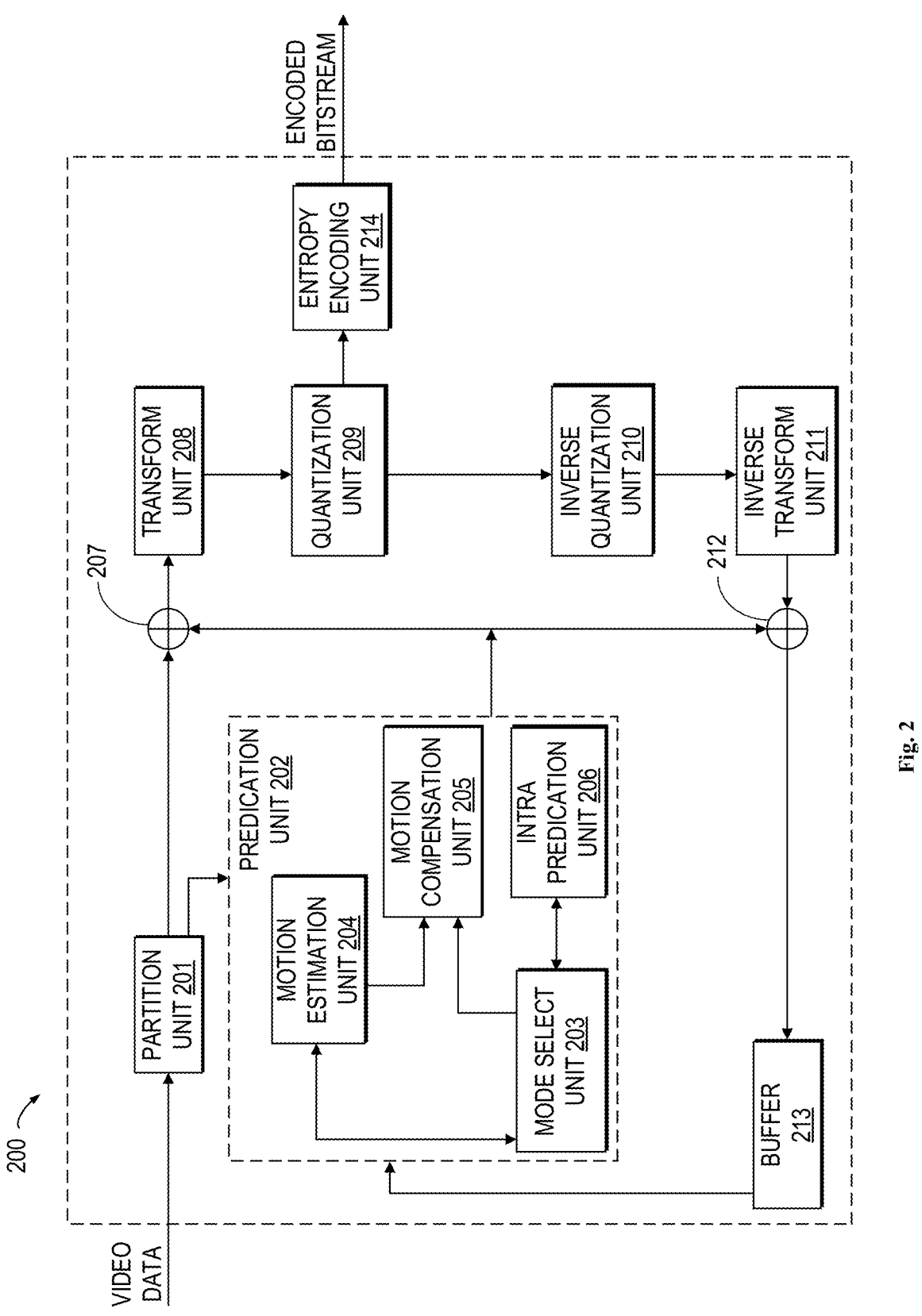
FIG. 2 illustrates a block diagram of an example video encoder in accordance with some embodiments of the present disclosure.

FIG. 2 is a block diagram illustrating an example of a video encoder 200, which may be an example of the video encoder 114 in the system 100 illustrated in FIG. 1, in accordance with some embodiments of the present disclosure.

The video encoder 200 may be configured to implement any or all of the techniques of this disclosure. In the example of FIG. 2, the video encoder 200 includes a plurality of functional components. The techniques described in this disclosure may be shared among the various components of the video encoder 200. In some examples, a processor may be configured to perform any or all of the techniques described in this disclosure.

In some embodiments, the video encoder 200 may include a partition unit 201, a predication unit 202 which may include a mode select unit 203, a motion estimation unit 204, a motion compensation unit 205 and an intra-prediction unit 206, a residual generation unit 207, a transform unit 208, a quantization unit 209, an inverse quantization unit 210, an inverse transform unit 211, a reconstruction unit 212, a buffer 213, and an entropy encoding unit 214.

In other examples, the video encoder 200 may include more, fewer, or different functional components. In an example, the predication unit 202 may include an intra block copy (IBC) unit. The IBC unit may perform predication in an IBC mode in which at least one reference picture is a picture where the current video block is located.

Furthermore, although some components, such as the motion estimation unit 204 and the motion compensation unit 205, may be integrated, but are represented in the example of FIG. 2 separately for purposes of explanation.

The partition unit 201 may partition a picture into one or more video blocks. The video encoder 200 and the video decoder 300 may support various video block sizes.

The mode select unit 203 may select one of the coding modes, intra or inter, e.g., based on error results, and provide the resulting intra-coded or inter-coded block to a residual generation unit 207 to generate residual block data and to a reconstruction unit 212 to reconstruct the encoded block for use as a reference picture. In some examples, the mode select unit 203 may select a combination of intra and inter predication (CIIP) mode in which the predication is based on an inter predication signal and an intra predication signal. The mode select unit 203 may also select a resolution for a motion vector (e.g., a sub-pixel or integer pixel precision) for the block in the case of inter-predication.

To perform inter prediction on a current video block, the motion estimation unit 204 may generate motion information for the current video block by comparing one or more reference frames from buffer 213 to the current video block. The motion compensation unit 205 may determine a predicted video block for the current video block based on the motion information and decoded samples of pictures from the buffer 213 other than the picture associated with the current video block.

The motion estimation unit 204 and the motion compensation unit 205 may perform different operations for a current video block, for example, depending on whether the current video block is in an I-slice, a P-slice, or a B-slice. As used herein, an "I-slice" may refer to a portion of a picture composed of macroblocks, all of which are based upon macroblocks within the same picture. Further, as used herein, in some aspects, "P-slices" and "B-slices" may refer to portions of a picture composed of macroblocks that are not dependent on macroblocks in the same picture.

In some examples, the motion estimation unit 204 may perform uni-directional prediction for the current video block, and the motion estimation unit 204 may search reference pictures of list 0 or list 1 for a reference video block for the current video block. The motion estimation unit 204 may then generate a reference index that indicates the reference picture in list 0 or list 1 that contains the reference video block and a motion vector that indicates a spatial displacement between the current video block and the reference video block. The motion estimation unit 204 may output the reference index, a prediction direction indicator, and the motion vector as the motion information of the current video block. The motion compensation unit 205 may generate the predicted video block of the current video block based on the reference video block indicated by the motion information of the current video block.

Alternatively, in other examples, the motion estimation unit 204 may perform bi-directional prediction for the current video block. The motion estimation unit 204 may search the reference pictures in list 0 for a reference video block for the current video block and may also search the reference pictures in list 1 for another reference video block for the current video block. The motion estimation unit 204 may then generate reference indexes that indicate the reference pictures in list 0 and list 1 containing the reference video blocks and motion vectors that indicate spatial displacements between the reference video blocks and the current video block. The motion estimation unit 204 may output the reference indexes and the motion vectors of the current video block as the motion information of the current video block. The motion compensation unit 205 may generate the predicted video block of the current video block based on the reference video blocks indicated by the motion information of the current video block.

In some examples, the motion estimation unit 204 may output a full set of motion information for decoding processing of a decoder. Alternatively, in some embodiments, the motion estimation unit 204 may signal the motion information of the current video block with reference to the motion information of another video block. For example, the motion estimation unit 204 may determine that the motion information of the current video block is sufficiently similar to the motion information of a neighboring video block.

In one example, the motion estimation unit 204 may indicate, in a syntax structure associated with the current video block, a value that indicates to the video decoder 300 that the current video block has the same motion information as the another video block.

In another example, the motion estimation unit 204 may identify, in a syntax structure associated with the current video block, another video block and a motion vector difference (MVD). The motion vector difference indicates a difference between the motion vector of the current video block and the motion vector of the indicated video block. The video decoder 300 may use the motion vector of the indicated video block and the motion vector difference to determine the motion vector of the current video block.

As discussed above, video encoder 200 may predictively signal the motion vector. Two examples of predictive signaling techniques that may be implemented by video encoder 200 include advanced motion vector predication (AMVP) and merge mode signaling.

The intra prediction unit 206 may perform intra prediction on the current video block. When the intra prediction unit 206 performs intra prediction on the current video block, the intra prediction unit 206 may generate prediction data for the current video block based on decoded samples of other video blocks in the same picture. The prediction data for the current video block may include a predicted video block and various syntax elements.

The residual generation unit 207 may generate residual data for the current video block by subtracting (e.g., indicated by the minus sign) the predicted video block (s) of the current video block from the current video block. The residual data of the current video block may include residual video blocks that correspond to different sample components of the samples in the current video block.

In other examples, there may be no residual data for the current video block for the current video block, for example in a skip mode, and the residual generation unit 207 may not perform the subtracting operation.

The transform processing unit 208 may generate one or more transform coefficient video blocks for the current video block by applying one or more transforms to a residual video block associated with the current video block.

After the transform processing unit 208 generates a transform coefficient video block associated with the current video block, the quantization unit 209 may quantize the transform coefficient video block associated with the current video block based on one or more quantization parameter (QP) values associated with the current video block.

The inverse quantization unit 210 and the inverse transform unit 211 may apply inverse quantization and inverse transforms to the transform coefficient video block, respectively, to reconstruct a residual video block from the transform coefficient video block. The reconstruction unit 212 may add the reconstructed residual video block to corresponding samples from one or more predicted video blocks generated by the predication unit 202 to produce a reconstructed video block associated with the current video block for storage in the buffer 213.

After the reconstruction unit 212 reconstructs the video block, loop filtering operation may be performed to reduce video blocking artifacts in the video block.

The entropy encoding unit 214 may receive data from other functional components of the video encoder 200.

When the entropy encoding unit 214 receives the data, the entropy encoding unit 214 may perform one or more entropy encoding operations to generate entropy encoded data and output a bitstream that includes the entropy encoded data.

Figure 3:
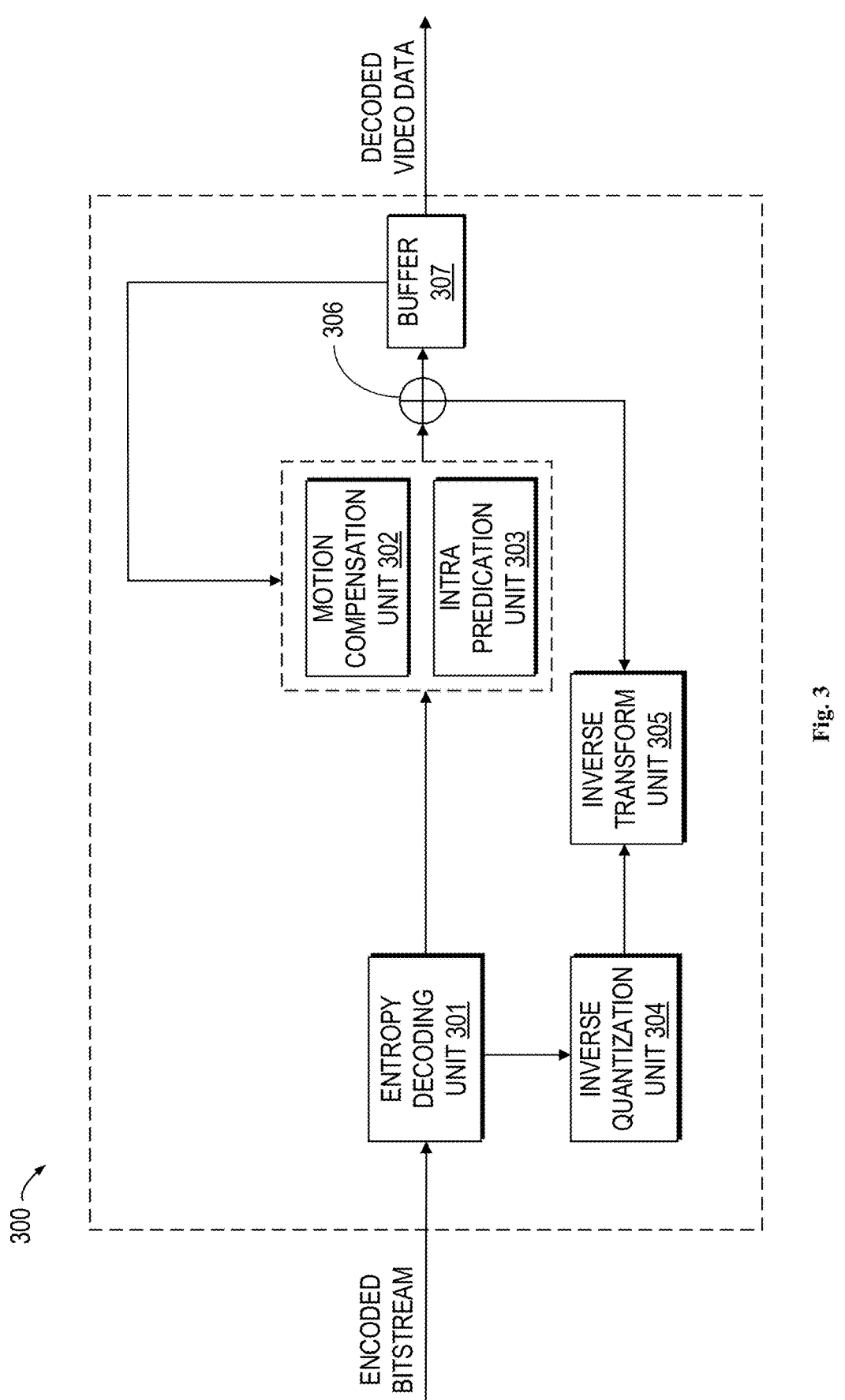
FIG. 3 illustrates a block diagram of an example video decoder in accordance with some embodiments of the present disclosure.

FIG. 3 is a block diagram illustrating an example of a video decoder 300, which may be an example of the video decoder 124 in the system 100 illustrated in FIG. 1, in accordance with some embodiments of the present disclosure.

The video decoder 300 may be configured to perform any or all of the techniques of this disclosure. In the example of FIG. 3, the video decoder 300 includes a plurality of functional components. The techniques described in this disclosure may be shared among the various components of the video decoder 300. In some examples, a processor may be configured to perform any or all of the techniques described in this disclosure.

In the example of FIG. 3, the video decoder 300 includes an entropy decoding unit 301, a motion compensation unit 302, an intra prediction unit 303, an inverse quantization unit 304, an inverse transformation unit 305, and a reconstruction unit 306 and a buffer 307. The video decoder 300 may, in some examples, perform a decoding pass generally reciprocal to the encoding pass described with respect to video encoder 200.

The entropy decoding unit 301 may retrieve an encoded bitstream. The encoded bitstream may include entropy coded video data (e.g., encoded blocks of video data). The entropy decoding unit 301 may decode the entropy coded video data, and from the entropy decoded video data, the motion compensation unit 302 may determine motion information including motion vectors, motion vector precision, reference picture list indexes, and other motion information. The motion compensation unit 302 may, for example, determine such information by performing the AMVP and merge mode. AMVP is used, including derivation of several most probable candidates based on data from adjacent PBs and the reference picture. Motion information typically includes the horizontal and vertical motion vector displacement values, one or two reference picture indices, and, in the case of prediction regions in B slices, an identification of which reference picture list is associated with each index. As used herein, in some aspects, a "merge mode" may refer to deriving the motion information from spatially or temporally neighboring blocks.

The motion compensation unit 302 may produce motion compensated blocks, possibly performing interpolation based on interpolation filters. Identifiers for interpolation filters to be used with sub-pixel precision may be included in the syntax elements.

The motion compensation unit 302 may use the interpolation filters as used by the video encoder 200 during encoding of the video block to calculate interpolated values for sub-integer pixels of a reference block. The motion compensation unit 302 may determine the interpolation filters used by the video encoder 200 according to the received syntax information and use the interpolation filters to produce predictive blocks.

The motion compensation unit 302 may use at least part of the syntax information to determine sizes of blocks used to encode frame(s) and/or slice(s) of the encoded video sequence, partition information that describes how each macroblock of a picture of the encoded video sequence is partitioned, modes indicating how each partition is encoded, one or more reference frames (and reference frame lists) for each inter-encoded block, and other information to decode the encoded video sequence. As used herein, in some aspects, a "slice" may refer to a data structure that can be decoded independently from other slices of the same picture, in terms of entropy coding, signal prediction, and residual signal reconstruction. A slice can either be an entire picture or a region of a picture.

The intra prediction unit 303 may use intra prediction modes for example received in the bitstream to form a prediction block from spatially adjacent blocks. The inverse quantization unit 304 inverse quantizes, i.e., de-quantizes, the quantized video block coefficients provided in the bitstream and decoded by entropy decoding unit 301. The inverse transform unit 305 applies an inverse transform.

The reconstruction unit 306 may obtain the decoded blocks, e.g., by summing the residual blocks with the corresponding prediction blocks generated by the motion compensation unit 302 or intra-prediction unit 303. If desired, a deblocking filter may also be applied to filter the decoded blocks in order to remove blockiness artifacts. The decoded video blocks are then stored in the buffer 307, which provides reference blocks for subsequent motion compensation/intra predication and also produces decoded video for presentation on a display device.

Some exemplary embodiments of the present disclosure will be described in detailed hereinafter. It should be understood that section headings are used in the present document to facilitate ease of understanding and do not limit the embodiments disclosed in a section to only that section. Furthermore, while certain embodiments are described with reference to Versatile Video Coding or other specific video codecs, the disclosed techniques are applicable to other video coding technologies also. Furthermore, while some embodiments describe video coding steps in detail, it will be understood that corresponding steps decoding that undo the coding will be implemented by a decoder. Furthermore, the term video processing encompasses video coding or compression, video decoding or decompression and video transcoding in which video pixels are represented from one compressed format into another compressed format or at a different compressed bitrate.

1. Summary

This disclosure is related to video coding technologies. Specifically, it is about the syntax signalling of a prediction mode. It may be applied to the existing video coding standard like HEVC, VVC, and etc. It may be also applicable to future video coding standards or video codec.

2. Background

Video coding standards have evolved primarily through the development of the well-known ITU-T and ISO/IEC standards. The ITU-T produced H.261 and H.263, ISO/IEC produced MPEG-1 and MPEG-4 Visual, and the two organizations jointly produced the H.262/MPEG-2 Video and H.264/MPEG-4 Advanced Video Coding (AVC) and H.265/ HEVC standards. Since H.262, the video coding standards are based on the hybrid video coding structure wherein temporal prediction plus transform coding are utilized. To explore the future video coding technologies beyond HEVC, the Joint Video Exploration Team (JVET) was founded by VCEG and MPEG jointly in 2015. The JVET meeting is concurrently held once every quarter, and the new video coding standard was officially named as Versatile Video Coding (VVC) in the April 2018 JVET meeting, and the first version of VVC test model (VTM) was released at that time. The VVC working draft and test model VTM are then updated after every meeting. The VVC project achieved technical completion (FDIS) at the July 2020 meeting.

2.1. Coding Tools

Intra Prediction 2.1..1. Intra mode coding with 67 intra prediction modes

Figure 4:
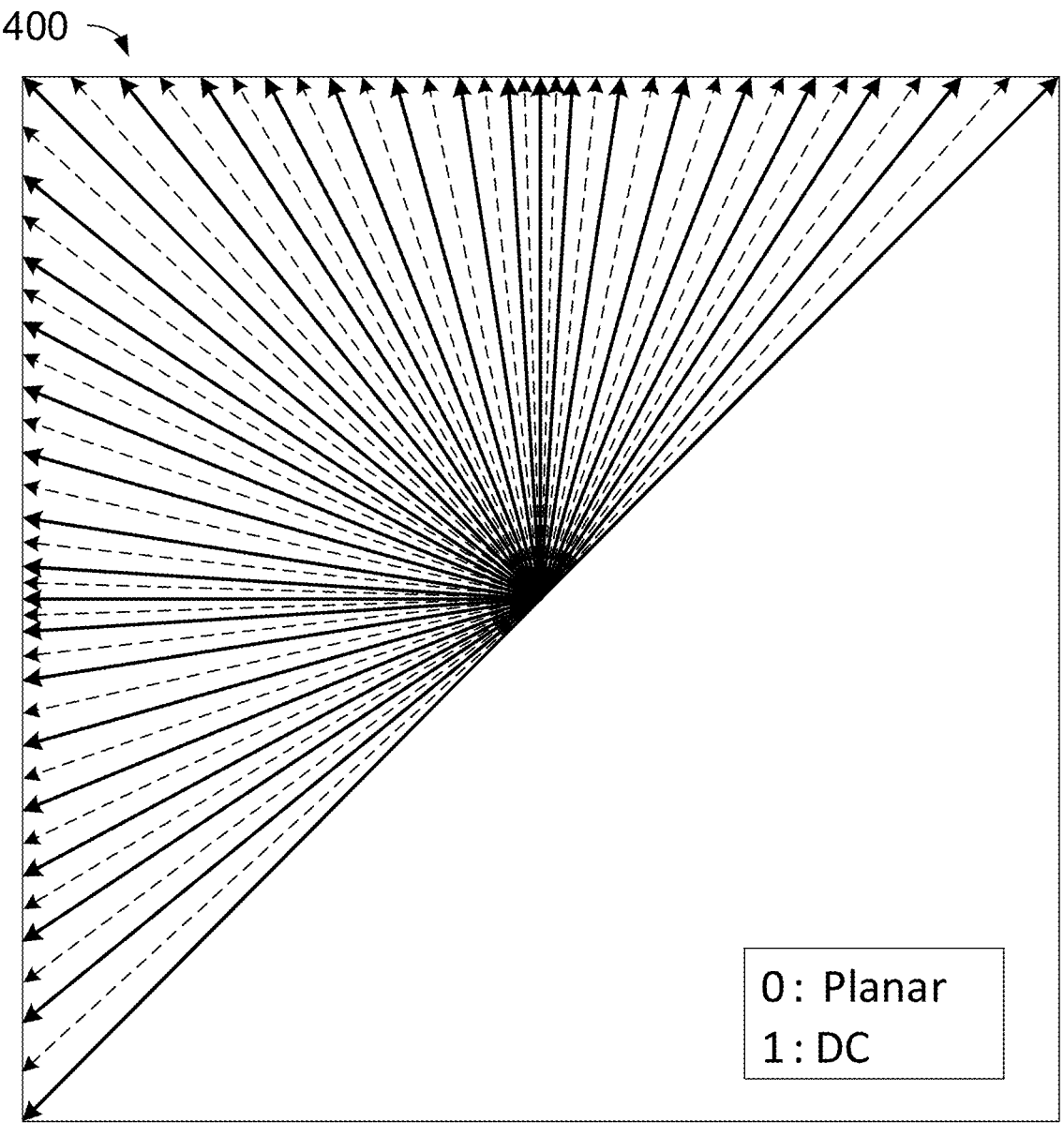
FIG. 4 is a schematic diagram illustrating intra prediction modes.

To capture the arbitrary edge directions presented in natural video, the number of directional intra modes in VVC is extended from 33, as used in HEVC, to 65. FIG. 4 is a schematic diagram illustrating intra prediction modes. The new directional modes not in HEVC are depicted as dotted arrows in FIG. 4, and the planar and DC modes remain the same. These denser directional intra prediction modes apply for all block sizes and for both luma and chroma intra predictions.

In VVC, several conventional angular intra prediction modes are adaptively replaced with wide-angle intra prediction modes for the non-square blocks.

In HEVC, every intra-coded block has a square shape and the length of each of its side is a power of 2. Thus, no division operations are required to generate an intra-predictor using DC mode. In VVC, blocks can have a rectangular shape that necessitates the use of a division operation per block in the general case. To avoid division operations for DC prediction, only the longer side is used to compute the average for non-square blocks.

2.1..2. Intra Mode Coding

To keep the complexity of the most probable mode (MPM) list generation low, an intra mode coding method with 6 MPMs is used by considering two available neighboring intra modes. The following three aspects are considered to construct the MPM list:

Default intra modes

Neighbouring intra modes

Derived intra modes

A unified 6-MPM list is used for intra blocks irrespective of whether MRL and ISP coding tools are applied or not. The MPM list is constructed based on intra modes of the left and above neighboring block. Suppose the mode of the left is denoted as Left and the mode of the above block is denoted as Above, the unified MPM list is constructed as follows:

When a neighboring block is not available, its intra mode is set to Planar by default.

If both modes Left and Above are non-angular modes:

MPM list→{Planar, DC, V, H, V−4, V+4}

If one of modes Left and Above is angular mode, and the other is non-angular:

Set a mode Max as the larger mode in Left and Above

MPM list→{Planar, Max, DC, Max−1, Max+1, Max−2}

If Left and Above are both angular and they are different:

Set a mode Max as the larger mode in Left and Above if the difference of mode Left and Above is in the range of 2 to 62, inclusive MPM list→{Planar, Left, Above, DC, Max−1, Max+1}

Otherwise

MPM list→{Planar, Left, Above, DC, Max−2, Max+2}

If Left and Above are both angular and they are the same:

MPM list→{Planar, Left, Left−1, Left+1, DC, Left−2}

Besides, the first bin of the mpm index codeword is CABAC context coded. In total three contexts are used, corresponding to whether the current intra block is MRL enabled, ISP enabled, or a normal intra block.

During 6 MPM list generation process, pruning is used to remove duplicated modes so that only unique modes can be included into the MPM list. For entropy coding of the 61 non-MPM modes, a Truncated Binary Code (TBC) is used.

2.1..3. Wide-Angle Intra Prediction for Non-Square Blocks

Conventional angular intra prediction directions are defined from 45 degrees to −135 degrees in clockwise direction. In VVC, several conventional angular intra prediction modes are adaptively replaced with wide-angle intra prediction modes for non-square blocks. The replaced modes are signalled using the original mode indexes, which are remapped to the indexes of wide angular modes after parsing. The total number of intra prediction modes is unchanged, i.e., 67, and the intra mode coding method is unchanged.

Figure 5:
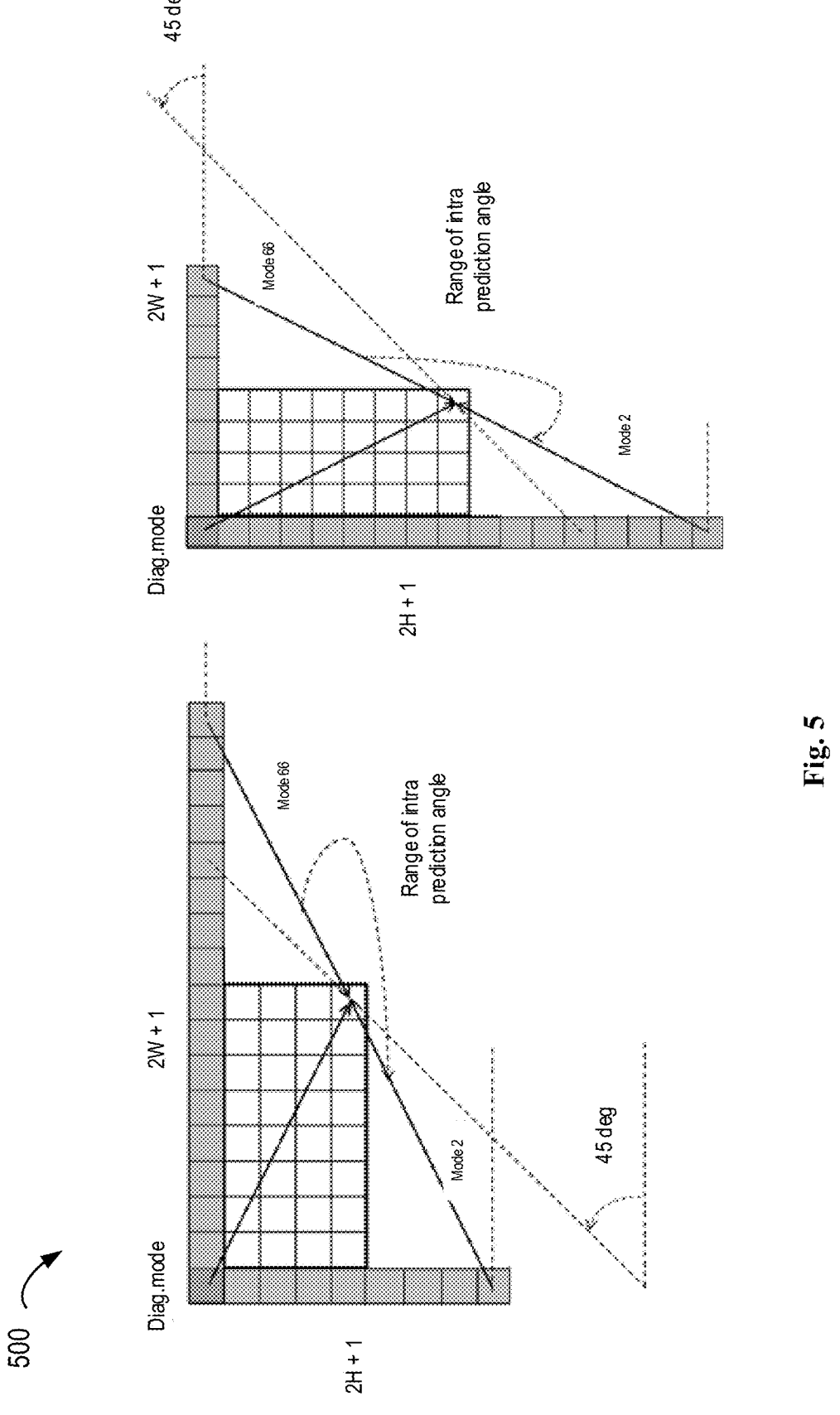
FIG. 5 is a schematic diagram illustrating reference samples for wide-angular intra prediction.

To support these prediction directions, the top reference with length 2W+1, and the left reference with length 2H+1, are defined as shown in FIG. 5. FIG. 5 is a schematic diagram illustrating reference samples for wide-angular intra prediction.

The number of replaced modes in wide-angular direction mode depends on the aspect ratio of a block. The replaced intra prediction modes are illustrated in Table 2-1

TABLE 2-1

Intra prediction modes replaced by wide-angular modes

| Aspect ratio | Replaced intra prediction modes |
|---|---|
| W/H == 16 | Modes 12, 13, 14, 15 |
| W/H == 8 | Modes 12, 13 |
| W/H == 4 | Modes 2, 3, 4, 5, 6, 7, 8, 9, 10, 11 |
| W/H == 2 | Modes 2, 3, 4, 5, 6, 7, |
| W/H == 1 | None |
| W/H == 1/2 | Modes 61, 62, 63, 64, 65, 66 |
| W/H == 1/4 | Mode 57, 58, 59, 60, 61, 62, 63, 64, 65, 66 |
| W/H == 1/8 | Modes 55, 56 |
| W/H == 1/16 | Modes 53, 54, 55, 56 |

Figure 6:
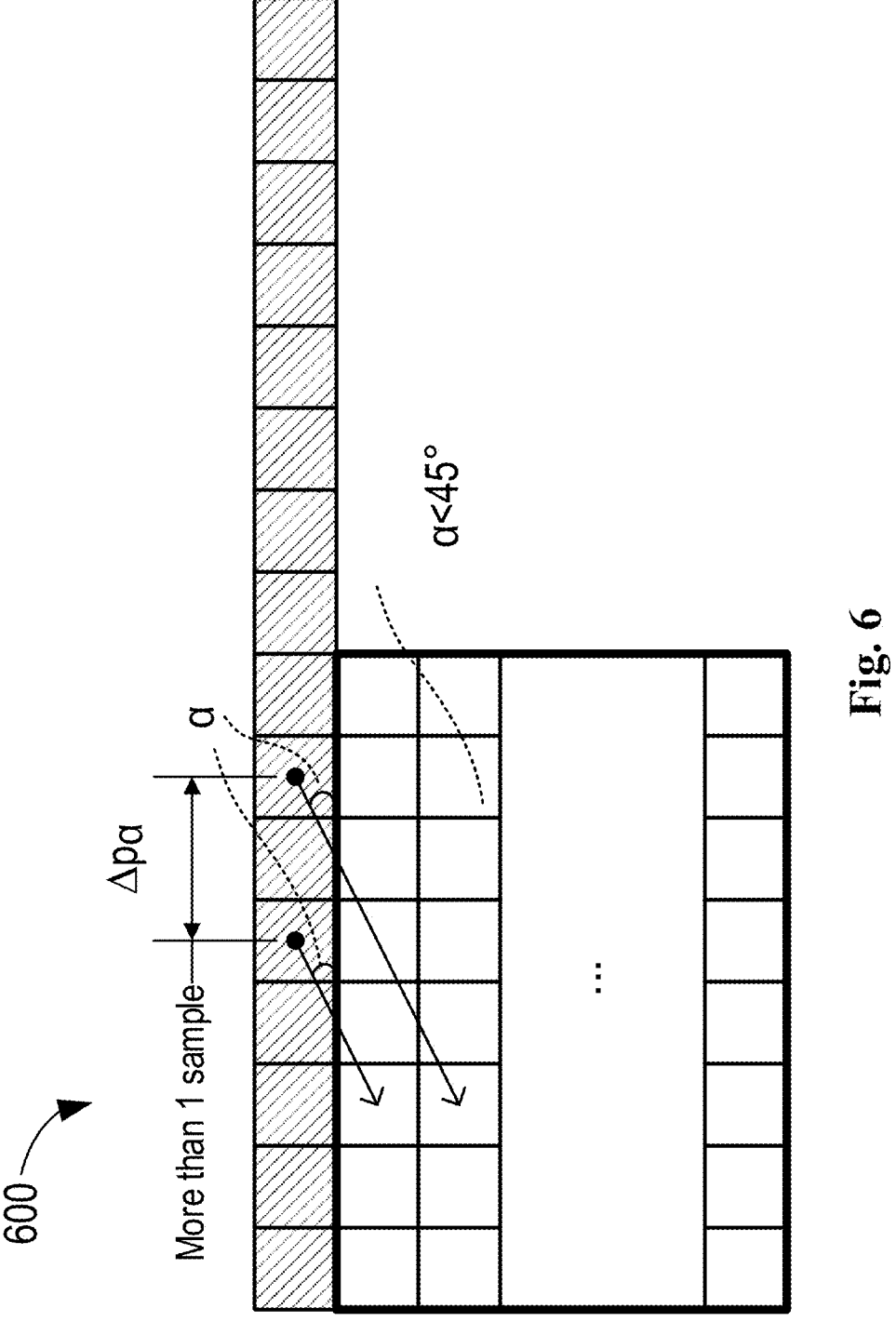
FIG. 6 is a schematic diagram illustrating problem of discontinuity in case of directions beyond 4°.

FIG. 6 is a schematic diagram illustrating problem of discontinuity in case of directions beyond 45°. As shown in FIG. 6, two vertically-adjacent predicted samples may use two non-adjacent reference samples in the case of wide-angle intra prediction. Hence, low-pass reference samples filter and side smoothing are applied to the wide-angle prediction to reduce the negative effect of the increased gap $\Delta p_\alpha$. If a wide-angle mode represents a non-fractional offset. There are 8 modes in the wide-angle modes satisfy this condition, which are [−14, −12, −10, −6, 72, 76, 78, 80]. When a block is predicted by these modes, the samples in the reference buffer are directly copied without applying any interpolation. With this modification, the number of samples needed to be smoothing is reduced. Besides, it aligns the design of non-fractional modes in the conventional prediction modes and wide-angle modes.

In VVC, 4:2:2 and 4:4:4 chroma formats are supported as well as 4:2:0. Chroma derived mode (DM) derivation table for 4:2:2 chroma format was initially ported from HEVC extending the number of entries from 35 to 67 to align with the extension of intra prediction modes. Since HEVC specification does not support prediction angle below −135 degree and above 45 degree, luma intra prediction modes ranging from 2 to 5 are mapped to 2. Therefore chroma DM derivation table for 4:2:2 chroma format is updated by replacing some values of the entries of the mapping table to convert prediction angle more precisely for chroma blocks.

2.1..4. Mode Dependent Intra Smoothing (MDIS)

Four-tap intra interpolation filters are utilized to improve the directional intra prediction accuracy. In HEVC, a twotap linear interpolation filter has been used to generate the intra prediction block in the directional prediction modes (i.e., excluding Planar and DC predictors). In VVC, simplified 6-bit 4-tap Gaussian interpolation filter is used for only directional intra modes. Non-directional intra prediction process is unmodified. The selection of the 4-tap filters is performed according to the MDIS condition for directional intra prediction modes that provide non-fractional displacements, i.e. to all the directional modes excluding the following: 2, HOR_IDX, DIA_IDX, VER_IDX, 66.

Depending on the intra prediction mode, the following reference samples processing is performed:

The directional intra-prediction mode is classified into one of the following groups:
vertical or horizontal modes (HOR_IDX, VER_IDX), diagonal modes that represent angles which are multiple of 45 degree (2, DIA_IDX, VDIA_IDX), remaining directional modes;
If the directional intra-prediction mode is classified as belonging to group A, then then no filters are applied to reference samples to generate predicted samples;
Otherwise, if a mode falls into group B, then a [1, 2, 1] reference sample filter may be applied (depending on the MDIS condition) to reference samples to further copy these filtered values into an intra predictor according to the selected direction, but no interpolation filters are applied;
Otherwise, if a mode is classified as belonging to group C, then only an intra reference sample interpolation filter is applied to reference samples to generate a predicted sample that falls into a fractional or integer position between reference samples according to a selected direction (no reference sample filtering is performed).

2.1..5. Position Dependent Intra Prediction Combination

In VVC, the results of intra prediction of DC, planar and several angular modes are further modified by a position dependent intra prediction combination (PDPC) method. PDPC is an intra prediction method which invokes a combination of the un-filtered boundary reference samples and HEVC style intra prediction with filtered boundary reference samples. PDPC is applied to the following intra modes without signalling: planar, DC, horizontal, vertical, bottom-left angular mode and its eight adjacent angular modes, and top-right angular mode and its eight adjacent angular modes.

The prediction sample pred(x',y') is predicted using an intra prediction mode (DC, planar, angular) and a linear combination of reference samples according to the Equation 3-8 as follows:

$$\text{pred}(x',y')=(wL \times R_{-1,y}+wT \times R_{x',-1}-wTL \times R_{-1,-1}+(64-wL-wT+wTL) \times \text{pred}(x',y')+32)>>6 \quad (2\text{-}1)$$

where $R_{x,-1}$, $R_{-1,y}$ represent the reference samples located at the top and left boundaries of current sample (x, y), respectively, and $R_{-1,-1}$ represents the reference sample located at the top-left corner of the current block.

If PDPC is applied to DC, planar, horizontal, and vertical intra modes, additional boundary filters are not needed, as required in the case of HEVC DC mode boundary filter or horizontal/vertical mode edge filters. PDPC process for DC and Planar modes is identical and clipping operation is avoided. For angular modes, pdpc scale factor is adjusted such that range check is not needed and condition on angle to enable pdpc is removed (scale>=0 is used). In addition, PDPC weight is based on 32 in all angular mode cases. The PDPC weights are dependent on prediction modes and are shown in Table 2-2. PDPC is applied to the block with both width and height greater than or equal to 4.

Figure 7A:
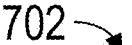
FIG. 7A illustrates a schematic diagram of a definition of samples used by PDPC applied to a diagonal top-right mode of diagonal and adjacent angular intra modes.
Figure 7A:
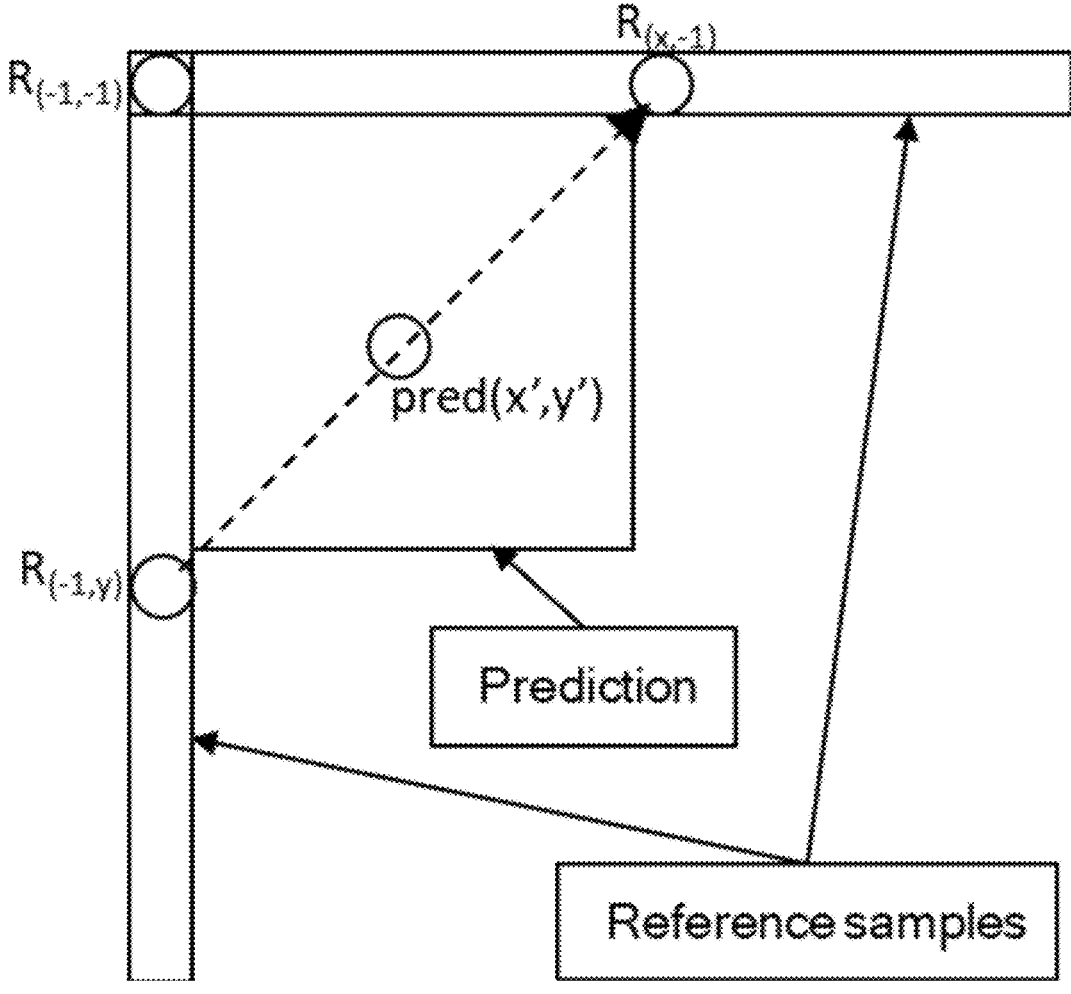
Figure 7B:
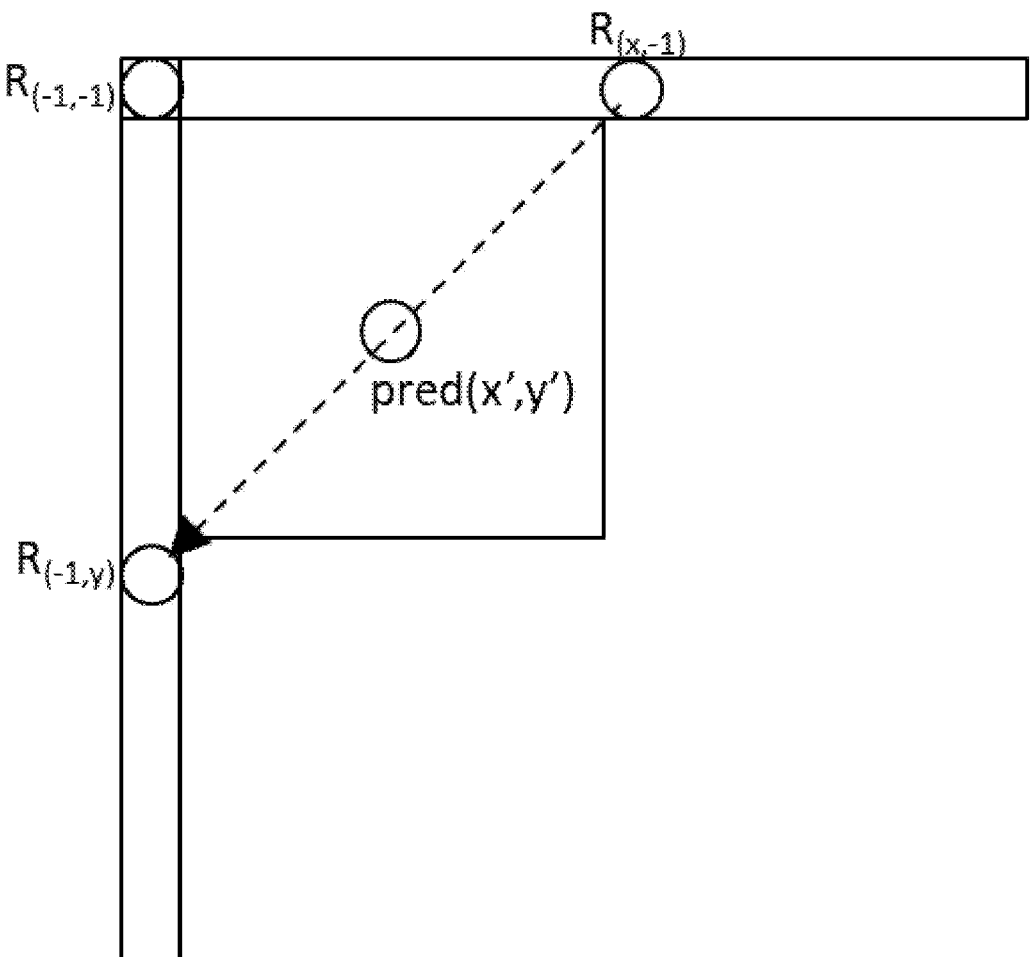
FIG. 7B illustrates a schematic diagram of a definition of samples used by PDPC applied to a diagonal bottom-left mode of diagonal and adjacent angular intra modes.
Figure 7C:
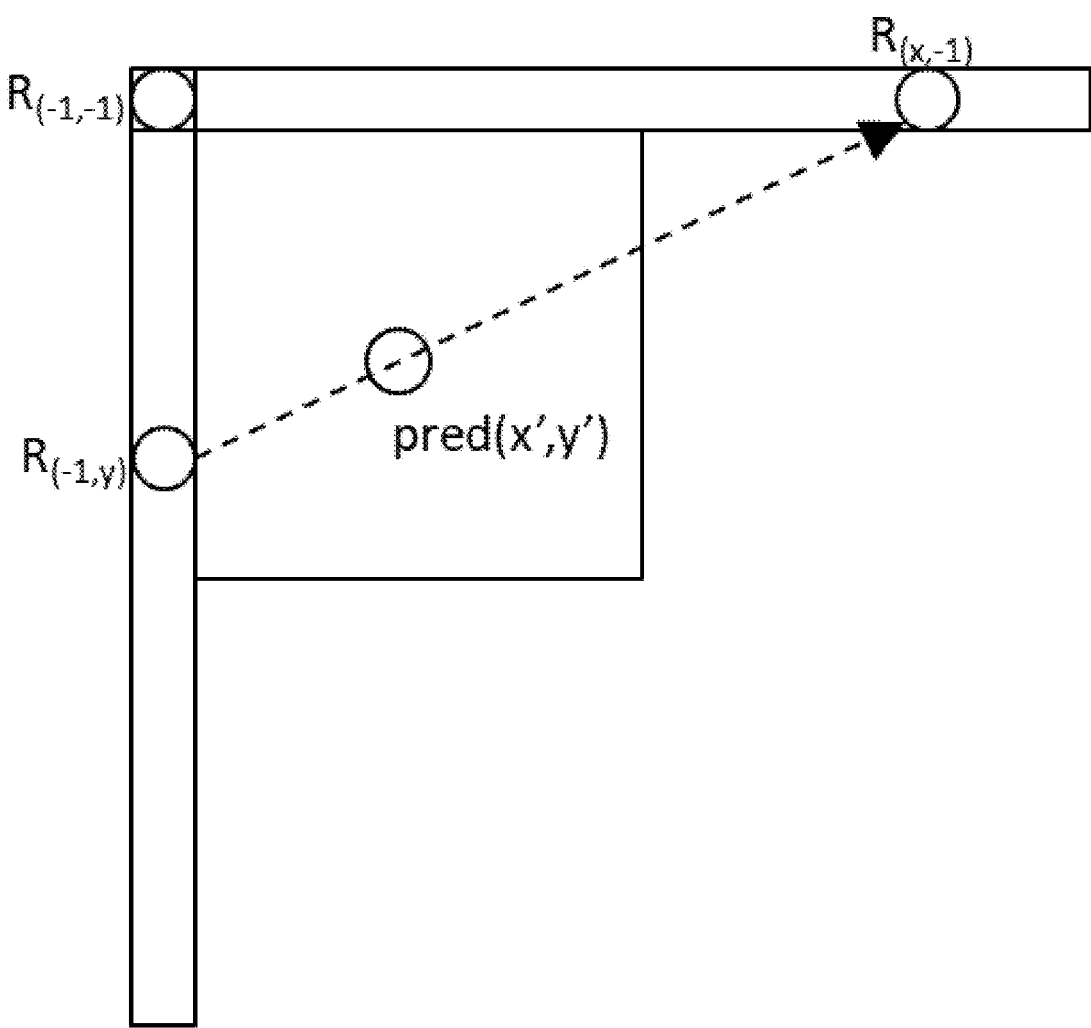
FIG. 7C illustrates a schematic diagram of a definition of samples used by PDPC applied to an adjacent diagonal top-right mode of diagonal and adjacent angular intra modes.
Figure 7D:
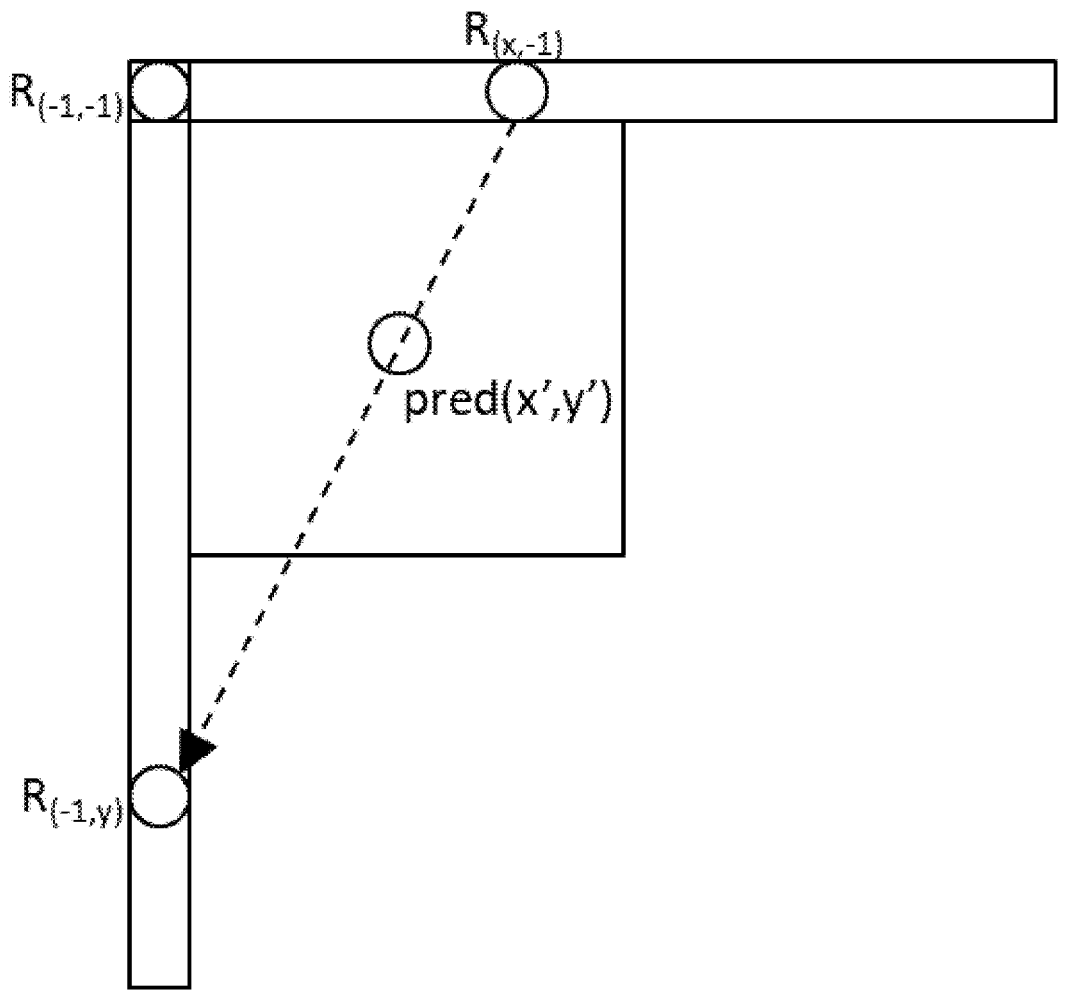
FIG. 7D illustrates a schematic diagram of a definition of samples used by PDPC applied to an adjacent diagonal bottom-left mode of diagonal and adjacent angular intra modes.

FIGS. 7A-7D illustrate the definition of reference samples ($R_{x,-1}$, $R_{-1,y}$ and $R_{-1,-1}$) for PDPC applied over various prediction modes. FIG. 7A illustrates a schematic diagram of a definition of samples used by PDPC applied to a diagonal top-right mode of diagonal and adjacent angular intra modes. FIG. 7B illustrates a schematic diagram of a definition of samples used by PDPC applied to a diagonal bottom-left mode of diagonal and adjacent angular intra modes. FIG. 7C illustrates a schematic diagram of a definition of samples used by PDPC applied to an adjacent diagonal top-right mode of diagonal and adjacent angular intra modes. FIG. 7D illustrates a schematic diagram of a definition of samples used by PDPC applied to an adjacent diagonal bottom-left mode of diagonal and adjacent angular intra modes; The prediction sample pred(x', y') is located at (x', y') within the prediction block. As an example, the coordinate x of the reference sample $R_{x,-1}$ is given by: x=x'+y'+1, and the coordinate y of the reference sample $R_{-1,y}$ is similarly given by: y=x'+y'+1 for the diagonal modes. For the other annular mode, the reference samples $R_{x,-1}$ and $R_{-1,y}$ could be located in fractional sample position. In this case, the sample value of the nearest integer sample location is used.

TABLE 2-2

| Example of PDPC weights according to prediction modes | | | |
|---|---|---|---|
| Prediction modes | wT | wL | wTL |
| Diagonal top-right | 16 >> ((y' << 1) >> shift) | 16 >> ((x' << 1) >> shift) | 0 |
| Diagonal bottom-left | 16 >> ((y' << 1) >> shift) | 16 >> ((x' << 1) >> shift) | 0 |
| Adjacent diagonal top-right | 32 >> ((y' << 1) >> shift) | 0 | 0 |
| Adjacent diagonal bottom-left | 0 | 32 >> ((x' << 1) >> shift) | 0 |

2.1..6. Multiple Reference Line (MRL) Intra Prediction

Figure 8:
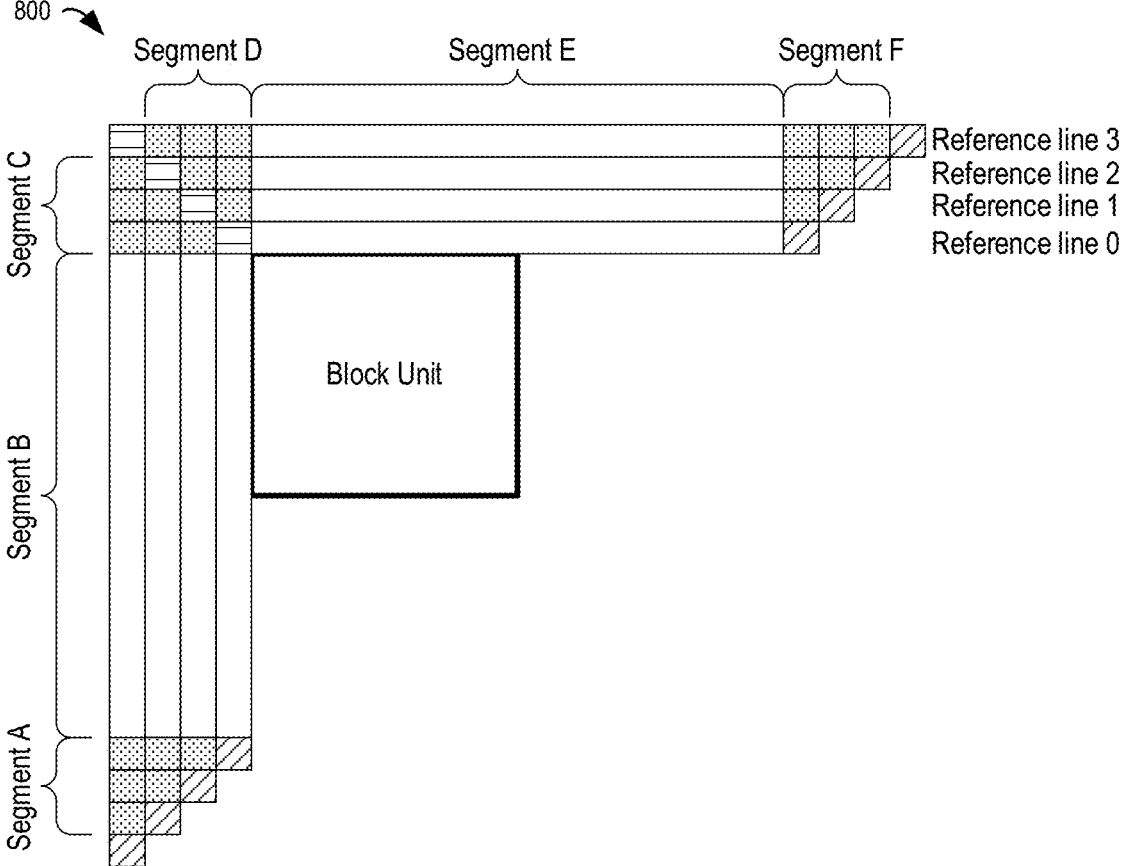
FIG. 8 is a schematic diagram illustrating example of four reference lines neighboring to a prediction block.

Multiple reference line (MRL) intra prediction uses more reference lines for intra prediction. FIG. 8 is a schematic diagram illustrating example of four reference lines neighboring to a prediction block. In FIG. 8, an example of 4 reference lines is depicted, where the samples of segments A and F are not fetched from reconstructed neighbouring samples but padded with the closest samples from Segment B and E, respectively. HEVC intra-picture prediction uses the nearest reference line (i.e., reference line 0). In MRL, 2 additional lines (reference line 1 and reference line 3) are used.

The index of selected reference line (mrl_idx) is signalled and used to generate intra predictor. For reference line idx, which is greater than 0, only include additional reference line modes in MPM list and only signal mpm index without remaining mode. The reference line index is signalled before intra prediction modes, and Planar mode is excluded from intra prediction modes in case a nonzero reference line index is signalled.

MRL is disabled for the first line of blocks inside a CTU to prevent using extended reference samples outside the current CTU line. Also, PDPC is disabled when additional line is used. For MRL mode, the derivation of DC value in DC intra prediction mode for non-zero reference line indices is aligned with that of reference line index 0. MRL requires the storage of 3 neighboring luma reference lines with a CTU to generate predictions. The Cross-Component Linear Model (CCLM) tool also requires 3 neighboring luma reference lines for its downsampling filters. The definition of MLR to use the same 3 lines is aligned as CCLM to reduce the storage requirements for decoders.

2.1..7. Intra Sub-Partitions (ISP)

Figure 9A:
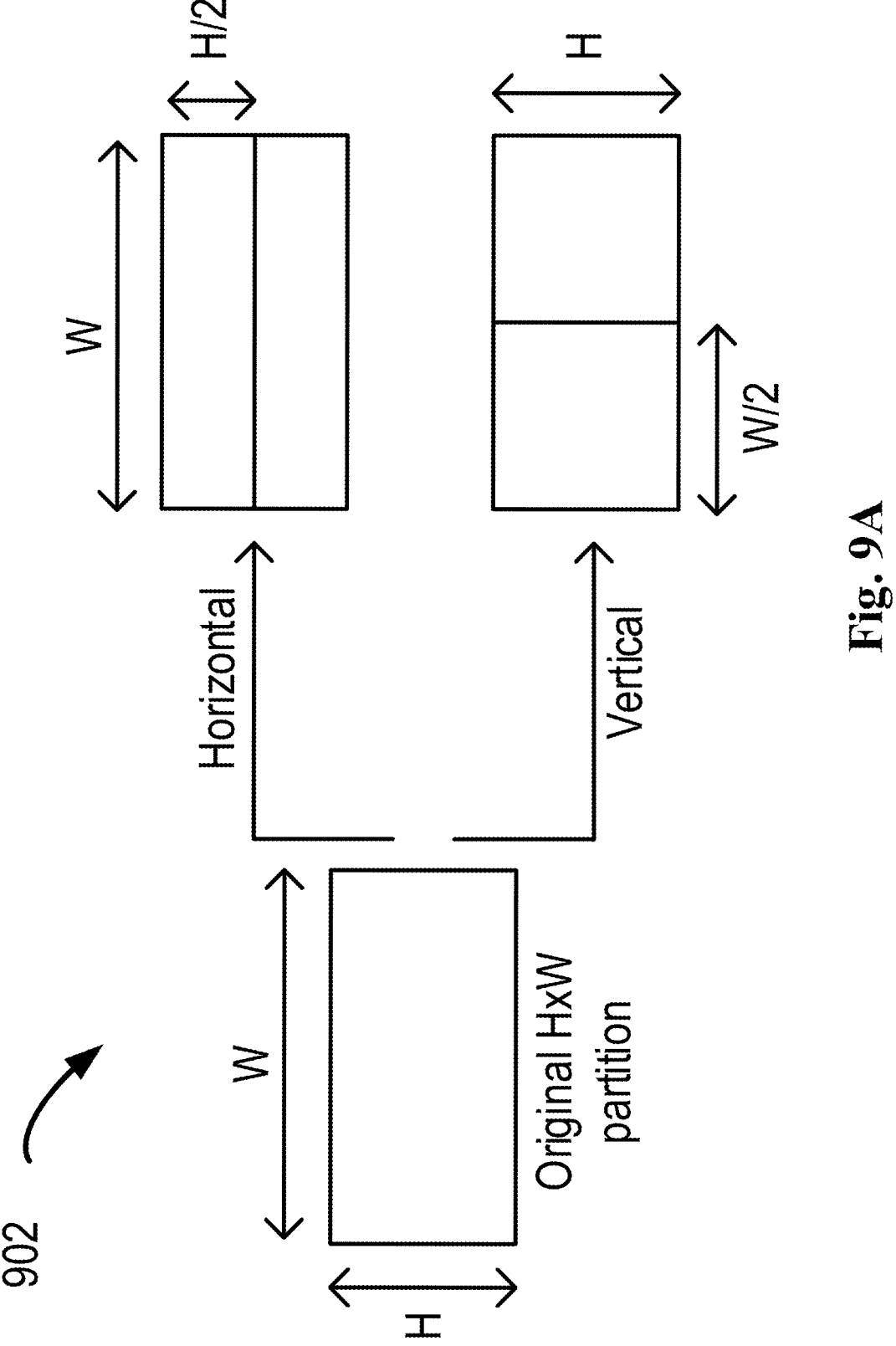
FIG. 9A illustrates a schematic diagram of examples of sub-partitions for 4×8 and 8×4 CUs.
Figure 9B:
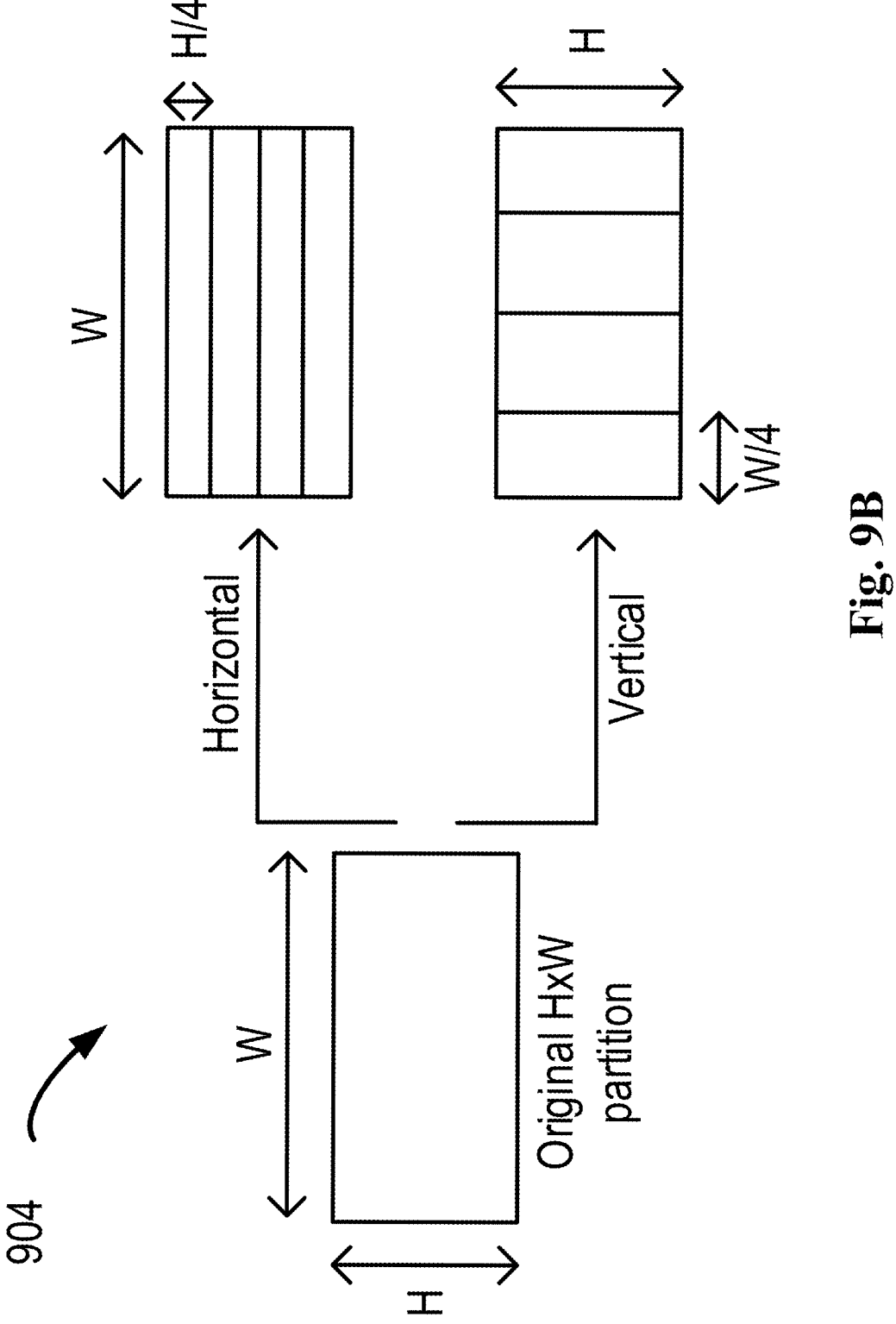
FIG. 9B illustrates a schematic diagram of examples of sub-partitions for CUs other than 4×8, 8×4 and 4×4.

The intra sub-partitions (ISP) divides luma intra-predicted blocks vertically or horizontally into 2 or 4 sub-partitions depending on the block size. For example, minimum block size for ISP is 4×8 (or 8×4). If block size is greater than 4×8 (or 8×4) then the corresponding block is divided by 4 sub-partitions. It has been noted that the M×128 (with M≤64) and 128×N (with N≤64) ISP blocks could generate a potential issue with the 64×64 VDPU. For example, an M×128 CU in the single tree case has an M×128 luma TB and two corresponding M/2×64 chroma TBs. If the CU uses ISP, then the luma TB will be divided into four M×32 TBs (only the horizontal split is possible), each of them smaller than a 64×64 block. However, in the current design of ISP chroma blocks are not divided. Therefore, both chroma components will have a size greater than a 32×32 block. Analogously, a similar situation could be created with a 128×N CU using ISP. Hence, these two cases are an issue for the 64×64 decoder pipeline. For this reason, the CU sizes that can use ISP is restricted to a maximum of 64×64. FIGS. 9A-9B show examples of the two possibilities. FIG. 9A illustrates a schematic diagram of examples of sub-partitions for 4×8 and 8×4 CUs. FIG. 9B illustrates a schematic diagram of examples of sub-partitions for CUs other than 4×8, 8×4 and 4×4. All sub-partitions fulfill the condition of having at least 16 samples.

In ISP, the dependence of 1×N/2×N subblock prediction on the reconstructed values of previously decoded 1×N/2×N subblocks of the coding block is not allowed so that the minimum width of prediction for subblocks becomes four samples. For example, an 8×N (N>4) coding block that is coded using ISP with vertical split is split into two prediction regions each of size 4×N and four transforms of size 2×N. Also, a 4×N coding block that is coded using ISP with vertical split is predicted using the full 4×N block; four transform each of 1×N is used. Although the transform sizes of 1×N and 2×N are allowed, it is asserted that the transform of these blocks in 4×N regions can be performed in parallel. For example, when a 4×N prediction region contains four 1×N transforms, there is no transform in the horizontal direction; the transform in the vertical direction can be performed as a single 4×N transform in the vertical direction. Similarly, when a 4×N prediction region contains two 2×N transform blocks, the transform operation of the two 2×N blocks in each direction (horizontal and vertical) can be conducted in parallel. Thus, there is no delay added in processing these smaller blocks than processing 4×4 regular-coded intra blocks.

TABLE 2-3

| Entropy coding coefficient group size | |
| --- | --- |
| Block Size | Coefficient group Size |
| 1 × N, N ≥ 16 | 1 × 16 |
| N × 1, N ≥ 16 | 16 × 1 |
| 2 × N, N ≥ 8 | 2 × 8 |
| N × 2, N ≥ 8 | 8 × 2 |
| All other possible M × N cases | 4 × 4 |

For each sub-partition, reconstructed samples are obtained by adding the residual signal to the prediction signal. Here, a residual signal is generated by the processes such as entropy decoding, inverse quantization and inverse transform. Therefore, the reconstructed sample values of each sub-partition are available to generate the prediction of the next sub-partition, and each sub-partition is processed repeatedly. In addition, the first sub-partition to be processed is the one containing the top-left sample of the CU and then continuing downwards (horizontal split) or rightwards (vertical split). As a result, reference samples used to generate the sub-partitions prediction signals are only located at the left and above sides of the lines. All sub-partitions share the same intra mode. The followings are summary of interaction of ISP with other coding tools.

Multiple Reference Line (MRL): if a block has an MRL index other than 0, then the ISP coding mode will be inferred to be 0 and therefore ISP mode information will not be sent to the decoder.

Entropy coding coefficient group size: the sizes of the entropy coding subblocks have been modified so that they have 16 samples in all possible cases, as shown in Table 2-3. Note that the new sizes only affect blocks produced by ISP in which one of the dimensions is less than 4 samples. In all other cases coefficient groups keep the 4×4 dimensions.

CBF coding: it is assumed to have at least one of the sub-partitions has a non-zero CBF. Hence, if n is the number of sub-partitions and the first n−1 sub-partitions have produced a zero CBF, then the CBF of the n-th sub-partition is inferred to be 1.

MPM usage: the MPM flag will be inferred to be one in a block coded by ISP mode, and the MPM list is modified to exclude the DC mode and to prioritize horizontal intra modes for the ISP horizontal split and vertical intra modes for the vertical one.

Transform size restriction: all ISP transforms with a length larger than 16 points uses the DCT-II.

PDPC: when a CU uses the ISP coding mode, the PDPC filters will not be applied to the resulting sub-partitions.

MTS flag: if a CU uses the ISP coding mode, the MTS CU flag will be set to 0 and it will not be sent to the decoder. Therefore, the encoder will not perform RD tests for the different available transforms for each resulting sub-partition. The transform choice for the ISP mode will instead be fixed and selected according the intra mode, the processing order and the block size utilized. Hence, no signalling is required. For example, let $t_H$ and $t_V$ be the horizontal and the vertical transforms selected respectively for the w×h sub-partition, where w is the width and h is the height. Then the transform is selected according to the following rules:

If w=1 or h=1, then there is no horizontal or vertical transform respectively.

If w=2 or w>32, $t_H$=DCT-II

If h=2 or h>32, $t_V$=DCT-II

Otherwise, the transform is selected as in Table 2-4.

TABLE 2-4

| Transform selection depends on intra mode | | |
| --- | --- | --- |
| Intra mode | $t_H$ | $t_V$ |
| Planar | DST-VII | DST-VII |
| Ang. 31, 32, 34, 36, 37 | | |
| DC | DCT-II | DCT-II |
| Ang. 33, 35 | | |
| Ang. 2, 4, 6 . . . 28, 30 | DST-VII | DCT-II |
| Ang. 39, 41, 43 . . . 63, 65 | | |
| Ang. 3, 5, 7 . . . 27, 29 | DCT-II | DST-VII |
| Ang. 38, 40, 42 . . . 64, 66 | | |

In ISP mode, all 67 intra modes are allowed. PDPC is also applied if corresponding width and height is at least 4 samples long. In addition, the condition for intra interpolation filter selection doesn't exist anymore, and Cubic (DCT-IF) filter is always applied for fractional position interpolation in ISP mode.

2.1..8. Matrix weighted Intra Prediction (MIP)

Figure 10:
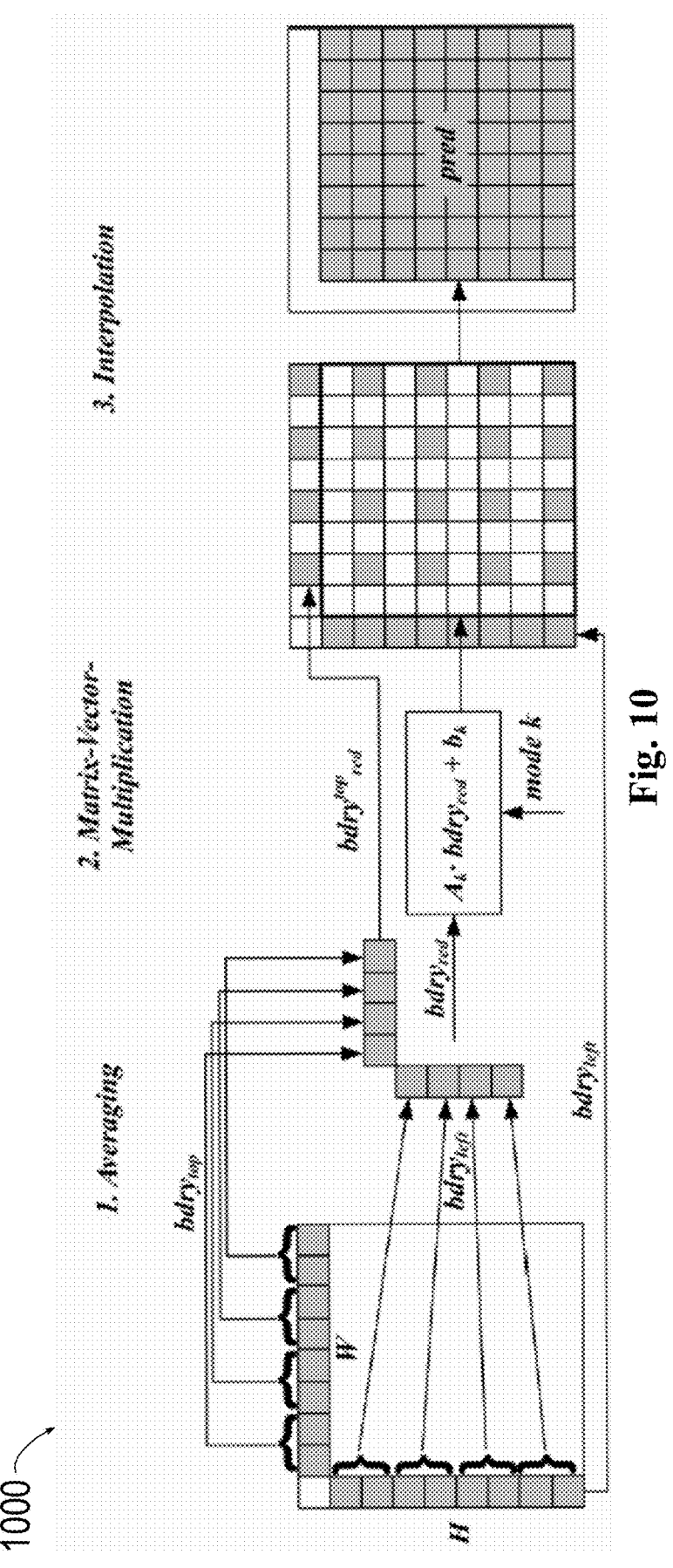
FIG. 10 is a schematic diagram illustrating a matrix weighted intra prediction process.

Matrix weighted intra prediction (MIP) method is a newly added intra prediction technique into VVC. For predicting the samples of a rectangular block of width W and height H, matrix weighted intra prediction (MIP) takes one line of H reconstructed neighbouring boundary samples left of the block and one line of W reconstructed neighbouring boundary samples above the block as input. If the reconstructed samples are unavailable, they are generated as it is done in the conventional intra prediction. The generation of the prediction signal is based on the following three steps, which are averaging, matrix vector multiplication and linear interpolation as shown in FIG. 10. FIG. 10 is a schematic diagram illustrating a matrix weighted intra prediction process.

3.3.6.1 Averaging Neighboring Samples

Among the boundary samples, four samples or eight samples are selected by averaging based on block size and shape. Specifically, the input boundaries $bdry^{top}$ and $bdry^{left}$ are reduced to smaller boundaries $$bdry_{red}^{top}$$

and $$bdry_{red}^{left}$$

by averaging neighboring boundary samples according to predefined rule depends on block size. Then, the two reduced boundaries $$bdry_{red}^{top}$$

and $$bdry_{red}^{left}$$

are concatenated to a reduced boundary vector $bdry_{red}$ which is thus of size four for blocks of shape 4×4 and of size eight for blocks of all other shapes. If mode refers to the MIP-mode, this concatenation is defined as follows:

$$bdry_{red} = \begin{cases} \left[bdry_{red}^{top}, bdry_{red}^{left}\right] & \text{for } W = H = 4 \text{ and} \\ & \quad \text{mode} < 18 \\ \left[bdry_{red}^{left}, bdry_{red}^{top}\right] & \text{for } W = H = 4 \text{ and} \\ & \quad \text{mode} \geq 18 \\ \left[bdry_{red}^{top}, bdry_{red}^{left}\right] & \text{for } \max(W, H) = 8 \text{ and} \\ & \quad \text{mode} < 10 \\ \left[bdry_{red}^{left}, bdry_{red}^{top}\right] & \text{for } \max(W, H) = 8 \text{ and} \\ & \quad \text{mode} \geq 10 \\ \left[bdry_{red}^{top}, bdry_{red}^{left}\right] & \text{for } \max(W, H) > 8 \text{ and} \\ & \quad \text{mode} < 6 \\ \left[bdry_{red}^{left}, bdry_{red}^{top}\right] & \text{for } \max(W, H) > 8 \text{ and} \\ & \quad \text{mode} \geq 6 \end{cases} \quad (2\text{-}2)$$

3.3.6.2 Matrix Multiplication

A matrix vector multiplication, followed by addition of an offset, is carried out with the averaged samples as an input. The result is a reduced prediction signal on a subsampled set of samples in the original block. Out of the reduced input vector $bdry_{red}$ a reduced prediction signal $pred_{red}$, which is a signal on the downsampled block of width $W_{red}$ and height $H_{red}$ is generated. Here, $W_{red}$ and $H_{red}$ are defined as:

$$W_{red} = \begin{cases} 4 & \text{for } \max(W, H) \leq 8 \\ \min(W, 8) & \text{for } \max(W, H) > 8 \end{cases} \quad (2\text{-}3)$$

$$H_{red} = \begin{cases} 4 & \text{for } \max(W, H) \leq 8 \\ \min(H, 8) & \text{for } \max(W, H) > 8 \end{cases} \quad (2\text{-}4)$$

The reduced prediction signal $pred_{red}$ is computed by calculating a matrix vector product and adding an offset:

$$pred_{red} = A \cdot bdary_{red} + b$$

Here, A is a matrix that has $W_{red} \cdot H_{red}$ rows and 4 columns if W=H=4 and 8 columns in all other cases. b is a vector of size $W_{red} \cdot H_{red}$. The matrix A and the offset vector b are taken from one of the sets $S_0$, $S_1$, $S_2$. One defines an index idx=idx(W,H) as follows:

$$idx(W, H) = \begin{cases} 0 & \text{for } W = H = 4 \\ 1 & \text{for } \max(W, H) = 8 \\ 2 & \text{for } \max(W, H) > 8 \end{cases} \quad (2\text{-}5)$$

Here, each coefficient of the matrix A is represented with 8 bit precision. The set $S_0$ consists of 16 matrices $$A_0^i, i \in \{0, \dots, 15\}$$

each of which has 16 rows and 4 columns and 16 offset vectors $$b_0^i, i \in \{0, \dots, 16\}$$

each of size 16. Matrices and offset vectors of that set are used for blocks of size 4×4. The set $S_1$ consists of 8 matrices $$A_1^i, i \in \{0, \dots, 7\},$$

each of which has 16 rows and 8 columns and 8 offset vectors $b_1^i, i \in \{0, \dots, 7\}$ each of size 16. The set $S_2$ consists of 6 matrices $A_2^i, i \in \{0, \dots, 5\},$ each of which has 64 rows and 8 columns and of 6 offset vectors $b_2^i, i \in \{0, \dots, 5\}$ of size 64.

3.3.6.3 Interpolation

The prediction signal at the remaining positions is generated from the prediction signal on the subsampled set by linear interpolation which is a single step linear interpolation in each direction. The interpolation is performed firstly in the horizontal direction and then in the vertical direction regardless of block shape or block size.

3.3.6.4 Signaling of MIP Mode and Harmonization with Other Coding Tools

For each Coding Unit (CU) in intra mode, a flag indicating whether an MIP mode is to be applied or not is sent. If an MIP mode is to be applied, MIP mode (predModeIntra) is signaled. For an MIP mode, a transposed flag (isTransposed), which determines whether the mode is transposed, and MIP mode Id (modeId), which determines which matrix is to be used for the given MIP mode is derived as follows isTransposed=predModeIntra&1 modeId=predModeIntra>>1 (2-6)

MIP coding mode is harmonized with other coding tools by considering following aspects:

LFNST is enabled for MIP on large blocks. Here, the LFNST transforms of planar mode are used The reference sample derivation for MIP is performed exactly as for the conventional intra prediction modes For the upsampling step used in the MIP-prediction, original reference samples are used instead of down-sampled ones Clipping is performed before upsampling and not after upsampling MIP is allowed up to 64×64 regardless of the maximum transform size The number of MIP modes is 32 for sizeId=0, 16 for sizeId=1 and 12 for sizeId=2

Inter Prediction

For each inter-predicted CU, motion parameters consisting of motion vectors, reference picture indices and reference picture list usage index, and additional information needed for the new coding feature of VVC to be used for inter-predicted sample generation. The motion parameter can be signalled in an explicit or implicit manner. When a CU is coded with skip mode, the CU is associated with one PU and has no significant residual coefficients, no coded motion vector delta or reference picture index. A merge mode is specified whereby the motion parameters for the current CU are obtained from neighbouring CUs, including spatial and temporal candidates, and additional schedules introduced in VVC. The merge mode can be applied to any inter-predicted CU, not only for skip mode. The alternative to merge mode is the explicit transmission of motion parameters, where motion vector, corresponding reference picture index for each reference picture list and reference picture list usage flag and other needed information are signalled explicitly per each CU.

Beyond the inter coding features in HEVC, VVC includes a number of new and refined inter prediction coding tools listed as follows:

Extended merge prediction

Merge mode with MVD (MMVD)

Symmetric MVD (SMVD) signalling

Affine motion compensated prediction

Subblock-based temporal motion vector prediction (SbTMVP)

Adaptive motion vector resolution (AMVR)

Motion field storage: $\frac{1}{16}^{th}$ luma sample MV storage and 8×8 motion field compression Bi-prediction with CU-level weight (BCW)

Bi-directional optical flow (BDOF)

Decoder side motion vector refinement (DMVR)

Geometric partitioning mode (GPM)

Combined inter and intra prediction (CIIP)

The following text provides the details on those inter prediction methods specified in VVC.

2.1..1. Extended merge prediction

In VVC, the merge candidate list is constructed by including the following five types of candidates in order:

1) Spatial MVP from spatial neighbour CUs

2) Temporal MVP from collocated CUs

3) History-based MVP from an FIFO table

4) Pairwise average MVP

5) Zero MVs.

The size of merge list is signalled in sequence parameter set header and the maximum allowed size of merge list is 6. For each CU code in merge mode, an index of best merge candidate is encoded using truncated unary binarization (TU). The first bin of the merge index is coded with context and bypass coding is used for other bins.

The derivation process of each category of merge candidates is provided in this session. As done in HEVC, VVC also supports parallel derivation of the merging candidate lists for all CUs within a certain size of area.

2.1..2. Spatial Candidates Derivation

Figure 11:
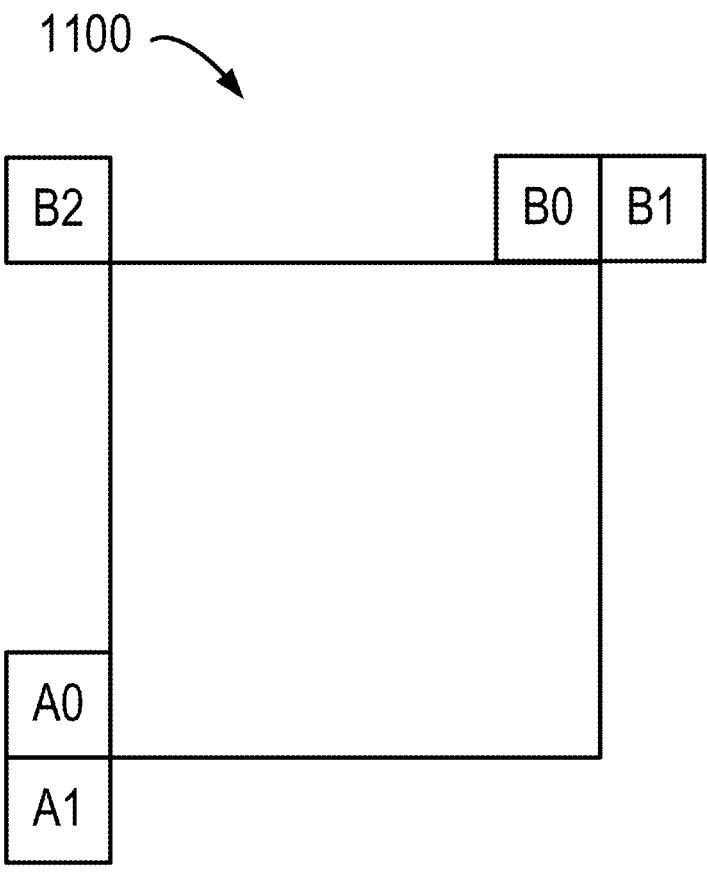
FIG. 11 is a schematic diagram illustrating positions of spatial merge candidate.
Figure 12:
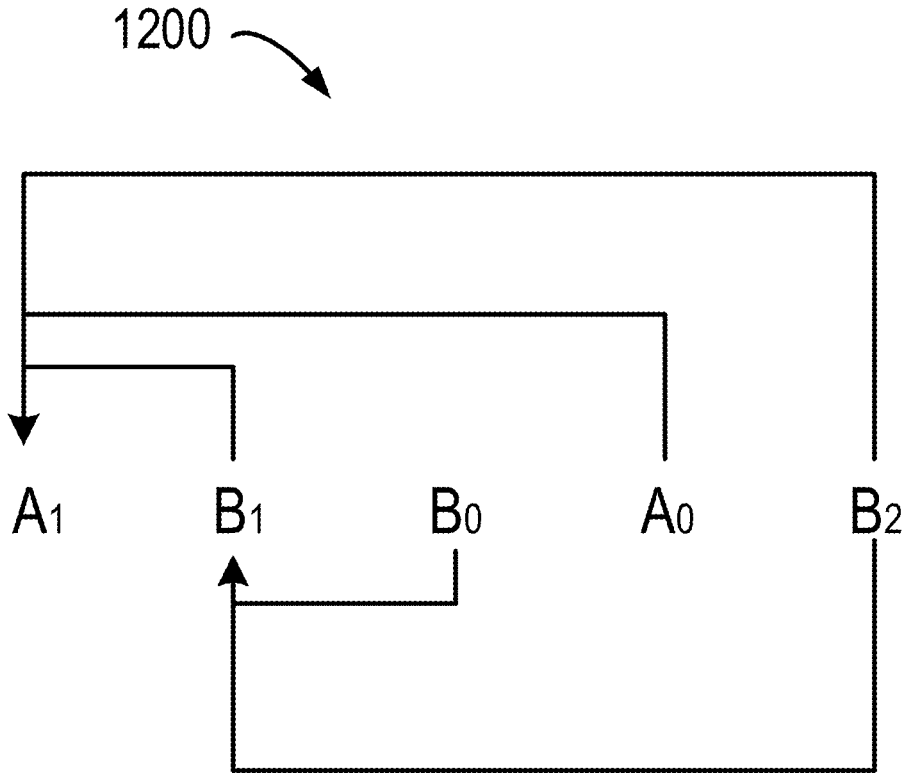
FIG. 12 is a schematic diagram illustrating candidate pairs considered for redundancy check of spatial merge candidates.

The derivation of spatial merge candidates in VVC is same to that in HEVC except the positions of first two merge candidates are swapped. A maximum of four merge candidates are selected among candidates located in the positions depicted in FIG. 11. FIG. 11 is a schematic diagram illustrating positions of spatial merge candidate. The order of derivation is $B_0, A_0, B_1, A_1$ and $B_2$. Position $B_2$ is considered only when one or more than one CUs of position $B_0, A_0, B_1, A_1$ are not available (e.g. because it belongs to another slice or tile) or is intra coded. After candidate at position $A_1$ is added, the addition of the remaining candidates is subject to a redundancy check which ensures that candidates with same motion information are excluded from the list so that coding efficiency is improved. To reduce computational complexity, not all possible candidate pairs are considered in the mentioned redundancy check. Instead only the pairs linked with an arrow in FIG. 12 are considered and a candidate is only added to the list if the corresponding candidate used for redundancy check has not the same motion information. FIG. 12 is a schematic diagram illustrating candidate pairs considered for redundancy check of spatial merge candidates.

2.1..3. Temporal Candidates Derivation

Figure 13:
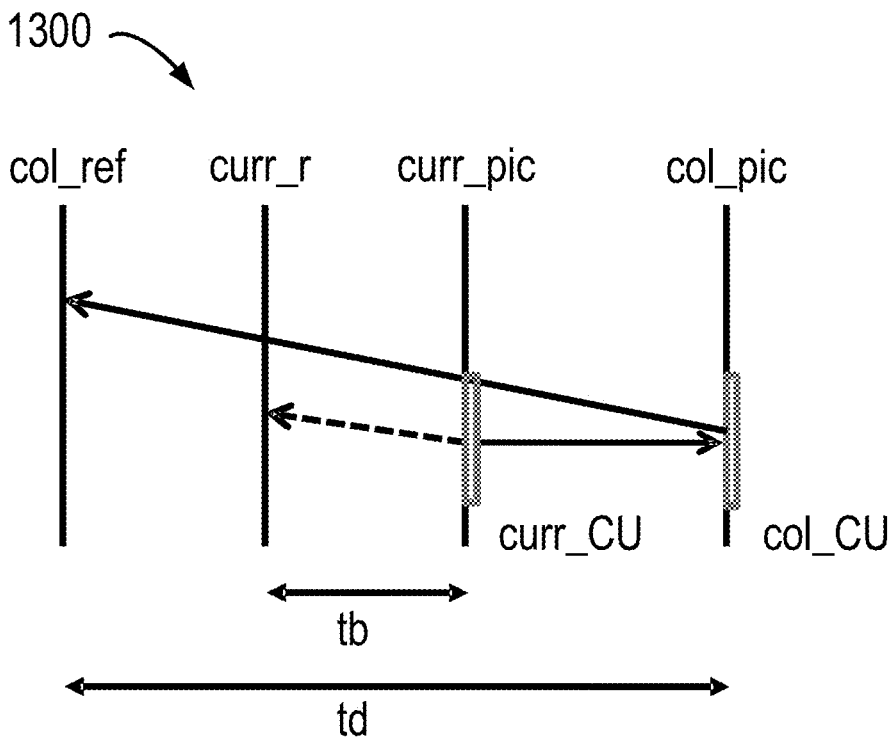
FIG. 13 is a schematic diagram illustrating illustration of motion vector scaling for temporal merge candidate.

In this step, only one candidate is added to the list. Particularly, in the derivation of this temporal merge candidate, a scaled motion vector is derived based on co-located CU belonging to the collocated referenncee picture. The reference picture list to be used for derivation of the co-located CU is explicitly signalled in the slice header. FIG. 13 is a schematic diagram illustrating illustration of motion vector scaling for temporal merge candidate. The scaled motion vector for temporal merge candidate is obtained as illustrated by the dotted line in FIG. 13, which is scaled from the motion vector of the co-located CU using the POC distances, tb and td, where tb is defined to be the POC difference between the reference picture of the current picture and the current picture and td is defined to be the POC difference between the reference picture of the co-located picture and the co-located picture. The reference picture index of temporal merge candidate is set equal to zero.

Figure 14:
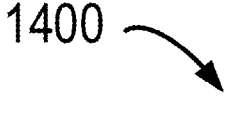
FIG. 14 is a schematic diagram illustrating candidate positions for temporal merge candidate, $C_0$ and $C_1$.
Figure 14:
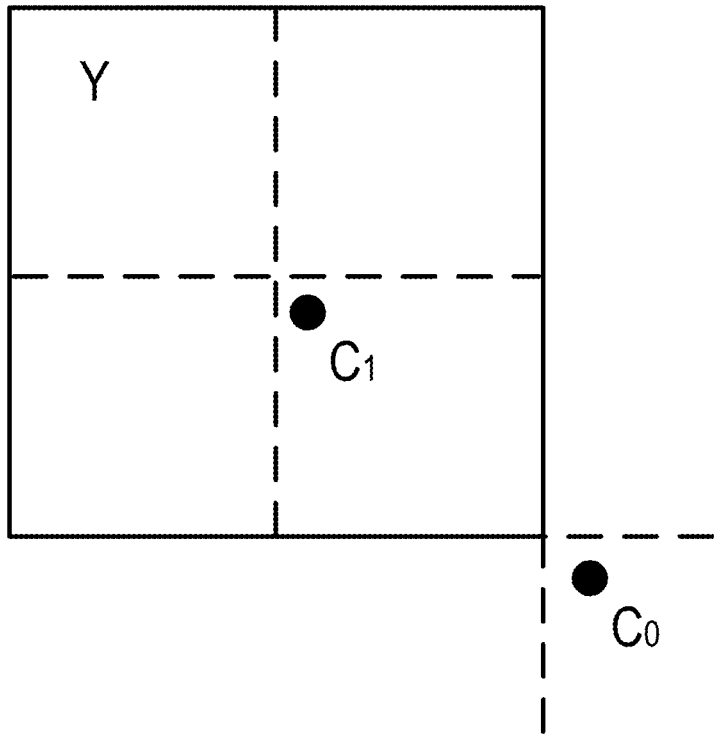

The position for the temporal candidate is selected between candidates $C_0$ and $C_1$, as depicted in FIG. 14. FIG. 14 is a schematic diagram illustrating candidate positions for temporal merge candidate, $C_0$ and $C_1$. If CU at position $C_0$ is not available, is intra coded, or is outside of the current row of CTUs, position $C_1$ is used. Otherwise, position $C_0$ is used in the derivation of the temporal merge candidate.

2.1..4. History-Based Merge Candidates Derivation

The history-based MVP (HMVP) merge candidates are added to merge list after the spatial MVP and TMVP. In this method, the motion information of a previously coded block is stored in a table and used as MVP for the current CU. The table with multiple HMVP candidates is maintained during the encoding/decoding process. The table is reset (emptied) when a new CTU row is encountered. Whenever there is a non-subblock inter-coded CU, the associated motion information is added to the last entry of the table as a new HMVP candidate.

The HMVP table size S is set to be 6, which indicates up to 6 History-based MVP (HMVP) candidates may be added to the table. When inserting a new motion candidate to the table, a constrained first-in-first-out (FIFO) rule is utilized wherein redundancy check is firstly applied to find whether there is an identical HMVP in the table. If found, the identical HMVP is removed from the table and all the HMVP candidates afterwards are moved forward, HMVP candidates could be used in the merge candidate list construction process. The latest several HMVP candidates in the table are checked in order and inserted to the candidate list after the TMVP candidate. Redundancy check is applied on the HMVP candidates to the spatial or temporal merge candidate.

To reduce the number of redundancy check operations, the following simplifications are introduced:

1. Number of HMPV candidates is used for merge list generation is set as (N<=4)? M: (8−N), wherein N indicates number of existing candidates in the merge list and M indicates number of available HMVP candidates in the table.

2. Once the total number of available merge candidates reaches the maximally allowed merge candidates minus 1, the merge candidate list construction process from HMVP is terminated.

2.1..5. Pair-Wise Average Merge Candidates Derivation

Pairwise average candidates are generated by averaging predefined pairs of candidates in the existing merge candidate list, and the predefined pairs are defined as {(0, 1), (0, 2), (1, 2), (0, 3), (1, 3), (2, 3)}, where the numbers denote the merge indices to the merge candidate list. The averaged motion vectors are calculated separately for each reference list. If both motion vectors are available in one list, these two motion vectors are averaged even when they point to different reference pictures; if only one motion vector is available, use the one directly; if no motion vector is available, keep this list invalid. When the merge list is not full after pair-wise average merge candidates are added, the zero MVPs are inserted in the end until the maximum merge candidate number is encountered.

2.1..6. Merge Estimation Region

Merge estimation region (MER) allows independent derivation of merge candidate list for the CUs in the same merge estimation region (MER). A candidate block that is within the same MER to the current CU is not included for the generation of the merge candidate list of the current CU. In addition, the updating process for the history-based motion vector predictor candidate list is updated only if (xCb+cbWidth)>>Log 2ParMrgLevel is greater than xCb>>Log 2ParMrgLevel and (yCb+cbHeight)>>Log 2ParMrgLevel is great than (yCb>>Log 2ParMrgLevel) and where (xCb, yCb) is the top-left luma sample position of the current CU in the picture and (cbWidth, cbHeight) is the CU size. The MER size is selected at encoder side and signalled as log2_parallel_merge_level_minus2 in the sequence parameter set.

Merge Mode with MVD (MMVD)

In addition to merge mode, where the implicitly derived motion information is directly used for prediction samples generation of the current CU, the merge mode with motion vector differences (MMVD) is introduced in VVC. A MMVD flag is signalled right after sending a skip flag and merge flag to specify whether MMVD mode is used for a CU.

In MMVD, after a merge candidate is selected, it is further refined by the signalled MVDs information. The further information includes a merge candidate flag, an index to specify motion magnitude, and an index for indication of motion direction. In MMVD mode, one for the first two candidates in the merge list is selected to be used as MV basis. The merge candidate flag is signalled to specify which one is used.

Figure 15:
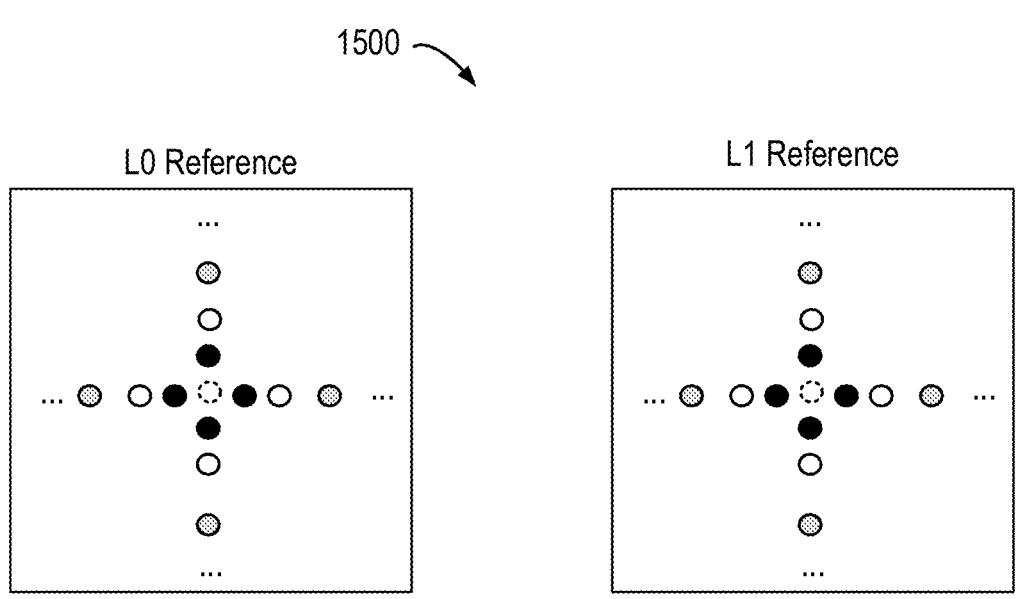
FIG. 15 is a schematic diagram illustrating MMVD search point.

Distance index specifies motion magnitude information and indicate the pre-defined offset from the starting point. FIG. 15 is a schematic diagram illustrating MMVD search point. As shown in FIG. 15, an offset is added to either horizontal component or vertical component of starting MV. The relation of distance index and pre-defined offset is specified in Table 2-5

TABLE 2-5

| The relation of distance index and pre-defined offset | | | | | | | | |
|---|---|---|---|---|---|---|---|---|
| Distance IDX | 0 | 1 | 2 | 3 | 4 | 5 | 6 | 7 |
| Offset (in unit of luma sample) | $\frac{1}{4}$ | $\frac{1}{2}$ | 1 | 2 | 4 | 8 | 16 | 32 |

Direction index represents the direction of the MVD relative to the starting point. The direction index can represent of the four directions as shown in Table 2-6. It's noted that the meaning of MVD sign could be variant according to the information of starting MVs. When the starting MVs is an un-prediction MV or bi-prediction MVs with both lists point to the same side of the current picture (i.e. POCs of two references are both larger than the POC of the current picture, or are both smaller than the POC of the current picture), the sign in Table 2-6 specifies the sign of MV offset added to the starting MV. When the starting MVs is bi-prediction MVs with the two MVs point to the different sides of the current picture (i.e. the POC of one reference is larger than the POC of the current picture, and the POC of the other reference is smaller than the POC of the current picture), the sign in Table 2-6 specifies the sign of MV offset added to the listO MV component of starting MV and the sign for the listl MV has opposite value.

TABLE 2-6

Sign of MV offset specified by direction index

| Direction IDX | 00 | 01 | 10 | 11 |
|---|---|---|---|---|
| x-axis | + | − | N/A | N/A |
| y-axis | N/A | N/A | + | − |

2.1..1. Bi-Prediction with CU-Level Weight (BCVV)

In HEVC, the bi-prediction signal is generated by averaging two prediction signals obtained from two different reference pictures and/or using two different motion vectors. In VVC, the bi-prediction mode is extended beyond simple averaging to allow weighted averaging of the two prediction signals.

$$P_{bi\text{-}pred}=((8-w)*P_0+w*P_1+4)>>3 \qquad (2\text{-}7)$$

Five weights are allowed in the weighted averaging bi-prediction, $w \in \{-2, 3, 4, 5, 10\}$. For each bi-predicted CU, the weight w is determined in one of two ways: 1) for a non-merge CU, the weight index is signalled after the motion vector difference; 2) for a merge CU, the weight index is inferred from neighbouring blocks based on the merge candidate index. BCW is only applied to CUs with 256 or more luma samples (i.e., CU width times CU height is greater than or equal to 256). For low-delay pictures, all 5 weights are used. For non-low-delay pictures, only 3 weights ($w \in \{3,4,5\}$) are used.

At the encoder, fast search algorithms are applied to find the weight index without significantly increasing the encoder complexity. These algorithms are summarized as follows. When combined with AMVR, unequal weights are only conditionally checked for 1-pel and 4-pel motion vector precisions if the current picture is a low-delay picture.

When combined with affine, affine ME will be performed for unequal weights if and only if the affine mode is selected as the current best mode.

When the two reference pictures in bi-prediction are the same, unequal weights are only conditionally checked.

Unequal weights are not searched when certain conditions are met, depending on the POC distance between current picture and its reference pictures, the coding QP, and the temporal level.

The BCW weight index is coded using one context coded bin followed by bypass coded bins. The first context coded bin indicates if equal weight is used; and if unequal weight is used, additional bins are signalled using bypass coding to indicate which unequal weight is used.

Weighted prediction (WP) is a coding tool supported by the H.264/AVC and HEVC standards to efficiently code video content with fading. Support for WP was also added into the VVC standard. WP allows weighting parameters (weight and offset) to be signalled for each reference picture in each of the reference picture lists L0 and L1. Then, during motion compensation, the weight(s) and offset(s) of the corresponding reference picture(s) are applied. WP and BCW are designed for different types of video content. In order to avoid interactions between WP and BCW, which will complicate VVC decoder design, if a CU uses WP, then the BCW weight index is not signalled, and w is inferred to be 4 (i.e. equal weight is applied). For a merge CU, the weight index is inferred from neighbouring blocks based on the merge candidate index. This can be applied to both normal merge mode and inherited affine merge mode. For constructed affine merge mode, the affine motion information is constructed based on the motion information of up to 3 blocks. The BCW index for a CU using the constructed affine merge mode is simply set equal to the BCW index of the first control point MV.

In VVC, CIIP and BCW cannot be jointly applied for a CU. When a CU is coded with CIIP mode, the BCW index of the current CU is set to 2, e.g. equal weight.

2.1..2. Bi-Directional Optical Flow (BDOF)

The bi-directional optical flow (BDOF) tool is included in VVC. BDOF, previously referred to as BIO, was included in the JEM. Compared to the JEM version, the BDOF in VVC is a simpler version that requires much less computation, especially in terms of number of multiplications and the size of the multiplier.

BDOF is used to refine the bi-prediction signal of a CU at the 4×4 subblock level. BDOF is applied to a CU if it satisfies all the following conditions:

The CU is coded using "true" bi-prediction mode, i.e., one of the two reference pictures is prior to the current picture in display order and the other is after the current picture in display order The distances (i.e. POC difference) from two reference pictures to the current picture are same Both reference pictures are short-term reference pictures.

The CU is not coded using affine mode or the ATMVP merge mode

CU has more than 64 luma samples

Both CU height and CU width are larger than or equal to 8 luma samples

BCW weight index indicates equal weight

WP is not enabled for the current CU

CIIP mode is not used for the current CU

BDOF is only applied to the luma component. As its name indicates, the BDOF mode is based on the optical flow concept, which assumes that the motion of an object is smooth. For each 4×4 subblock, a motion refinement $(v_x, v_y)$ is calculated by minimizing the difference between the L0 and L1 prediction samples. The motion refinement is then used to adjust the bi-predicted sample values in the 4×4 subblock. The following steps are applied in the BDOF process.

$$\frac{\partial I^{(k)}}{\partial x}(i,j) \text{ and } \frac{\partial I^{(k)}}{\partial y}(i,j), k=0,1,$$

First, the horizontal and vertical gradients of the two prediction signals are computed by directly calculating the difference between two neighboring samples, i.e., $$\frac{\partial I^{(k)}}{\partial x}(i,j) = \left(\left(I^{(k)}(i+1,j)\gg shift1\right) - \left(I^{(k)}(i-1,j)\gg shift1\right)\right) \qquad (2\text{-}8)$$

$$\frac{\partial I^{(k)}}{\partial y}(i,j) = \left(\left(I^{(k)}(i,j+1)\gg shift1\right) - \left(I^{(k)}(i,j-1)\gg shift1\right)\right)$$

where $I^{(k)}(i,j)$ are the sample value at coordinate $(i,j)$ of the prediction signal in list k, k=0,1, and shift1 is calculated based on the luma bit depth, bitDepth, as shift1=max(6, bitDepth-6).

Then, the auto- and cross-correlation of the gradients, $S_1$, $S_2$, $S_3$, $S_5$ and $S_6$, are calculated as $$S_1 = \sum_{(i,j)\in\Omega} \text{Abs}(\psi_x(i,j)), \qquad (2-9)$$

$$S_3 = \sum_{(i,j)\in\Omega} \theta(i,j) \cdot \text{Sign}(\psi_x(i,j))$$

$$S_2 = \sum_{(i,j)\in\Omega} \psi_x(i,j) \cdot \text{Sign}(\psi_y(i,j))$$

$$S_5 = \sum_{(i,j)\in\Omega} \text{Abs}(\psi_y(i,j)),$$

$$S_6 = \sum_{(i,j)\in\Omega} \theta(i,j) \cdot \text{Sign}(\psi_y(i,j))$$

where $$\psi_x(i,j) = \left(\frac{\partial I^{(1)}}{\partial x}(i,j) + \frac{\partial I^{(0)}}{\partial x}(i,j)\right) \gg n_a \qquad (2-10)$$

$$\psi_y(i,j) = \left(\frac{\partial I^{(1)}}{\partial y}(i,j) + \frac{\partial I^{(0)}}{\partial y}(i,j)\right) \gg n_a$$

$$\theta(i,j) = \left(I^{(1)}(i,j) \gg n_b\right) - \left(I^{(0)}(i,j) \gg n_b\right)$$

where $\Omega$ is a 6×6 window around the 4×4 subblock, and the values of $n_a$ and $n_b$ are set equal to min(1, bitDepth−11) and min(4, bitDepth−8), respectively.

The motion refinement $(v_x, v_y)$ is then derived using the cross- and auto-correlation terms using the following:

$$v_x = S_1 > 0 ? clip3(-th'_{BIO}, th'_{BIO}, -((S_3 \cdot 2^{n_b-n_a}) \gg \lfloor \log_2 S_1 \rfloor)):0 \qquad (2-11)$$

$$v_y = S_5 > 0 ? clip3$$

$$(-th'_{BIO}, th'_{BIO}, -((S_6 \cdot 2^{n_b-n_a} - ((v_x S_{2,m}) \ll n_{s_2} + v_x S_{2,s})/2) \gg \lfloor \log_2 S_5 \rfloor)):0$$

where $$S_{2,m} = S_2 \gg n_{S_2}, S_{2,s} = S_2 \,\&\, (2^{n_{S_2}} - 1), th'_{BIO} = 2^{max(5,BD-7)} \cdot \lfloor \cdot \rfloor$$

is the floor function, and $n_{S_2}$=12.

Based on the motion refinement and the gradients, the following adjustment is calculated for each sample in the 4×4 subblock:

$$b(x,y) = rnd\left(\left(v_x\left(\frac{\partial I^{(1)}(x,y)}{\partial x} - \frac{\partial I^{(0)}(x,y)}{\partial x}\right) + \qquad (2-12)\right.\right.$$

$$\left.\left. v_y\left(\frac{\partial I^{(1)}(x,y)}{\partial y} - \frac{\partial I^{(0)}(x,y)}{\partial y}\right) + 1\right)/2\right)$$

Finally, the BDOF samples of the CU are calculated by adjusting the bi-prediction samples as follows:

$$\text{pred}_{BDOF}(x,y) = (I^{(0)}(x,y) + I^{(1)}(x,y) + b(x,y) + o_{offset}) \gg \text{shift} \qquad (2-13)$$

These values are selected such that the multipliers in the BDOF process do not exceed 15-bit, and the maximum bit-width of the intermediate parameters in the BDOF process is kept within 32-bit.

Figure 16:
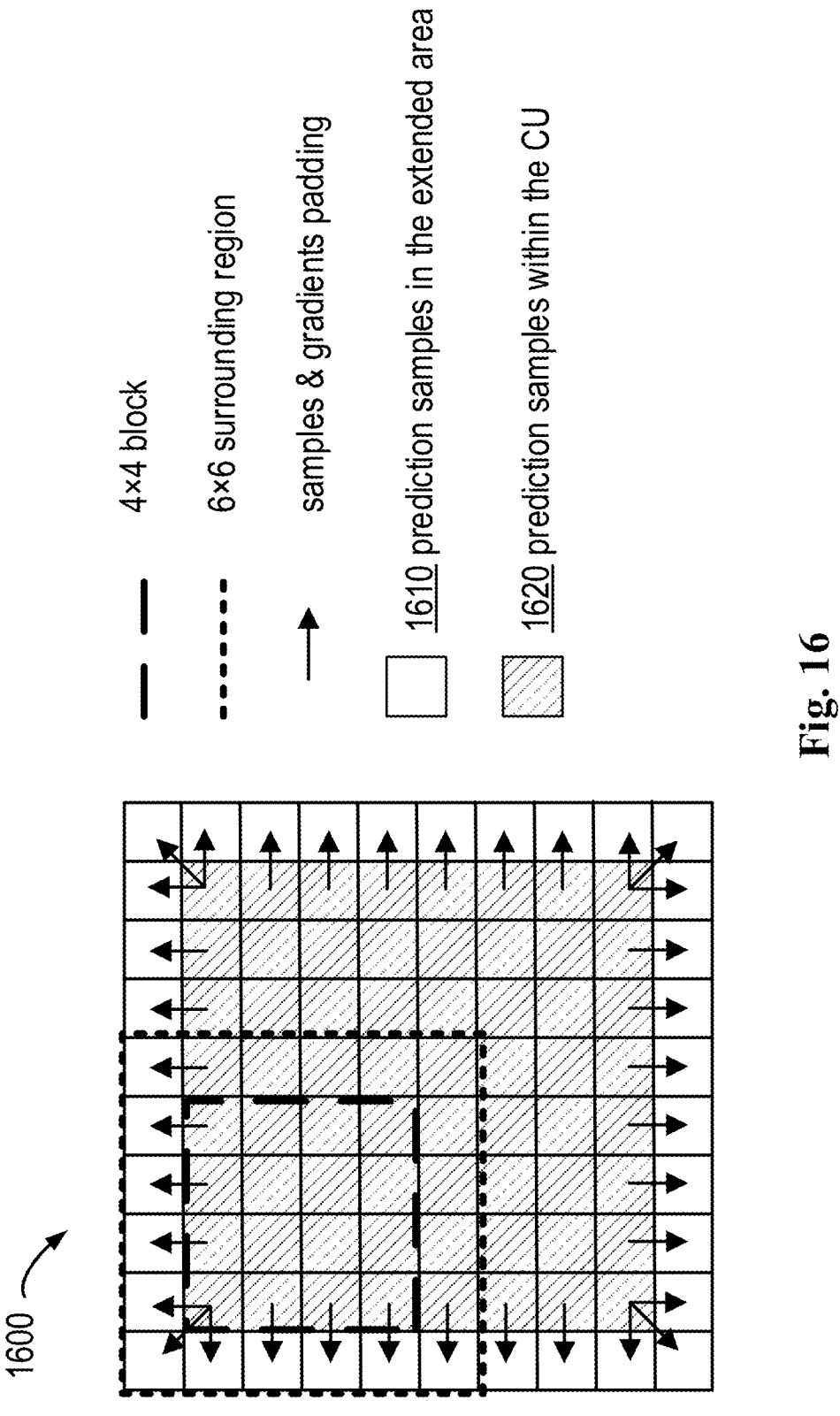
FIG. 16 is a schematic diagram illustrating extended CU region used in BDOF.

In order to derive the gradient values, some prediction samples $I^{(k)}(i,j)$ in list k (k=0,1) outside of the current CU boundaries need to be generated. FIG. 16 is a schematic diagram illustrating extended CU region used in BDOF. As depicted in FIG. 16, the BDOF in VVC uses one extended row/column around the CU's boundaries. In order to control the computational complexity of generating the out-of-boundary prediction samples, prediction samples in the extended area (white positions) are generated by taking the reference samples at the nearby integer positions (using floor( ) operation on the coordinates) directly without interpolation, and the normal 8-tap motion compensation interpolation filter is used to generate prediction samples within the CU (gray positions). These extended sample values are used in gradient calculation only. For the remaining steps in the BDOF process, if any sample and gradient values outside of the CU boundaries are needed, they are padded (i.e. repeated) from their nearest neighbors.

When the width and/or height of a CU are larger than 16 luma samples, it will be split into subblocks with width and/or height equal to 16 luma samples, and the subblock boundaries are treated as the CU boundaries in the BDOF process. The maximum unit size for BDOF process is limited to 16×16. For each subblock, the BDOF process could skipped. When the SAD of between the initial L0 and L1 prediction samples is smaller than a threshold, the BDOF process is not applied to the subblock. The threshold is set equal to (8*W*(H>>1), where W indicates the subblock width, and H indicates subblock height. To avoid the additional complexity of SAD calculation, the SAD between the initial L0 and L1 prediction samples calculated in DVMR process is re-used here.

If BCW is enabled for the current block, i.e., the BCW weight index indicates unequal weight, then bi-directional optical flow is disabled. Similarly, if WP is enabled for the current block, i.e., the luma_weight_lx_flag is 1 for either of the two reference pictures, then BDOF is also disabled. When a CU is coded with symmetric MVD mode or CIIP mode, BDOF is also disabled.

Symmetric MVD Coding

In VVC, besides the normal unidirectional prediction and bi-directional prediction mode MVD signalling, symmetric MVD mode for bi-predictional MVD signalling is applied. In the symmetric MVD mode, motion information including reference picture indices of both list-0 and list-1 and MVD of list-1 are not signaled but derived.

The decoding process of the symmetric MVD mode is as follows:

1) At slice level, variables BiDirPredFlag, RefldxSymL0 and RefldxSymL1 are derived as follows:
   If mvd_l1_zero_flag is 1, BiDirPredFlag is set equal to 0.
   Otherwise, if the nearest reference picture in list-0 and the nearest reference picture in list-1 form a forward and backward pair of reference pictures or a backward and forward pair of reference pictures, BiDirPredFlag is set to 1, and both list-0 and list-1 reference pictures are short-term reference pictures. Otherwise BiDirPredFlag is set to 0.

2) At CU level, a symmetrical mode flag indicating whether symmetrical mode is used or not is explicitly signaled if the CU is bi-prediction coded and BiDirPredFlag is equal to 1.

When the symmetrical mode flag is true, only mvp_l0_flag, mvp_l1_flag and MVD0 are explicitly signaled. The reference indices for list-0 and list-1 are set equal to the pair of reference pictures, respectively. MVD1 is set equal to (−MVD0). The final motion vectors are shown in below formula.

$$\begin{cases} (mvx_0, mvy_0) = (mvpx_0 + mvdx_0, mvpy_0 + mvdy_0) \\ (mvx_1, mvy_1) = (mvpx_1 - mvdx_0, mvpy_1 - mvdy_0) \end{cases} \tag{2-14}$$

Figure 17:
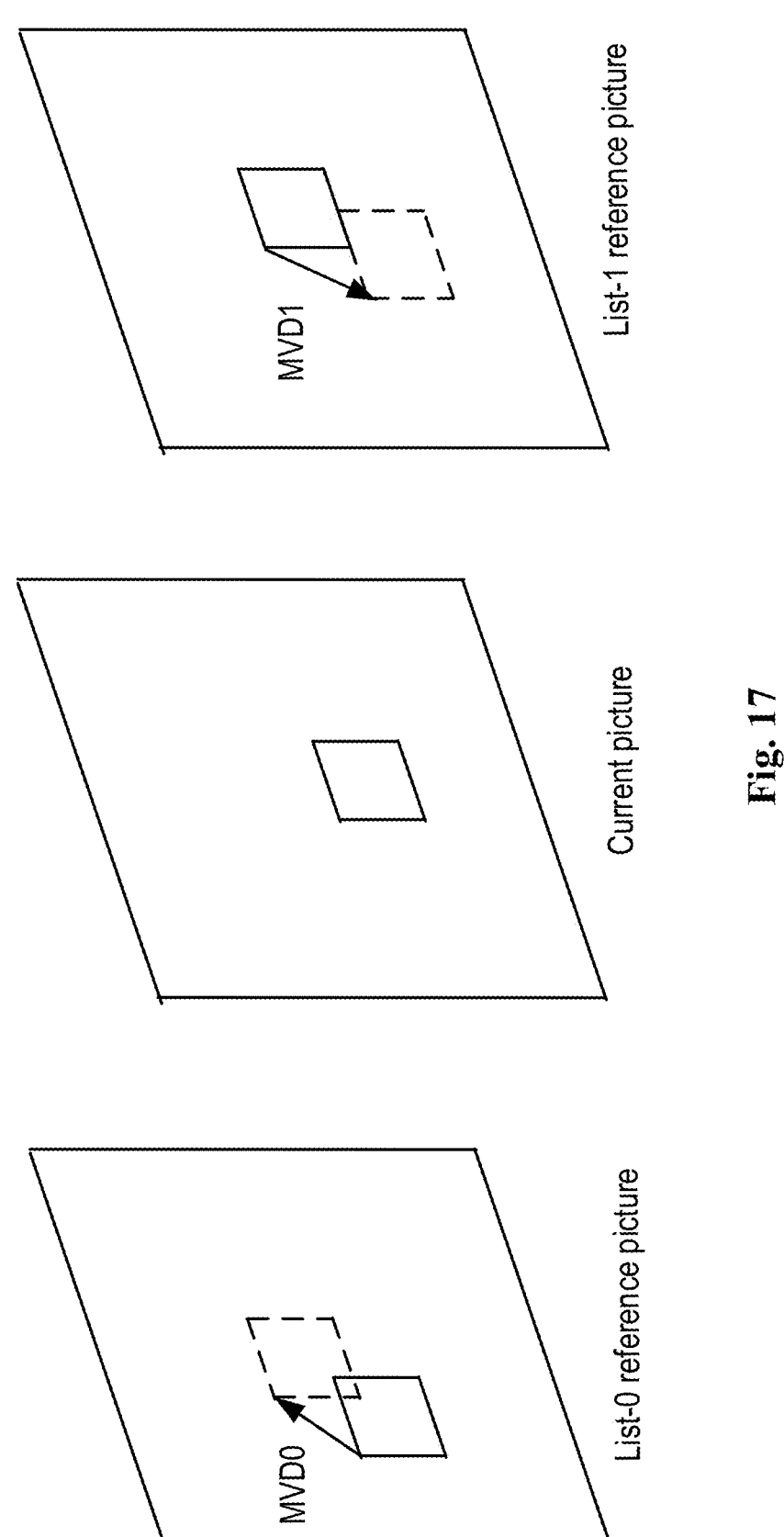
FIG. 17 is a schematic diagram illustrating illustration for symmetrical MVD mode.

FIG. 17 is a schematic diagram illustrating illustration for symmetrical MVD mode. In the encoder, symmetric MVD motion estimation starts with initial MV evaluation. A set of initial MV candidates comprising of the MV obtained from uni-prediction search, the MV obtained from bi-prediction search and the MVs from the AMVP list. The one with the lowest rate-distortion cost is chosen to be the initial MV for the symmetric MVD motion search.

Decoder Side Motion Vector Refinement (DMVR)

Figure 18:
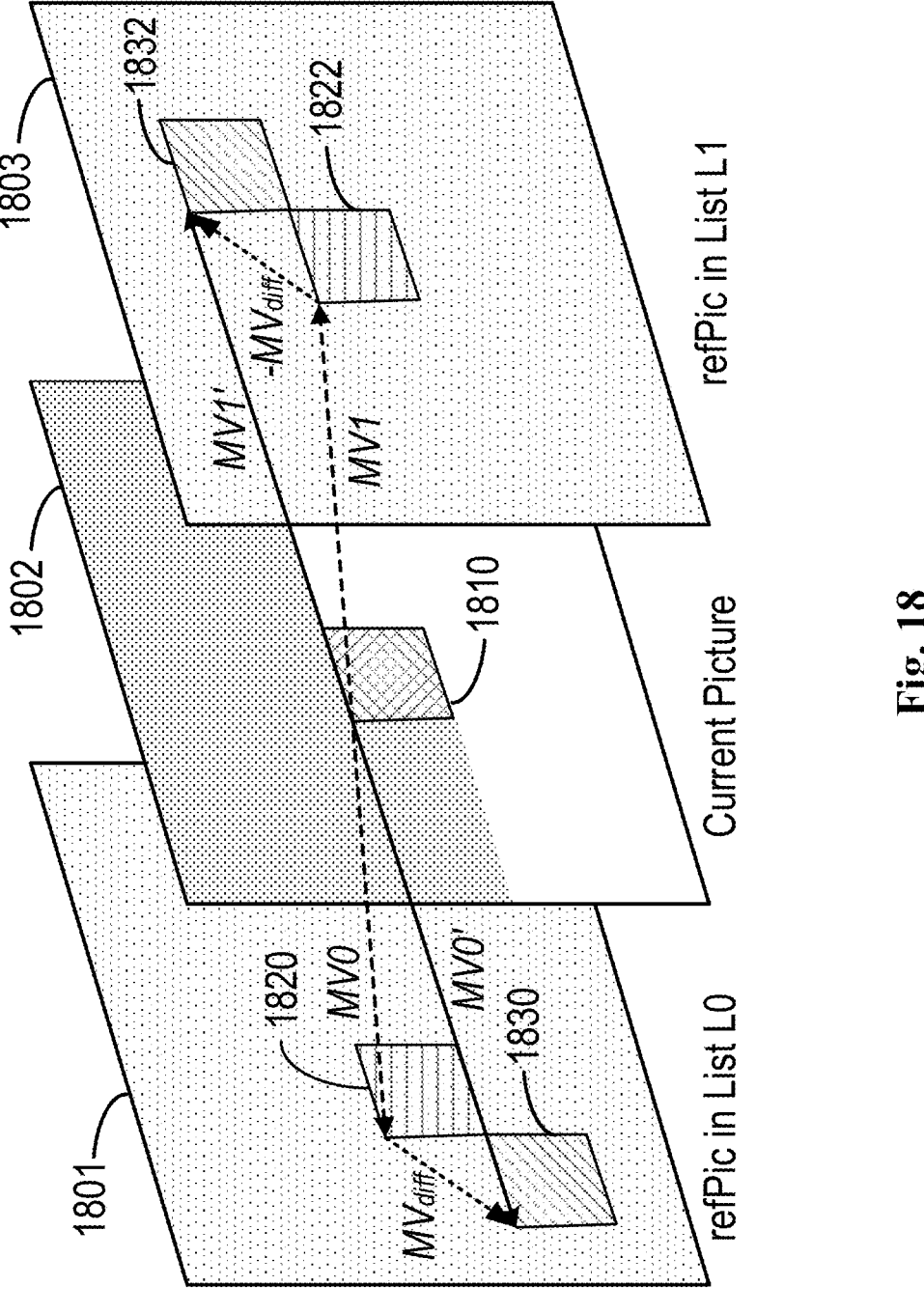
FIG. 18 is a schematic diagram illustrating decoding side motion vector refinement.

In order to increase the accuracy of the MVs of the merge mode, a bilateral-matching based decoder side motion vector refinement is applied in VVC. In bi-prediction operation, a refined MV is searched around the initial MVs in the reference picture list L0 and reference picture list L1. The BM method calculates the distortion between the two candidate blocks in the reference picture list L0 and list L1. FIG. 18 is a schematic diagram illustrating decoding side motion vector refinement. As illustrated in FIG. 18, the SAD between the blocks 1830 and 1832 based on each MV candidate around the initial MV is calculated. The MV candidate with the lowest SAD becomes the refined MV and used to generate the bi-predicted signal.

In VVC, the DMVR can be applied for the CUs which are coded with following modes and features:

CU level merge mode with bi-prediction MV

One reference picture is in the past and another reference picture is in the future with respect to the current picture The distances (i.e. POC difference) from two reference pictures to the current picture are same Both reference pictures are short-term reference pictures CU has more than 64 luma samples Both CU height and CU width are larger than or equal to 8 luma samples BCW weight index indicates equal weight WP is not enabled for the current block CIIP mode is not used for the current block The refined MV derived by DMVR process is used to generate the inter prediction samples and also used in temporal motion vector prediction for future pictures coding. While the original MV is used in deblocking process and also used in spatial motion vector prediction for future CU coding.

The additional features of DMVR are mentioned in the following sub-clauses.

2.1..1. Searching Scheme

In DVMR, the search points are surrounding the initial MV and the MV offset obey the MV difference mirroring rule. In other words, any points that are checked by DMVR, denoted by candidate MV pair (MV0, MV1) obey the following two equations:

$$MV0'=MV0+MV\_offset \tag{2-15}$$

$$MV1'=MV1-MV\_offset \tag{2-16}$$

Where MV_offset represents the refinement offset between the initial MV and the refined MV in one of the reference pictures. The refinement search range is two integer luma samples from the initial MV. The searching includes the integer sample offset search stage and fractional sample refinement stage.

25 points full search is applied for integer sample offset searching. The SAD of the initial MV pair is first calculated. If the SAD of the initial MV pair is smaller than a threshold, the integer sample stage of DMVR is terminated. Otherwise SADs of the remaining 24 points are calculated and checked in raster scanning order. The point with the smallest SAD is selected as the output of integer sample offset searching stage. To reduce the penalty of the uncertainty of DMVR refinement, it is proposed to favor the original MV during the DMVR process. The SAD between the reference blocks referred by the initial MV candidates is decreased by ¼ of the SAD value.

The integer sample search is followed by fractional sample refinement. To save the calculational complexity, the fractional sample refinement is derived by using parametric error surface equation, instead of additional search with SAD comparison. The fractional sample refinement is conditionally invoked based on the output of the integer sample search stage. When the integer sample search stage is terminated with center having the smallest SAD in either the first iteration or the second iteration search, the fractional sample refinement is further applied.

In parametric error surface based sub-pixel offsets estimation, the center position cost and the costs at four neighboring positions from the center are used to fit a 2-D parabolic error surface equation of the following form $$E(x,y)=A(x-x_{min})^2+B(y-y_{min})^2+C \tag{2-17}$$

where $(x_{min}, y_{min})$ corresponds to the fractional position with the least cost and C corresponds to the minimum cost value. By solving the above equations by using the cost value of the five search points, the $(x_{min}, y_{min})$ is computed as:

$$x_{min}=(E(-1,0)-E(1,0))/(2(E(-1,0)+E(1,0)-2E(0,0))) \tag{2-18}$$

$$y_{min}=(E(0,-1)-E(0,1))/(2((0,-1)+E(0,1)-2E(0,0))) \tag{2-19}$$

The value of $x_{min}$ and $y_{min}$ are automatically constrained to be between −8 and 8 since all cost values are positive and the smallest value is E (0,0). This corresponds to half peal offset with 1/16th-pel MV accuracy in VVC. The computed fractional $(x_{min}, y_{min})$ are added to the integer distance refinement MV to get the sub-pixel accurate refinement delta MV.

2.1..2. Bilinear-Interpolation and Sample Padding

In VVC, the resolution of the MVs is 1/16 luma samples. The samples at the fractional position are interpolated using a 8-tap interpolation filter. In DMVR, the search points are surrounding the initial fractional-pel MV with integer sample offset, therefore the samples of those fractional position need to be interpolated for DMVR search process. To reduce the calculation complexity, the bi-linear interpolation filter is used to generate the fractional samples for the searching process in DMVR. Another important effect is that by using bi-linear filter is that with 2-sample search range, the DVMR does not access more reference samples compared to the normal motion compensation process. After the refined MV is attained with DMVR search process, the normal 8-tap interpolation filter is applied to generate the final prediction. In order to not access more reference samples to normal MC process, the samples, which is not needed for the interpolation process based on the original MV but is needed for the interpolation process based on the refined MV, will be padded from those available samples.

2.1..3. Maximum DMVR Processing Unit

When the width and/or height of a CU are larger than 16 luma samples, it will be further split into subblocks with width and/or height equal to 16 luma samples. The maximum unit size for DMVR searching process is limit to 16×16.

Combined Inter and Intra Prediction (CIIP)

Figure 19:
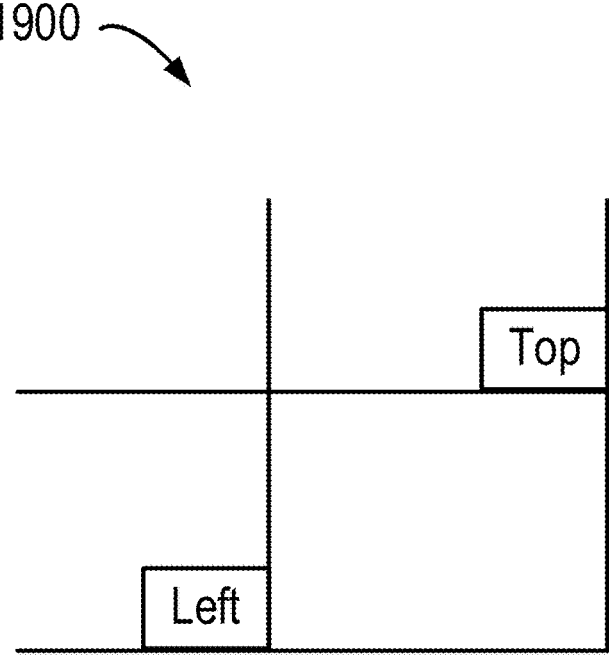
FIG. 19 is a schematic diagram illustrating top and left neighboring blocks used in CIIP weight derivation.

In VVC, when a CU is coded in merge mode, if the CU contains at least 64 luma samples (that is, CU width times CU height is equal to or larger than 64), and if both CU width and CU height are less than 128 luma samples, an additional flag is signalled to indicate if the combined inter/intra prediction (CIIP) mode is applied to the current CU. As its name indicates, the CIIP prediction combines an inter prediction signal with an intra prediction signal. The inter prediction signal in the CIIP mode $P_{inter}$ is derived using the same inter prediction process applied to regular merge mode; and the intra prediction signal $P_{intra}$ is derived following the regular intra prediction process with the planar mode. Then, the intra and inter prediction signals are combined using weighted averaging, where the weight value is calculated depending on the coding modes of the top and left neighbouring blocks (depicted in FIG. 19, FIG. 19 is a schematic diagram illustrating top and left neighboring blocks used in CIIP weight derivation.) as follows:

If the top neighbor is available and intra coded, then set isIntraTop to 1, otherwise set isIntraTop to 0;
If the left neighbor is available and intra coded, then set isIntraLeft to 1, otherwise set isIntraLeft to 0;
If (isIntraLeft+isIntraTop) is equal to 2, then wt is set to 3;
Otherwise, if (isIntraLeft+isIntraTop) is equal to 1, then wt is set to 2;
Otherwise, set wt to 1.

The CIIP prediction is formed as follows:

$$P_{CIIP}=((4-wt)*P_{inter}+wt*P_{intra}+2)>>2 \qquad (2\text{-}20)$$

Geometric Partitioning Mode (GPM)

In VVC, a geometric partitioning mode is supported for inter prediction. The geometric partitioning mode is signalled using a CU-level flag as one kind of merge mode, with other merge modes including the regular merge mode, the MMVD mode, the CIIP mode and the subblock merge mode. In total 64 partitions are supported by geometric partitioning mode for each possible CU size w×h=$2^m$×$2^n$ with m, n∈{3 . . . 6} excluding 8×64 and 64×8.

Figure 20:
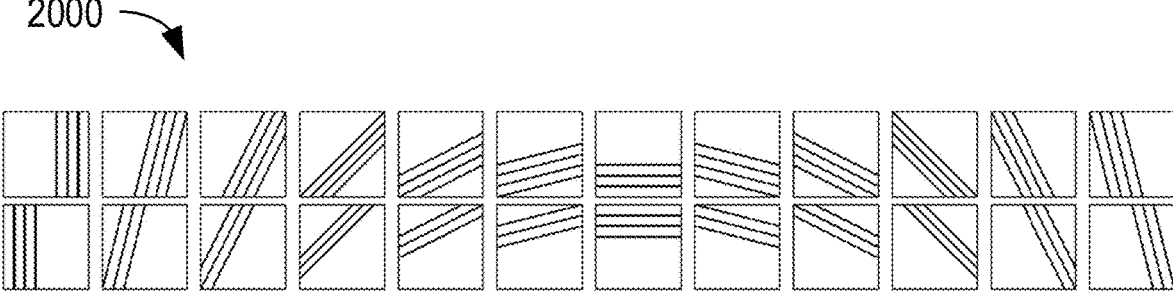
FIG. 20 is a schematic diagram illustrating examples of the GPM splits grouped by identical angles.

When this mode is used, a CU is split into two parts by a geometrically located straight line (as shown in FIG. 20). FIG. 20 is a schematic diagram illustrating examples of the GPM splits grouped by identical angles. The location of the splitting line is mathematically derived from the angle and offset parameters of a specific partition. Each part of a geometric partition in the CU is inter-predicted using its own motion; only uni-prediction is allowed for each partition, that is, each part has one motion vector and one reference index. The uni-prediction motion constraint is applied to ensure that same as the conventional bi-prediction, only two motion compensated prediction are needed for each CU.

If geometric partitioning mode is used for the current CU, then a geometric partition index indicating the partition mode of the geometric partition (angle and offset), and two merge indices (one for each partition) are further signalled. The number of maximum GPM candidate size is signalled explicitly in SPS and specifies syntax binarization for GPM merge indices. After predicting each of part of the geometric partition, the sample values along the geometric partition edge are adjusted using a blending processing with adaptive weights. This is the prediction signal for the whole CU, and transform and quantization process will be applied to the whole CU as in other prediction modes. Finally, the motion field of a CU predicted using the geometric partition modes is stored.

2.1..1. Uni-Prediction Candidate List Construction

Figure 21:
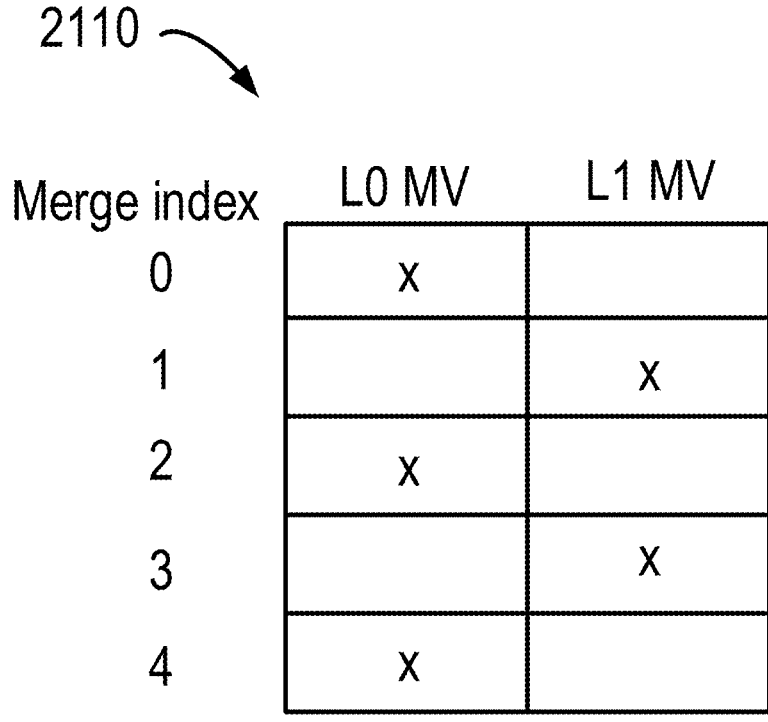
FIG. 21 is a schematic diagram illustrating uni-prediction MV selection for geometric partitioning mode.

The uni-prediction candidate list is derived directly from the merge candidate list constructed according to the extended merge prediction process. Denote n as the index of the uni-prediction motion in the geometric uni-prediction candidate list. The LX motion vector of the n-th extended merge candidate, with X equal to the parity of n, is used as the n-th uni-prediction motion vector for geometric partitioning mode. These motion vectors are marked with "x" in FIG. 21. FIG. 21 is a schematic diagram illustrating uni-prediction MV selection for geometric partitioning mode. In case a corresponding LX motion vector of the n-th extended merge candidate does not exist, the L(1−X) motion vector of the same candidate is used instead as the uni-prediction motion vector for geometric partitioning mode.

2.1..2. Blending Along the Geometric Partitioning Edge

After predicting each part of a geometric partition using its own motion, blending is applied to the two prediction signals to derive samples around geometric partition edge. The blending weight for each position of the CU are derived based on the distance between individual position and the partition edge.

The distance for a position (x, y) to the partition edge are derived as:

$$d(x, y) = (2x + 1 - w)\cos(\varphi_i) + (2y + 1 - h)\sin(\varphi_i) - \rho_j \qquad (2\text{-}21)$$

$$\rho_j = \rho_{x,j}\cos(\varphi_i) + \rho_{y,j}\sin(\varphi_i) \qquad (2\text{-}22)$$

$$\rho_{x,j} = \begin{cases} 0 & i\ \%\ 16 = 8\ \text{or} \\ & (i\ \%\ 16 \neq 0\ \text{and}\ h \geq w) \\ \pm(j \times w)\gg 2 & \text{otherwise} \end{cases} \qquad (2\text{-}23)$$

$$\rho_{y,j} = \begin{cases} \pm(j \times h)\gg 2 & i\ \%\ 16 = 8\ \text{or} \\ & (i\ \%\ 16 \neq 0\ \text{and}\ h \geq w) \\ 0 & \text{otherwise} \end{cases} \qquad (2\text{-}24)$$

where i, j are the indices for angle and offset of a geometric partition, which depend on the signaled geometric partition index. The sign of $\rho_{x,j}$ and $\rho_{y,j}$ depend on angle index i.

The weights for each part of a geometric partition are derived as following:

$$wIdxL(x, y) = partIdx\ ?\ 32 + d(x, y):\ 32 - d(x, y) \qquad (2\text{-}25)$$

$$w_0(x, y) = \frac{Clip3(0, 8, (wIdxL(x, y) + 4)\gg 3)}{8} \qquad (2\text{-}26)$$

$$w_1(x, y) = 1 - w_0(x, y) \qquad (2\text{-}27)$$

Figure 22:
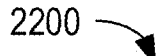
FIG. 22 is a schematic diagram illustrating exemplified generation of a bending weight $w_0$ using geometric partitioning mode.
Figure 22:
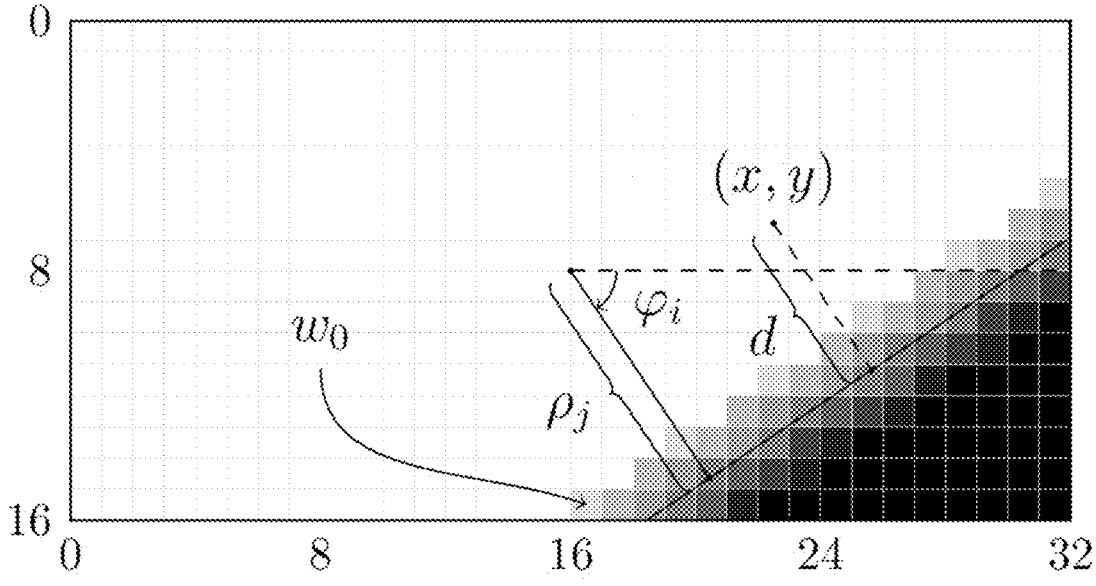

The partIdx depends on the angle index i. One example of weigh $w_0$ is illustrated in FIG. 22. FIG. 22 is a schematic diagram illustrating exemplified generation of a bending weight $w_0$ using geometric partitioning mode.

2.1..3. Motion Field Storage for Geometric Partitioning Mode

Mv1 from the first part of the geometric partition, Mv2 from the second part of the geometric partition and a combined Mv of Mv1 and Mv2 are stored in the motion filed of a geometric partitioning mode coded CU.

The stored motion vector type for each individual position in the motion filed are determined as:

$$sType=abs(motionIdx)<3??2:(motionIdx\leq0?(1-partIdx):partIdx) \qquad (2\text{-}43)$$

where motionIdx is equal to d (4x+2, 4y+2), which is recalculated from equation (2-36). The partIdx depends on the angle index i.

If sType is equal to 0 or 1, Mv0 or Mv1 are stored in the corresponding motion field, otherwise if sType is equal to 2, a combined Mv from Mv0 and Mv2 are stored. The combined Mv are generated using the following process:

1) If Mv1 and Mv2 are from different reference picture lists (one from L0 and the other from L1), then Mv1 and Mv2 are simply combined to form the bi-prediction motion vectors.

2) Otherwise, if Mv1 and Mv2 are from the same list, only uni-prediction motion Mv2 is stored.

Multi-Hypothesis Prediction (MHP)

Up to two additional predictors are signalled on top of inter AMVP mode, regular merge mode, and MMVD mode. The resulting overall prediction signal is accumulated iteratively with each additional prediction signal.

$$p_{n+1}=(1-\alpha_{n+1})p_n+\alpha_{n+1}h_{n+1}$$

The weighting factor $\alpha$ is specified according to the following table:

| add_hyp_weight_idx | $\alpha$ |
|---|---|
| 0 | 1/4 |
| 1 | −1/8 |

For inter AMVP mode, MHP is only applied if non-equal weight in BCW is selected in bi-prediction mode.

3. Problems

There are several issues in the existing video coding techniques, which would be further improved for higher coding gain.

(1) A fixed weight table is used for blending two prediction/hypothetic blocks during the MHP coding, which may be not flexible enough.

(2) The existing MHP allows a limited number of prediction methods as the base hypothesis, which may not achieve the highest efficiency.

(3) The existing MHP generates additional hypothesis based on a set of rule, while regular merge and regular AMVP are not allowed to be used as an additional hypothesis, which may not achieve the highest efficiency.

4. Embodiments

The detailed embodiments below should be considered as examples to explain general concepts. These embodiments should not be interpreted in a narrow way. Furthermore, these embodiments can be combined in any manner The terms 'video unit' or 'coding unit' or 'block' may represent a coding tree block (CTB), a coding tree unit (CTU), a coding block (CB), a CU, a PU, a TU, a PB, a TB.

In this disclosure, regarding "a block coded with mode N", here "mode N" may be a prediction mode (e.g., MODE_INTRA, MODE_INTER, MODE_PLT, MODE_IBC, and etc.), or a coding technique (e.g., AMVP, Merge, SMVD, BDOF, PROF, DMVR, AMVR, TM, Affine, CIIP, GPM, MMVD, BCW, HMVP, SbTMVP, and etc.).

A "multiple hypothesis prediction" in this disclosure may refer to any coding tool that combining/blending more than one prediction/composition/hypothesis into one for later reconstruction process. For example, a composition/hypothesis may be INTER mode coded, INTRA mode coded, or any other coding mode/method like CIIP, GPM, MHP, and etc.

In the following discussion, a "base hypothesis" of a multiple hypothesis prediction block may refer to a first hypothesis/prediction with a first set of weighting values, and generally, a "base hypothesis" may be a prediction unit generated from a certain prediction mode (such as MODE_INTER, or MODE_INTRA, and etc).

In the following discussion, an "additional hypothesis" of a multiple hypothesis prediction block may refer to a second hypothesis/prediction with a second set of weighting values, and generally, syntax elements for an "additional hypothesis" are additionally signaled associated with syntax elements of a "base hypothesis". There might be more than one additional hypothesis associated with a "base hypothesis". A multiple hypothesis prediction video unit is generally a hybrid prediction unit, in which final prediction samples are blended from a "base hypothesis" and one or more "additional hypotheses".

On Signalling of Multiple Hypothesis Prediction

1. In one example, more than one weight table (e.g., a set of weighting factors) may be defined for multiple hypothesis prediction.

1) For example, which weighting table is used for a hypothesis of a multiple hypothesis predicted coding unit, may be signaled in the bitstream.

2) For example, which weighting table is used (e.g., for a hypothesis) for a multiple hypothesis predicted coding unit, may be determined by one or more rules.

a) For example, the rule may be dependent on the prediction method of the base hypothesis.

b) For example, the rule may be dependent on the prediction method of an additional hypothesis.

c) For example, the rule may be dependent on the width and/or height of the coded sequence.

d) For example, the rule be dependent on the width and/or height of the coded unit.

3) For example, the dimensions of a weighting table may depend on the dimensions of the block which it is applied on.

2. In one example, whether a hypothesis is allowed to be coded with a coding method M may be dependent on coded information.

1) For example, only if a coding unit is allowed to be coded as base hypothesis, multiple hypothesis information of this coding unit may be signalled thereafter.

a) For example, a coding unit is coded with prediction method M but not satisfy certain conditions, then it is not allowed to be perceived as base hypothesis, such that it should not signal multiple hypothesis information associated with the coding unit.

2) For example, whether a coding unit with prediction method M is allowed to be as a hypothesis is dependent on prediction methods of neighboring/adjacent coding units.

a) For example, if specified position/location of neighboring video units (e.g., from above, left, above-right, above-left, bottom-left of the current video unit) are coded with prediction method N, the current coding unit coded with prediction method M is allowed to be as a base hypothesis.

i. Alternatively, if specified position/location of neighboring video units are coded with prediction method N, an additional hypothesis associated with the base hypothesis is allowed to be coded with prediction method M.

b) For example, if a specified number of neighboring video units are coded with prediction method N, the current coding unit coded with prediction method M is allowed to be as a base hypothesis.

i. Alternatively, if a specified number of neighboring video units are coded with prediction method N, an additional hypothesis associated with the base hypothesis is allowed to be coded with prediction method M.

c) For example, if a specified number of neighboring video units at specified position/location are coded with prediction method N, the current coding unit coded with prediction method M is allowed to be as a base hypothesis.

i. Alternatively, if a specified number of neighboring video units at specified position/location are coded with prediction method N, an additional hypothesis associated with the base hypothesis is allowed to be coded with prediction method M.

d) For example, the coding method N may be INTRA, intra Planar, intra DC, PDPC, intra angular, BDPCM, MIP, MRL, ISP, LM, IBC, INTER, affine, affine merge, sbTMVP, SMVD, CIIP, CIIP PDPC, GPM, TM, DMVR, and etc.

3) For example, whether an additional hypothesis is allowed to be coded with prediction method M is dependent on prediction methods of its base hypothesis.

a) For example, if the current coding unit as base hypothesis is coded with prediction method N, it is then allowed to have additional hypothesis coded with prediction method M.

4) For example, for those prediction methods which are not allowed to a certain additional hypothesis, there is no need to signal such prediction related syntax elements (e.g., the corresponding syntax elements may be inferred to default values instead of signalling) to the multiple hypothesis information.

5) For example, prediction method M may be INTRA, intra Planar, intra DC, PDPC, intra angular, BDPCM, MIP, MRL, ISP, LM, IBC, INTER, affine, affine merge, sbTMVP, SMVD, CIIP, CIIP PDPC, GPM, TM, DMVR, and etc.

3. In one example, multiple hypothesis information (e.g., coding info of additional hypotheses, weight index, and so on) may be signaled associated with the coding unit level syntax elements, in case that the current coding unit (i.e., base hypothesis) is coded with one or more of the following methods.

1) For example, the current coding unit is coded with MODE_INTRA.

2) For example, the current coding unit is coded with single tree.

3) For example, the current coding unit is coded with MODE_IBC.

4) For example, the current coding unit is coded with BDPCM.

5) For example, the current coding unit is coded with MIP.

6) For example, the current coding unit is coded with MRL.

7) For example, the current coding unit is coded with ISP.

8) For example, the current coding unit is coded with Intra DC prediction.

9) For example, the current coding unit is coded with Intra Planar prediction.

10) For example, the current coding unit is coded with Intra angular prediction.

11) For example, the current coding unit is coded with PDPC.

12) For example, the current coding unit is coded with LM mode.

13) For example, the current coding unit is coded with DM mode.

14) For example, the current coding unit is coded with CIIP mode.

15) For example, the current coding unit is coded with CIIP mode but not CIIP PDPC mode.

a) For example, given a CIIP PDPC coded video unit, multiple hypothesis information (such as multiple hypothesis flag for each additional hypothesis) may be signalled before the CIIP PDPC flag.

b) For example, given a CIIP PDPC coded video unit, multiple hypothesis information (such as multiple hypothesis flag for each additional hypothesis) may be signalled before the merge index.

c) For example, given a CIIP PDPC coded video unit, multiple hypothesis information (such as multiple hypothesis flag for each additional hypothesis) may be signalled within the merge data syntax structure.

d) For example, given a coding unit, whether CIIP PDPC flag is signalled or not may be dependent on whether multiple hypothesis prediction is used to the coding unit.

i. For example, only if multiple hypothesis prediction is not used to the coding unit (e.g., multiple hypothesis flags for all additional hypotheses are equal to false), CIIP PDPC flag is signalled.

ii. For example, if multiple hypothesis prediction is used to the coding unit (e.g., multiple hypothesis flag for at least one additional hypothesis is equal to true), CIIP PDPC flag is not signalled but inferred to be equal to a value (e.g., equal to 0 indicating CIIP_PDPC is not used to the coding unit).

16) For example, the current coding unit is coded with CIIP PDPC mode.

17) For example, the current coding unit is coded with GPM mode.

18) For example, the current coding unit is coded with template matching based refinement method.

19) For example, the current coding unit is coded with bilateral matching based refinement method.

20) Alternatively, whether multiple hypothesis information is signaled or not, may be dependent on whether one or more of the above conditions are satisfied.

21) Alternatively, whether multiple hypothesis information is signaled or not, may be dependent on whether one or more of the above conditions are not satisfied.

22) Additionally, in case that multiple hypothesis information is allowed to be signaled and the base hypothesis is coded with specific prediction modes (e.g., MODE_INTRA, MODE_INTER, and etc.) associated with specific prediction methods (e.g., intra planar, intra angular prediction, PDPC, regular merge, MMVD, affine merge, CIIP, GPM, TM, DMVR, and etc.), one or more of the following rules may be conformed.

a) For example, the multiple hypothesis information is present for specified prediction modes but not present for some other prediction modes (e.g., MODE_IBC, MODE_PLT, and etc.).

b) For example, the multiple hypothesis information is present for specified prediction modes but not present for some other prediction methods (e.g., intra LM, intra BDPCM, intra ISP, intra MIP, and etc.).

4. Multiple hypothesis prediction may be applied to a video unit wherein subblock-block based coding method is applied.

1) In one example, for affine inter coded video units, multiple hypothesis prediction may be applied no matter the BCW index is equal to the default value or not.

2) In one example, for subblock based DMVR coded video units, multiple hypothesis prediction may be applied.

3) In one example, for subblock based BDOF coded video units, multiple hypothesis prediction may be applied.

4) In one example, for subblock based PROF coded video units, multiple hypothesis prediction may be applied.

5. Multiple hypothesis prediction may be applied to a video unit wherein AMVP based coding method is applied.

1) In one example, for uni-directional (e.g, L0 or L1) predicted AMVP video units, multiple hypothesis prediction may be applied.

2) In one example, for bi-directional (e.g, BI) predicted AMVP video units, multiple hypothesis prediction may be applied no matter the BCW index is equal to the default value or not.

3) In one example, for bi-directional (e.g, BI) predicted AMVP video units, multiple hypothesis prediction may be applied even though the BCW index is equal to the default value.

4) For example, above mentioned AMVP coded video units may be non-affine AMVP video units.

5) For example, above mentioned AMVP coded video units may be affine AMVP video units.

6. In one example, once a multiple hypothesis prediction is used on a video unit (e.g., a coding unit), at least one message corresponding to multiple hypothesis information (i.e., coding information of additional hypotheses other than the base hypothesis) is signalled associated with the video unit, wherein the multiple hypothesis information may comprise one or more of the following coded information.

1) Whether the additional hypothesis is coded with MODE_INTER or MODE_INTRA.

2) In case that the additional hypothesis is coded with MODE_INTRA, a) For example, it may further signal whether the additional hypothesis is coded with prediction method A.

i. Additionally, the additional hypothesis may be coded by method A, under the condition that the base hypothesis is not coded by method X (such as X may or may not be the same as A).

b) Alternatively, it may be mandatorily use method A for an INTRA coded additional hypothesis, such that there is no need to signal whether the additional hypothesis is coded with method A.

i. For example, a pre-defined INTRA prediction method is mandatorily used, without additional signalling.

ii. For example, whether a mandatory prediction method is used for an INTRA coded additional hypothesis, may be dependent on the coding unit size (such as width and/or height).

c) Alternatively, the additional hypothesis is not allowed to be coded by method A, such that there is no need to signal whether the additional hypothesis is coded with method A.

d) For example, method A may be MIP.

i. In such case, the MIP transpose flag and/or MIP mode index may be further signalled.

ii. Alternatively, default MIP transpose method and/or MIP mode index may be used in such case, then there is no need to signal additional MIP information.

e) For example, method A may be MRL.

i. In such case, the reference index of MRL may be further signalled.

ii. Alternatively, a default MRL index other than the nearest reference line may be used in such case, then there is no need to signal additional MRL information.

f) For example, method A may be ISP.

i. In such case, split direction of ISP may be further signalled.

ii. Alternatively, a default ISP split direction may be used in such case, then there is no need to signal additional ISP information.

g) For example, method A may be Intra DC prediction.

h) For example, method A may be Intra Planar prediction.

l) For example, method A may be regular Intra prediction.

i. In such case, intra prediction mode index may be further signalled.

ii. Alternatively, a default intra mode (such as horizontal, vertical, or specific angular mode) may be used in such case, then there is no need to signal additional intra information.

j) For example, method A may be Intra DM prediction.

k) For example, method A may be Intra LM prediction.

i. In such case, LM mode index may be further signalled.

ii. Alternatively, a default LM mode may be used in such case, then there is no need to signal additional LM information.

l) For example, method A may be PDPC.

i. For example, a PDPC predictor generated from neighboring samples only (rather than both neighboring samples and current prediction samples), may be used as an additional hypothesis.

ii. Alternatively, a PDPC predictor associated with an INTRA prediction mode may be used as an additional hypothesis, and it may follow the same rule of "PDPC on regular intra mode" to apply "PDPC on an INTRA coded additional hypothesis"—whether to apply PDPC is determined on the intra prediction mode index—such that there is no need to signal whether the additional INTRA code hypothesis uses PDPC.

m) For example, method A may be BDPCM.
    i. In such case, the BDPCM prediction direction may be further signalled.
    ii. Alternatively, a default BDPCM prediction direction may be used, then there is no need to signal additional BDPCM information.

3) In case that the additional hypothesis is coded with MODE_INTER,
    a) For example, it may further signal whether the additional hypothesis is coded with prediction method B.
        i. Additionally, the additional hypothesis may be coded by method B, under the condition that the base hypothesis is not coded by method M (such as M may or may not be the same as B).
    b) Alternatively, it may be mandatorily use method B for an INTER coded additional hypothesis, such that there is no need to signal whether the additional hypothesis is coded with method B.
        i. For example, a pre-defined INTER prediction method is mandatorily used, without additional signalling.
        ii. For example, whether a mandatory prediction method is used for an INTER coded additional hypothesis, may be dependent on the coding unit size (such as width and/or height).
    c) Alternatively, the additional hypothesis is not allowed to be coded by method B, such that there is no need to signal whether the additional hypothesis is coded with method B.
    d) For example, method B may be CIIP.
    e) For example, method B may be GPM.
    f) For example, method B may be MMVD.
    g) For example, method B may be SMVD.
    h) For example, method B may be Affine.
    i) For example, method B may be SbTMVP.
    j) For example, method B may be PROF.
    k) For example, method B may be BDOF.
    l) For example, method B may be regular Merge mode.
        i. For example, additional hypothesis may be coded by a regular merge mode, but its merge index is different from the merge index of the base hypothesis.
    m) For example, method B may be regular AMVP mode.
        i. For example, additional hypothesis may be coded by a regular AMVP mode, but its AMVP index is different from the AMVP index of the base hypothesis.
    n) For example, method B may be a template matching based refinement.
    o) For example, method B may be a bilateral matching based refinement.
    p) For example, method B may be PDPC.
        i. For example, a PDPC predictor generated from neighboring samples only (rather than both neighboring samples and current prediction samples), may be used as an additional hypothesis.

7. For a block coded with CIIP mode, at least one message related to motion vector difference may be signaled to refine the motion information of the inter-prediction used in CIIP.
    1) In one example, the message of motion vector difference may be coded in the same way as the motion vector difference coded for MMVD mode.
    2) In one example, it is possible that CIIP mode and MMVD mode are used together for a single block, wherein the inter-prediction in CIIP mode is generated based on the MMVD mode.

8. Whether to and/or how to apply the disclosed methods above may be signalled at sequence level/group of pictures level/picture level/slice level/tile group level, such as in sequence header/picture header/SPS/VPS/DPS/DCI/PPS/APS/slice header/tile group header.

9. Whether to and/or how to apply the disclosed methods above may be signalled at PB/TB/CB/PU/TU/CU/VPDU/CTU/CTU    row/slice/tile/sub-picture/other kinds of region contain more than one sample or pixel.

10. Whether to and/or how to apply the disclosed methods above may be dependent on coded information, such as block size, colour format, single/dual tree partitioning, colour component, slice/picture type.

GPM Partition Mode Signaling

11. In one example, GPM partition index, which may indicate the GPM partition line, and/or the GPM partition angle, and/or the GPM partition distance of a current video unit may be derived at decoder side and encoder side, with or without side information signaled from the encoder to the decoder.
    1) For example, a content analytic (e.g., edge detection based on histogram of gradient, etc.) scheme may be used to determine the splitting line of a GPM coded unit.
    2) For example, the content analytic scheme may be performed based on neighboring predicted (or reconstructed) samples adjacent or non-adjacent to a video unit no smaller than the current video unit.
    3) For example, the content analytic scheme may be performed based on reconstructed samples in the reference picture(s).
        a) For example, which reference picture(s) and/or what samples in the reference picture(s) to be used may be determined based on at least a motion vector (e.g., the motion vector of a neighboring video unit adjacent to the current video unit).
    4) For example, if GPM split angle or distance information can be derived at decoder side and encoder side, the value allowed GPM mode index may be less than a certain number T (such as T=64 or 63), which means less than T GPM partition modes are allowed to be used in the bitstream.
        a) In such case, the cMax value during the binarization process of GPM partition index may equal to a certain value less than T.
    5) In one example, suppose the number of allowed GPM mode index is denoted as T1 if GPM split angle or distance information can be derived at decoder side and encoder side, and the number of allowed GPM mode index is denoted as T2 if GPM split angle or distance information is signaled in the bitstream, then T1 may not be equal to T2. For example, T1>T2.

Intra/Inter Data Signaling for a Multiple Hypothesis Video Unit

12. For example, the mode information of the intra part of a multiple hypothesis prediction block (e.g., CIIP, MHP, GPM, etc) may be signalled in the bitstream.

1) For example, at least an intra mode index may be signalled for a GPM coded video unit.

2) For example, at least an intra mode index may be signalled for an MHP predicted video unit.

3) For example, at least an intra mode index may be signalled for a CIIP coded video unit.

4) For example, at least one syntax element (e.g., flag, variable) may be signalled indicating whether a specific intra mode (e.g., DIMD, TIMD, etc) is used for a multiple hypothesis prediction block (e.g., CIIP, MHP, GPM, etc).

5) For example, what intra mode can be used/signaled for a partition of GPM mode may be dependent on the GPM partition mode, and/or GPM partition angle, and/or GPM partition distance and/or dimensions of the current block.

13. For example, the mode information of the intra (or inter) part of a multiple hypothesis prediction block (e.g., CIIP, MHP, GPM, etc) may be NOT signalled but derived at decoder side and encoder side.

1) For example, one or more intra modes with lowest cost may be selected.

a) Alternatively, one or more inter modes with lowest cost may be selected.

b) For example, the cost may be calculated based on a decode derived method (such as template matching method, or a bilateral matching method).

i. For example, a template matching based method may be used to sort a set of pre-defined intra modes and select the best K (such as K=1) modes for the intra (or inter) part of a multiple hypothesis block.

ii. For example, a bilateral matching based method may be used to sort a set of pre-defined intra modes and select the best K (such as K=1) modes for the inter part of a multiple hypothesis block.

c) Furthermore, the cost may be calculated based on a quality metric (e.g., SAD/SATD/MSE/MR-SAD, etc) using information of neighboring samples.

d) Furthermore, the cost may be calculated based on the histogram of gradient (HoG) from neighboring samples.

2) For example, the intra mode of a multiple hypothesis prediction block may be pre-defined (other than signalled).

a) For example, a fixed intra mode may be used for a partition of GPM mode.

b) For example, what intra mode is used or can be used for a partition of GPM mode may be dependent on the GPM partition mode, and/or GPM partition angle, and/or GPM partition distance and/or dimensions of the current block.

c) For example, what intra mode is used for CIIP (or MHP, or GPM) may be based on neighbor samples information (e.g., gradients, modes, etc).

14. In one example, if a multiple prediction mode (e.g., GPM, MHP, etc.) allows blending an intra prediction and other predictions (e.g., intra or inter), the following may be applied 1) For example, the multiple predicted video unit may NOT be allowed to be divided into more than one subblock/subpartition (coding unit based multiple prediction mode).

a) Alternatively, the multiple predicted video unit may be allowed to be divided into more than one subblock/subpartition (subblock/subpartition based multiple prediction mode).

2) For example, pre-defined intra mode set may be used for a hypothesis/subblock/subpartition/partition.

a) For example, the predefined intra mode may comprise intra candidate modes based on the MPM list, PDPC, Planar, TIMD, DIMD, intra fusion mode blended from X (e.g., X is a constant) individual intra modes, intra fusion mode blended from Y (e.g., Y is a constant) individual intra modes plus Planar mode, intra fusion mode blended from intra horizontal mode and intra vertical mode in case that both left and above neighboring samples are available for the current hypothesis/subblock/subpartition/partition.

3) For example, in case that a set of intra modes are allowed for a subblock/subpartition/partition/hypothesis, which intra mode is used may be derived at the decode side and the encoder side (e.g., depending on a template cost).

a) Alternatively, which intra mode is used may be signalled in the bitstream.

4) In one example, the transform/inverse-transform of the current block may depend on at least one intra prediction used in the current block.

Decoder Normative Rule for a Corner Case that a Template Contains at Least One Sample Outside the Picture Boundary 15. For example, if one or more samples of a template used for template matching exceeds the picture boundary, the following may be applied 1) For example, the template matching may be INTER template matching, or INTRA template matching.

2) For example, in case that a sample of a template in the CURRENT picture used for template matching exceeds the CURRENT picture boundary, the value of the sample may be set to a pre-defined value.

a) For example, the pre-defined value may be dependent on bit-depth, such as $1<<(BitDepth-1)$.

3) For example, in case that a sample of a template in the CURRENT picture used for template matching exceeds the CURRENT picture boundary, the value of the sample may be set to the value of the nearest sample at the picture boundary.

4) Additionally, when the template matching is INTER template matching, the above rules may be applied to a template in REFERENCE picture, i.e., a sample of a template in the REFERENCE picture used for template matching exceeds the REFERENCE picture boundary.

The embodiments of the present disclosure are related to signaling of geometric partition mode (GPM) partition mode, signaling of intra or inter data for a multiple hypothesis video unit, and a rule for a case that a template contains at least one sample outside the picture boundary. As used herein, the term "hybrid prediction tool" may refer to any coding tool that combining or blending more than one prediction, composition, or hypothesis into one for later reconstruction process. For example, a composition/hypothesis may be INTER mode coded, INTRA mode coded, or any other coding mode/method like CLIP, GPM, MHP, and etc. The term "block" may represent a coding tree block (CTB), a coding tree unit (CTU), a coding block (CB), a coding unit (CU), a prediction unit (PU), a transform unit (TU), a prediction block (PB), a transform block (TB), a video processing unit comprising multiple samples/pixels, and/or the like. A block may be rectangular or non-rectangular.

Figure 23:
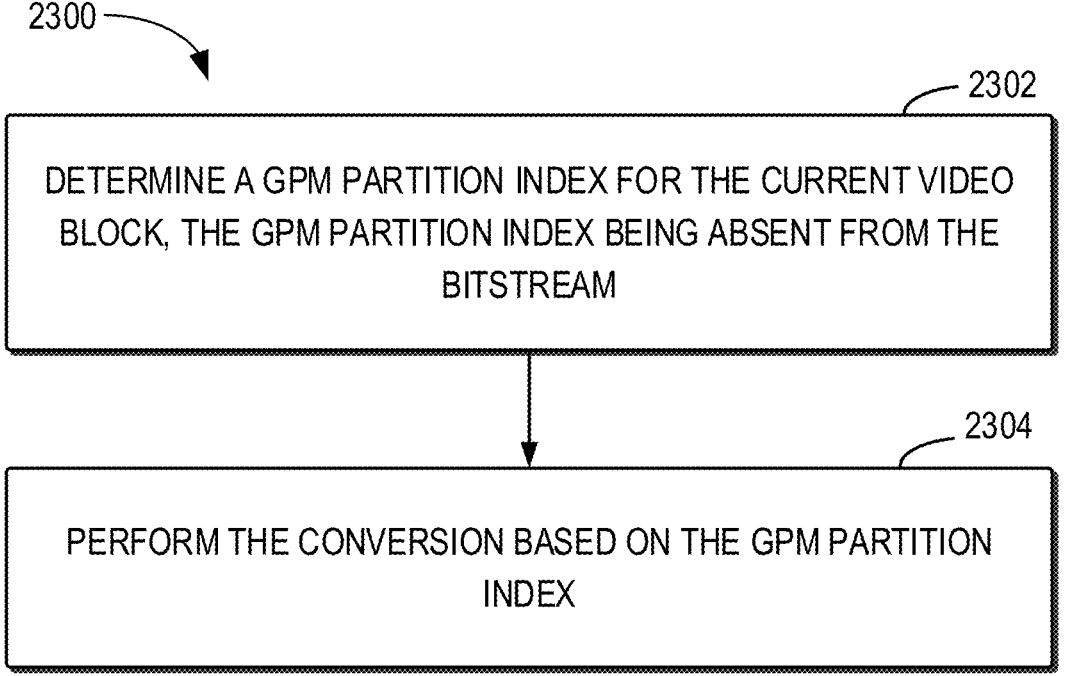
FIG. 23 illustrates a flowchart of a method for video processing in accordance with some embodiments of the present disclosure.

FIG. 23 illustrates a flowchart of a method 2300 for video processing in accordance with some embodiments of the present disclosure. The method 2300 may be implemented during a conversion between a current video block of a video and a bitstream of the video. As shown in FIG. 23, the method 2300 starts at 2302 where a geometric partition mode (GPM) partition index for the current video block is determined. The GPM partition index is absent from the bitstream. By way of example, the GPM partition index indicates a GPM partition line. Additionally or alternatively, the GPM partition index indicates at least one of a GPM partition angle or a GPM partition distance. In one example, a GPM partition angle may be determined from the reconstructed samples neighboring to the current video block. It should be understood that the above illustrations and/or examples are described merely for purpose of description. The scope of the present disclosure is not limited in this respect.

At 2304, the conversion is performed based on the determined GPM partition index. In some embodiments, the conversion may include encoding the current video block into the bitstream. Alternatively or additionally, the conversion may include decoding the current video block from the bitstream.

According to the method 2300, the GPM partition index can be derived at decoder side and/or encoder side, rather than being indicated in the bitstream. Thereby, the proposed method can advantageously reduce the coding bits while maintaining the coding quality.

In some embodiments, the GPM partition index may be determined with side information indicated in the bitstream. Alternatively, the GPM partition index may be determined without side information indicated in the bitstream.

In some embodiments, the GPM partition line for the current video block may be determined based on a content analytic scheme. By way of example, the content analytic scheme may comprise an edge detection based on histogram of gradient. In another example, the content analytic scheme may be performed based on neighboring predicted samples a target block of the video. A size of the target block may be larger than or equal to a size of the current video block. For example, the neighboring predicted samples may be adjacent to the target block. Alternatively, the neighboring predicted samples may be non-adjacent to the target block. In a further example, the content analytic scheme may be performed based on neighboring reconstructed samples of the target block of the video. For example, the neighboring reconstructed samples may be adjacent to the target block. Alternatively, the neighboring reconstructed samples may be non-adjacent to the target block.

In some embodiments, the content analytic scheme may be performed based on reconstructed samples in at least one reference picture for the current video block. For example, at least one reference picture to be used may be determined based on a motion vector associated with the video. Additionally or alternatively, samples in the at least one reference picture to be used may be determined based on a motion vector associated with the video. In one example, the motion vector may comprise a motion vector for a neighboring block adjacent to the current video block.

In some embodiments, if information about the GPM partition angle or the GPM partition distance is absent from the bitstream, the number of GPM partition modes allowed to be used in the bitstream may be less than a pre-defined number. In such a case, for example, the largest possible value of a syntax element being coded may be less than the pre-defined number during a binarization process of the GPM partition index. By way of example, the pre-defined number may be 64, and the cMax value during the binarization process of GPM partition index may be less than 64. Alternatively, the pre-defined number may be 63, and the cMax value during the binarization process of GPM partition index may be less than 63. It should be understood that the above values are described merely for purpose of description. The scope of the present disclosure is not limited in this respect.

In some embodiments, if information about the GPM partition angle or the GPM partition distance is absent from the bitstream, a first number of GPM mode index may be allowed to be used. If the information about the GPM partition angle or the GPM partition distance is indicated in the bitstream, a second number of GPM mode index may be allowed to be used. In one example, the first number may be larger than the second number. Alternatively, the first number may be smaller than the second number.

In some embodiments, a bitstream of a video may be stored in a non-transitory computer-readable recording medium. The bitstream of the video can be generated by a method performed by a video processing apparatus. According to the method, a geometric partition mode (GPM) partition index for the current video block is determined. The GPM partition index is absent from the bitstream. A bitstream of the current video block may be generated based on the determined GPM partition index.

In some embodiments, a geometric partition mode (GPM) partition index for the current video block is determined. The GPM partition index is absent from the bitstream. A bitstream of the current video block may be generated based on the determined GPM partition index. The bitstream may be stored in a non-transitory computer-readable recording medium.

Figure 24:
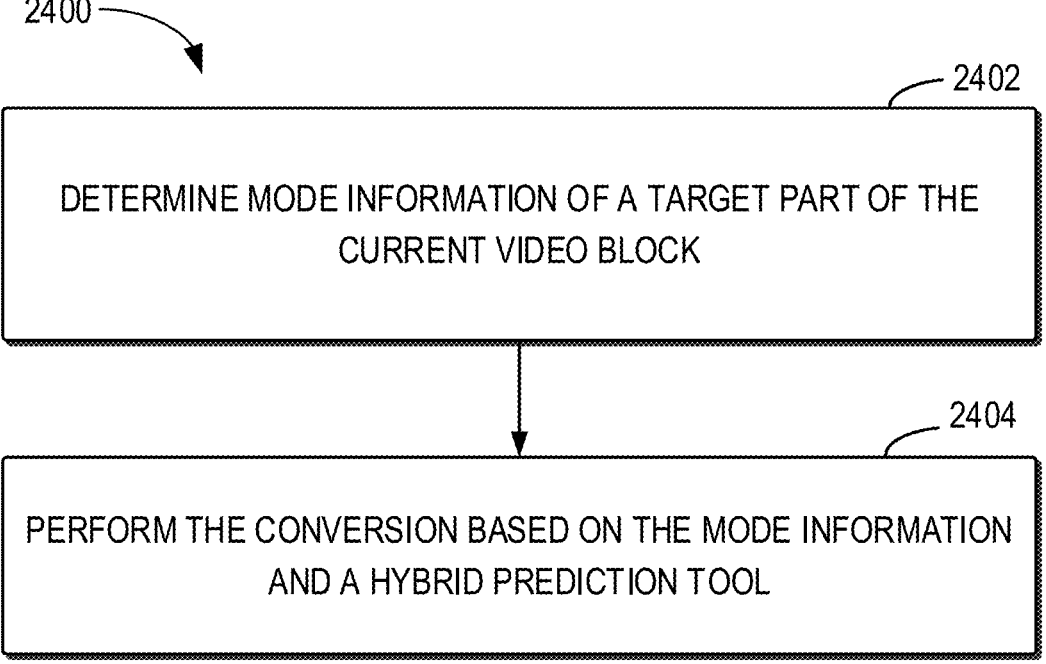
FIG. 24 illustrates a flowchart of another method for video processing in accordance with some embodiments of the present disclosure.

FIG. 24 illustrates a flowchart of another method 2400 for video processing in accordance with some embodiments of the present disclosure. The method 2400 may be implemented during a conversion between a current video block of a video and a bitstream of the video. As shown in FIG. 24, the method 2400 starts at 2402 where mode information of a target part of the current video block is determined. In one example, the target part may be an intra part, and the mode information may be indicated in the bitstream. Alternatively, the target part may be an inter part, and the mode information may be absent from the bitstream. In such a case, the mode information may be determined from reconstructed samples adjacent to the current video block. It should be understood that the above illustrations and/or examples are described merely for purpose of description. The scope of the present disclosure is not limited in this respect.

At 2404, the conversion is performed based on the mode information and a hybrid prediction tool. The hybrid prediction tool may be used for determining a prediction of the current video block based on a plurality of candidate predictions of the current video block. By way of example, the hybrid prediction tool may be GPM. Alternatively, the hybrid prediction tool may be CIIP or MHP. In one example, the hybrid prediction tool to be used may be pre-defined. In a further embodiment, the hybrid prediction tool to be used may be determined during the coding process. It should be understood that the above illustrations and/or examples are described merely for purpose of description. The scope of the present disclosure is not limited in this respect. In some embodiments, the conversion may include encoding the current video block into the bitstream. Alternatively or additionally, the conversion may include decoding the current video block from the bitstream.

The method 2400 can advantageously improve the coding efficiency and the coding quality.

In some embodiments, the target part may be an intra part, and the mode information may be indicated in the bitstream. In such a case, the hybrid prediction tool may be geometric partition mode (GPM), and the mode information may comprise at least an intra mode index associated with the current video block. Alternatively, the hybrid prediction tool may be multiple hypothesis prediction (MHP), and the mode information may comprise at least an intra mode index associated with the current video block. In a further example, the hybrid prediction tool may be combined inter and intra prediction (CIIP), and the mode information may comprise at least an intra mode index associated with the current video block.

In some embodiments, at least one syntax element indicating whether a specific intra mode may be used for the current video block may be indicated in the bitstream. By way of example the at least one syntax element may comprise a flag or a variable, and the specific intra mode may comprise decoder-side intra mode derivation (DIMD) or template-based intra mode derivation (TIMD).

In some embodiments, the hybrid prediction tool may be geometric partition mode (GPM), and the mode information may comprise an intra mode used or indicated for a partition of GPM mode. The intra mode may be dependent on a GPM partition mode or a GPM partition angle. Alternatively, the intra mode may be dependent on a GPM partition distance or dimensions of the current video block.

In some embodiments, the target part may be an intra part or an inter part, and the mode information may be absent from the bitstream. In such a case, the mode information may be determined from reconstructed samples adjacent to the current video block. It should be understood that the mode information may be determined in any other suitable manner. The scope of the present disclosure is not limited in this respect. Thereby, the proposed method can advantageously reduce the coding bits while maintaining the coding quality.

In some embodiments, at 2402, a cost for each intra mode in a set of intra mode may be determined. The mode information may be determined based on at least one intra mode with the lowest cost. Alternatively, at 2402 a cost for each inter mode in a set of inter mode may be determined. The mode information may be determined based on at least one inter mode with the lowest cost.

In some embodiments, the cost may be determined based on a decode derived method. By way of example, the decode derived method may comprise a template matching based method or a bilateral matching based method. In one example, the template matching based method may be used to determine at least one target mode for the intra part or the inter part from a set of pre-defined intra modes. For example, the template matching based method may be used to sort a set of pre-defined intra modes and select the best two modes for the intra part of a block. In another example, the bilateral matching based method may be used to determine at least one target mode for the inter part from a set of pre-defined intra modes. For example, the bilateral matching based method may be used to sort a set of pre-defined intra modes and select the best 2 modes for the inter part of a block. It should be understood that the above illustrations and/or examples are described merely for purpose of description. The scope of the present disclosure is not limited in this respect.

In some embodiments, the cost may be determined based on a quality metric by using information of neighboring samples of the current video block. For example, the quality metric may comprise a sum of absolute difference (SAD), a sum of absolute transformed difference (SATD), a mean squared error (MSE), a mean removal sum of absolute difference (MR-SAD), and/or the like. Alternatively, the cost may be determined based on a histogram of gradient (HoG) from neighboring samples of the current video block. It should be understood that the cost may be determined in any other suitable manner. The scope of the present disclosure is not limited in this respect.

In some embodiments, the mode information may comprise a pre-defined intra mode for the hybrid prediction tool. In some further embodiments, the hybrid prediction tool may comprise GPM, and a fixed intra mode may be used for a partition of GPM mode. In some embodiments, an intra mode used for a partition of GPM mode may be dependent on at least one of: a GPM partition mode, a GPM partition angle, a GPM partition distance, or dimensions of the current video block. In yet another embodiment, an intra mode used for the hybrid coding tool may be based on information of neighboring samples of the current video block.

In some embodiments, a bitstream of a video may be stored in a non-transitory computer-readable recording medium. The bitstream of the video can be generated by a method performed by a video processing apparatus. According to the method, mode information of a target part of the current video block is determined. A bitstream of the current video block may be generated based on the mode information and a hybrid prediction tool.

In some embodiments, mode information of a target part of the current video block is determined. A bitstream of the current video block may be generated based on the mode information and a hybrid prediction tool. The bitstream may be stored in a non-transitory computer-readable recording medium.

Figure 25:
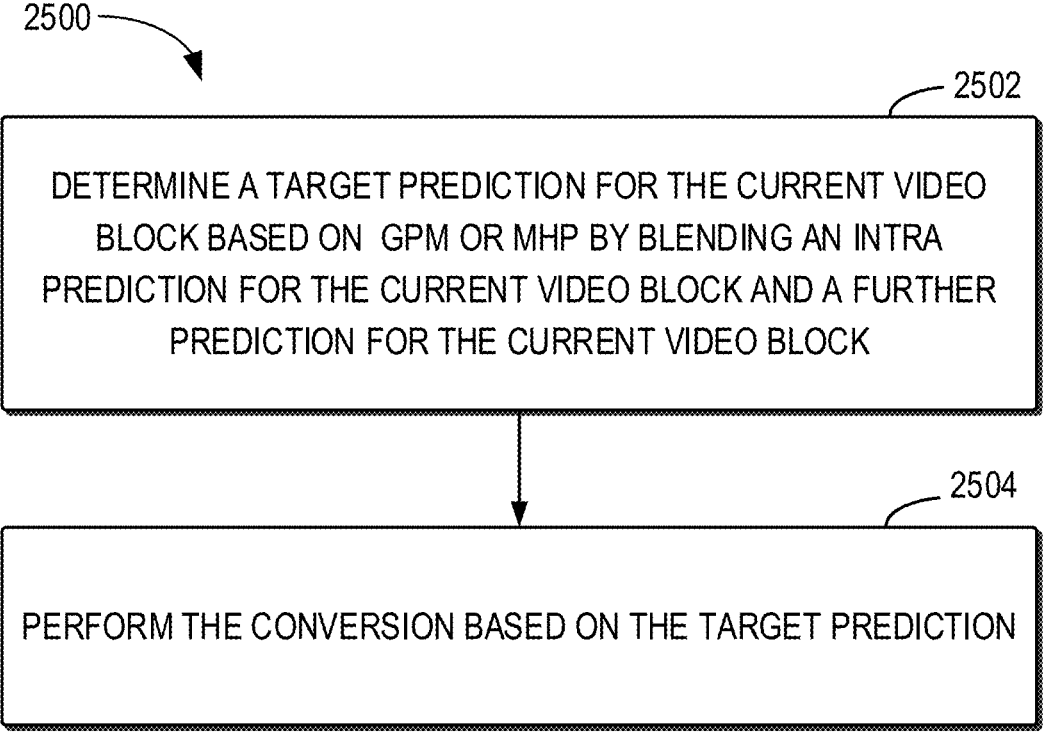
FIG. 25 illustrates a flowchart of another method for video processing in accordance with some embodiments of the present disclosure.

FIG. 25 illustrates a flowchart of another method 2500 for video processing in accordance with some embodiments of the present disclosure. The method 2500 may be implemented during a conversion between a current video block of a video and a bitstream of the video. As shown in FIG. 25, the method 2500 starts at 2502 where a target prediction for the current video block is determined based on geometric partition mode (GPM) or multiple hypothesis prediction (MHP) by blending an intra prediction for the current video block and a further prediction for the current video block. By way of example, the current video block may be partitioned into a first partition and a second partition based on the GPM. The target prediction of the current video block may be determined by blending an intra prediction of the first partition and an inter prediction of the second partition. It should be understood that the above illustrations are described merely for purpose of description. The scope of the present disclosure is not limited in this respect.

At 2504, the conversion is performed based on the target prediction. In some embodiments, the conversion may include encoding the current video block into the bitstream. Alternatively or additionally, the conversion may include decoding the current video block from the bitstream.

The method 2500 enables the GPM and MHP to determine a final prediction of a block based on an intra prediction and a further prediction of the block. Compared with a convention solution where GPM and MHP only utilize inter predictions, the proposed method can advantageously improve the coding quality.

In some embodiments, the current video block may be not allowed to be divided into a plurality of subblocks or subpartitions, which corresponds to a coding unit based multiple prediction mode. In another embodiment, the current video block may be allowed to be divided into a plurality of subblocks or subpartitions, which corresponds to subblock based multiple prediction mode or subpartition based multiple prediction mode.

In some embodiments, a set of pre-defined intra modes may be used for a hypothesis of the current video block, a subblock of the current video block, a subpartition of the current video block, or a partition of the current video block. In one example, the hypothesis of the current video block may be a prediction of the entire current video block. In another hypothesis of the current video block may be a prediction of a partition of the entire current video block. It should be understood that the possible implementations of the hypothesis described here are merely illustrative and therefore should not be construed as limiting the present disclosure in any way.

In some embodiments, if both left and above neighboring samples are available for one of the hypothesis, the subblock, the subpartition or the partition, the set of pre-defined intra modes may comprise at least one of: an intra candidate mode based on most probable mode (MPM) list, an intra candidate mode based on position dependent intra prediction combination (PDPC), an intra candidate mode based on planar, an intra candidate mode based on TIMD, an intra candidate mode based on DIMD, an intra fusion mode determined from at least one individual intra modes, an intra fusion mode determined from at least one individual intra modes and planar mode, or an intra fusion mode determined from an intra horizontal mode and an intra vertical mode.

In some embodiments, an intra mode used may be absent from the bitstream, if a set of intra modes are allowed for a hypothesis of the current video block, a subblock of the current video block, a subpartition of the current video block, or a partition of the current video block.

In some embodiments, an intra mode used may be indicated in the bitstream. In some embodiments, a transform of the current video block may be dependent on at least one intra prediction used for the current video block. Additionally or alternatively, an inverse-transform of the current video block may be dependent on at least one intra prediction used for the current video block.

In some embodiments, a bitstream of a video may be stored in a non-transitory computer-readable recording medium. The bitstream of the video can be generated by a method performed by a video processing apparatus. According to the method, a target prediction for the current video block is determined based on geometric partition mode (GPM) or multiple hypothesis prediction (MHP) by blending an intra prediction for the current video block and a further prediction for the current video block. A bitstream of the current video block may be generated based on the target prediction.

In some embodiments, a target prediction for the current video block is determined based on geometric partition mode (GPM) or multiple hypothesis prediction (MHP) by blending an intra prediction for the current video block and a further prediction for the current video block. A bitstream of the current video block may be generated based on the target prediction. The bitstream may be stored in a non-transitory computer-readable recording medium.

Figure 26:
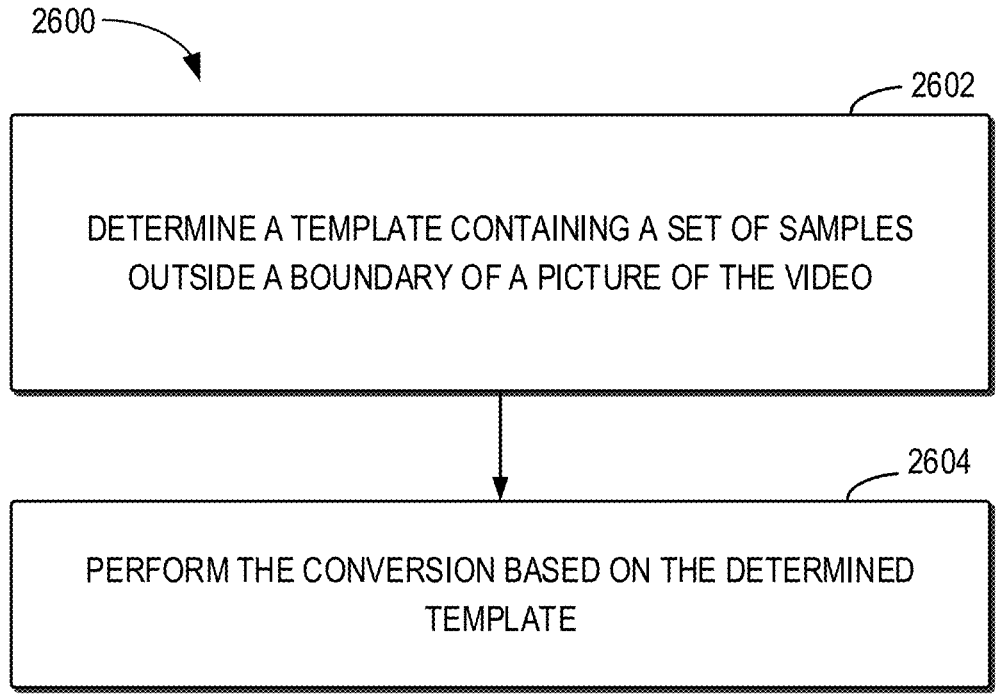
FIG. 26 illustrates a flowchart of another method for video processing in accordance with some embodiments of the present disclosure.

FIG. 26 illustrates a flowchart of another method 2600 for video processing in accordance with some embodiments of the present disclosure. The method 2600 may be implemented during a conversion between a current video block of a video and a bitstream of the video. As shown in FIG. 26, the method 2600 starts at 2602 where a template containing a set of samples outside a boundary of a picture of the video is determined. By way of example, the current video block may be at the top-right corner of the current picture, and a block above the current video block may be determined as a template to be used. It should be understood that the above illustrations are described merely for purpose of description. The scope of the present disclosure is not limited in this respect.

At 2604, the conversion is performed based on the determined template. In some embodiments, the conversion may include encoding the current video block into the bitstream. Alternatively or additionally, the conversion may include decoding the current video block from the bitstream. In some embodiments, the conversion may be performed based on inter template matching. Alternatively, the conversion may be performed based on intra template matching.

The method 2600 enables the utilization of a template at least partially outside the picture boundary, which can advantageously extend the application scenario of template-matching-based method. Moreover, the proposed method can advantageously improve the coding efficiency and the coding quality.

In some embodiments, the picture may be a current picture comprising the current video block, and a value of a target sample in the set of samples may be set to a pre-defined value. The target sample may be outside the boundary of the current picture. In one example, the pre-defined value may be dependent on bit-depth. Alternatively, the value of the target sample may be set to a value of the nearest sample at the boundary of the current picture.

In some embodiments, the picture may be a reference picture of the current video block, and a value of a target sample in the set of samples may be set to a pre-defined value. the target sample may be outside the boundary of the reference picture. For example, the pre-defined value may be dependent on bit-depth. Alternatively, the value of the target sample may be set to a value of the nearest sample at the boundary of the reference picture.

In some embodiments, a bitstream of a video may be stored in a non-transitory computer-readable recording medium. The bitstream of the video can be generated by a method performed by a video processing apparatus. According to the method, a template containing a set of samples outside a boundary of a picture of the video is determined. A bitstream of the current video block may be generated based on the determined template.

In some embodiments, a template containing a set of samples outside a boundary of a picture of the video is determined. A bitstream of the current video block may be generated based on the determined template. The bitstream may be stored in a non-transitory computer-readable recording medium.

Implementations of the present disclosure can be described in view of the following clauses, the features of which can be combined in any reasonable manner Clause 1. A method for video processing, comprising: determining, during a conversion between a current video block of a video and a bitstream of the video, a geometric partition mode (GPM) partition index for the current video block, the GPM partition index being absent from the bitstream; and performing the conversion based on the GPM partition index.

Clause 2. The method of clause 1, wherein the GPM partition index indicates at least one of: a GPM partition line, a GPM partition angle, or a GPM partition distance.

Clause 3. The method of any of clauses 1-2, wherein the GPM partition index is determined with or without side information indicated in the bitstream.

Clause 4. The method of any of clauses 2-3, wherein the GPM partition line for the current video block is determined based on a content analytic scheme.

Clause 5. The method of clause 4, wherein the content analytic scheme comprises an edge detection based on histogram of gradient.

Clause 6. The method of any of clauses 4-5, wherein the content analytic scheme is performed based on neighboring predicted samples or neighboring reconstructed samples of a target block of the video, a size of the target block being larger than or equal to a size of the current video block.

Clause 7. The method of clause 6, wherein the neighboring predicted samples are adjacent to the target block, or the neighboring predicted samples are non-adjacent to the target block, or the neighboring reconstructed samples are adjacent to the target block, or the neighboring reconstructed samples are non-adjacent to the target block.

Clause 8. The method of clause 4, wherein the content analytic scheme is performed based on reconstructed samples in at least one reference picture for the current video block.

Clause 9. The method of clause 8, wherein at least one of the following is determined based on a motion vector associated with the video: at least one reference picture to be used, or samples in the at least one reference picture to be used.

Clause 10. The method of clause 9, wherein the motion vector comprises a motion vector for a neighboring block adjacent to the current video block.

Clause 11. The method of clause 2, wherein if information about the GPM partition angle or the GPM partition distance is absent from the bitstream, the number of GPM partition modes allowed to be used in the bitstream is less than a pre-defined number.

Clause 12. The method of clause 11, wherein the largest possible value of a syntax element being coded is less than the pre-defined number during a binarization process of the GPM partition index.

Clause 13. The method of clause 2, wherein if information about the GPM partition angle or the GPM partition distance is absent from the bitstream, a first number of GPM mode index are allowed to be used, if the information about the GPM partition angle or the GPM partition distance is indicated in the bitstream, a second number of GPM mode index are allowed to be used, the first number being larger than or smaller than the second number.

Clause 14. A method for video processing, comprising: determining, during a conversion between a current video block of a video and a bitstream of the video, mode information of a target part of the current video block; and performing the conversion based on the mode information and a hybrid prediction tool, the hybrid prediction tool being used for determining a prediction of the current video block based on a plurality of candidate predictions of the current video block.

Clause 15. The method of clause 14, wherein the target part is an intra part, and the mode information being indicated in the bitstream.

Clause 16. The method of clause 15, wherein the hybrid prediction tool is geometric partition mode (GPM), and the mode information comprises an intra mode index associated with the current video block.

Clause 17. The method of clause 15, wherein the hybrid prediction tool is multiple hypothesis prediction (MHP), and the mode information comprises an intra mode index associated with the current video block.

Clause 18. The method of clause 15, wherein the hybrid prediction tool is combined inter and intra prediction (CIIP), and the mode information comprises an intra mode index associated with the current video block.

Clause 19. The method of clause 15, wherein at least one syntax element indicating whether a specific intra mode is used for the current video block is indicated in the bitstream.

Clause 20. The method of clause 19, wherein the at least one syntax element comprises a flag or a variable, and the specific intra mode comprises decoder-side intra mode derivation (DIMD) or template-based intra mode derivation (TIMD).

Clause 21. The method of any of clauses 14-15, wherein the hybrid prediction tool is geometric partition mode (GPM), the mode information comprises an intra mode used or indicated for a partition of GPM mode, and the intra mode is dependent on one of: a GPM partition mode, a GPM partition angle, a GPM partition distance, or dimensions of the current video block.

Clause 22. The method of clause 14, wherein the target part is an intra part or an inter part, and the mode information being absent from the bitstream.

Clause 23. The method of clause 22, wherein determining the mode information comprises: determining a cost for each intra mode in a set of intra mode; and determining the mode information based on at least one intra mode with the lowest cost.

Clause 24. The method of clause 22, wherein determining the mode information comprises: determining a cost for each inter mode in a set of inter mode; and determining the mode information based on at least one inter mode with the lowest cost.

Clause 25. The method of any of clauses 23-24, wherein the cost is determined based on a decode derived method.

Clause 26. The method of clause 25, wherein the decode derived method comprises a template matching based method or a bilateral matching based method.

Clause 27. The method of clause 26, wherein the template matching based method is used to determine at least one target mode for the intra part or the inter part from a set of pre-defined intra modes, or the bilateral matching based method is used to determine at least one target mode for the inter part from a set of pre-defined intra modes.

Clause 28. The method of any of clauses 23-24, wherein the cost is determined based on a quality metric by using information of neighboring samples of the current video block.

Clause 29. The method of clause 28, wherein the quality metric comprises one of: a sum of absolute difference (SAD), a sum of absolute transformed difference (SATD), a mean squared error (MSE), or a mean removal sum of absolute difference (MR-SAD).

Clause 30. The method of any of clauses 23-24, wherein the cost is determined based on a histogram of gradient (HoG) from neighboring samples of the current video block.

Clause 31. The method of clause 22, wherein the mode information comprises a pre-defined intra mode for the hybrid prediction tool.

Clause 32. The method of clause 22, wherein the hybrid prediction tool comprises GPM, and a fixed intra mode is used for a partition of GPM mode.

Clause 33. The method of clause 22, wherein an intra mode used for a partition of GPM mode is dependent on at least one of: a GPM partition mode, a GPM partition angle, a GPM partition distance, or dimensions of the current video block.

Clause 34. The method of clause 22, wherein an intra mode used for the hybrid coding tool is based on information of neighboring samples of the current video block.

Clause 35. The method of clause 34, wherein the hybrid coding tool comprises one of: CIIP, MHP, or GPM.

Clause 36. A method for video processing, comprising: determining, during a conversion between a current video block of a video and a bitstream of the video, a target prediction for the current video block based on geometric partition mode (GPM) or multiple hypothesis prediction (MHP) by blending an intra prediction for the current video block and a further prediction for the current video block; and performing the conversion based on the target prediction.

Clause 37. The method of clause 36, wherein the current video block is not allowed to be divided into a plurality of subblocks or subpartitions.

Clause 38. The method of clause 36, wherein the current video block is allowed to be divided into a plurality of subblocks or subpartitions.

Clause 39. The method of clause 36, wherein a set of pre-defined intra modes are used for one of: a hypothesis of the current video block, a subblock of the current video block, a subpartition of the current video block, or a partition of the current video block.

Clause 40. The method of clause 39, wherein if both left and above neighboring samples are available for one of the hypothesis, the subblock, the subpartition or the partition, the set of pre-defined intra modes comprises at least one of: an intra candidate mode based on most probable mode (MPM) list, an intra candidate mode based on position dependent intra prediction combination (PDPC), an intra candidate mode based on planar, an intra candidate mode based on TIMD, an intra candidate mode based on DIMD, an intra fusion mode determined from at least one individual intra modes, an intra fusion mode determined from at least one individual intra modes and planar mode, or an intra fusion mode determined from an intra horizontal mode and an intra vertical mode.

Clause 41. The method of clause 36, wherein if a set of intra modes are allowed for one of the following, an intra mode used is absent from the bitstream: a hypothesis of the current video block, a subblock of the current video block, a subpartition of the current video block, or a partition of the current video block.

Clause 42. The method of clause 36, wherein an intra mode used is indicated in the bitstream.

Clause 43. The method of any of clauses 36-42, wherein a transform or an inverse-transform of the current video block is dependent on at least one intra prediction used for the current video block.

Clause 44. A method for video processing, comprising: determining, during a conversion between a current video block of a video and a bitstream of the video, a template containing a set of samples outside a boundary of a picture of the video; and performing the conversion based on the determined template.

Clause 45. The method of clause 44, wherein the conversion is performed based on inter template matching or intra template matching.

Clause 46. The method of any of clauses 44-45, wherein the picture is a current picture comprising the current video block, and a value of a target sample in the set of samples is set to a pre-defined value, the target sample being outside the boundary of the current picture.

Clause 47. The method of clause 45, wherein the pre-defined value is dependent on bit-depth.

Clause 48. The method of any of clauses 44-45, wherein the picture is a current picture comprising the current video block, and a value of a target sample in the set of samples is set to a value of the nearest sample at the boundary of the current picture, the target sample being outside the boundary.

Clause 49. The method of any of clauses 44-45, wherein the picture is a reference picture of the current video block, and a value of a target sample in the set of samples is set to a pre-defined value, the target sample being outside the boundary of the reference picture.

Clause 50. The method of clause 49, wherein the pre-defined value is dependent on bit-depth.

Clause 51. The method of any of clauses 44-45, wherein the picture is a reference picture of the current video block, and a value of a target sample in the set of samples is set to a value of the nearest sample at the boundary of the reference picture, the target sample being outside the boundary.

Clause 52. The method of any of clauses 1-51, wherein the conversion includes encoding the current video block into the bitstream.

Clause 53. The method of any of clauses 1-51, wherein the conversion includes decoding the current video block from the bitstream.

Clause 54. An apparatus for processing video data comprising a processor and a non-transitory memory with instructions thereon, wherein the instructions upon execution by the processor, cause the processor to perform a method in accordance with any of Clauses 1-53.

Clause 55. A non-transitory computer-readable storage medium storing instructions that cause a processor to perform a method in accordance with any of Clauses 1-53.

Clause 56. A non-transitory computer-readable recording medium storing a bitstream of a video which is generated by a method performed by a video processing apparatus, wherein the method comprises: determining a geometric partition mode (GPM) partition index for a current video block of the video, the GPM partition index being absent from the bitstream; and generating the bitstream based on the GPM partition index.

Clause 57. A method for storing a bitstream of a video, comprising: determining a geometric partition mode (GPM) partition index for a current video block of the video, the GPM partition index being absent from the bitstream; generating the bitstream based on the GPM partition index; and storing the bitstream in a non-transitory computer-readable recording medium.

Clause 58. A non-transitory computer-readable recording medium storing a bitstream of a video which is generated by a method performed by a video processing apparatus, wherein the method comprises: determining mode information of a target part of a current video block of the video; and generating the bitstream based on the mode information and a hybrid prediction tool, the hybrid prediction tool being used for determining a prediction of the current video block based on a plurality of candidate predictions of the current video block.

Clause 59. A method for storing a bitstream of a video, comprising: determining mode information of a target part of a current video block of the video; generating the bitstream based on the mode information and a hybrid prediction tool, the hybrid prediction tool being used for determining a prediction of the current video block based on a plurality of candidate predictions of the current video block; and storing the bitstream in a non-transitory computer-readable recording medium.

Clause 60. A non-transitory computer-readable recording medium storing a bitstream of a video which is generated by a method performed by a video processing apparatus, wherein the method comprises: determining a target prediction for a current video block of the video based on geometric partition mode (GPM) or multiple hypothesis prediction (MHP) by blending an intra prediction for the current video block and a further prediction for the current video block; and generating the bitstream based on the target prediction.

Clause 61. A method for storing a bitstream of a video, comprising: determining a target prediction for a current video block of the video based on geometric partition mode (GPM) or multiple hypothesis prediction (MHP) by blending an intra prediction for the current video block and a further prediction for the current video block; generating the bitstream based on the target prediction; and storing the bitstream in a non-transitory computer-readable recording medium.

Clause 62. A non-transitory computer-readable recording medium storing a bitstream of a video which is generated by a method performed by a video processing apparatus, wherein the method comprises: determining a template containing a set of samples outside a boundary of a picture of the video; and generating the bitstream based on the determined template.

Clause 63. A method for storing a bitstream of a video, comprising: determining a template containing a set of samples outside a boundary of a picture of the video; generating the bitstream based on the determined template; and storing the bitstream in a non-transitory computer-readable recording medium.

Example Device

Figure 27:
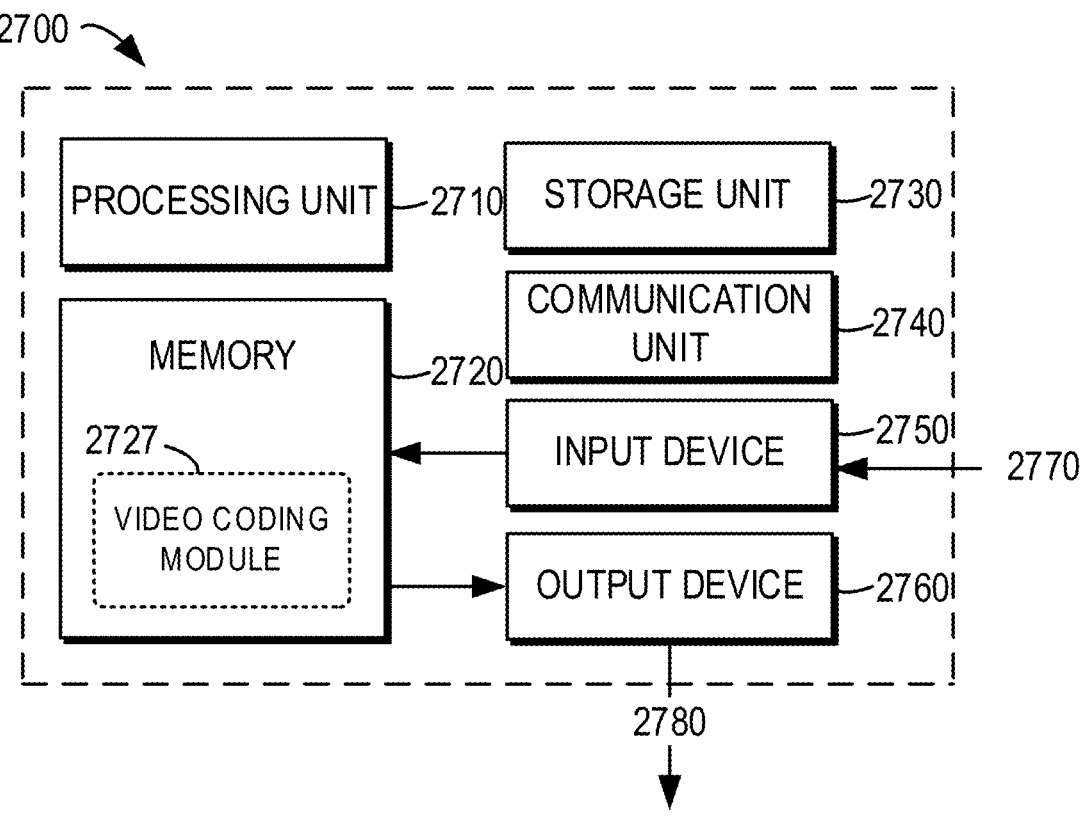
FIG. 27 illustrates a block diagram of a computing device in which various embodiments of the present disclosure can be implemented.

FIG. 27 illustrates a block diagram of a computing device 2700 in which various embodiments of the present disclosure can be implemented. The computing device 2700 may be implemented as or included in the source device 110 (or the video encoder 114 or 200) or the destination device 120 (or the video decoder 124 or 300).

It would be appreciated that the computing device 2700 shown in FIG. 27 is merely for purpose of illustration, without suggesting any limitation to the functions and scopes of the embodiments of the present disclosure in any manner.

As shown in FIG. 27, the computing device 2700 includes a general-purpose computing device 2700. The computing device 2700 may at least comprise one or more processors or processing units 2710, a memory 2720, a storage unit 2730, one or more communication units 2740, one or more input devices 2750, and one or more output devices 2760.

In some embodiments, the computing device 2700 may be implemented as any user terminal or server terminal having the computing capability. The server terminal may be a server, a large-scale computing device or the like that is provided by a service provider. The user terminal may for example be any type of mobile terminal, fixed terminal, or portable terminal, including a mobile phone, station, unit, device, multimedia computer, multimedia tablet, Internet node, communicator, desktop computer, laptop computer, notebook computer, netbook computer, tablet computer, personal communication system (PCS) device, personal navigation device, personal digital assistant (PDA), audio/video player, digital camera/video camera, positioning device, television receiver, radio broadcast receiver, E-book device, gaming device, or any combination thereof, including the accessories and peripherals of these devices, or any combination thereof. It would be contemplated that the computing device 2700 can support any type of interface to a user (such as "wearable" circuitry and the like).

The processing unit 2710 may be a physical or virtual processor and can implement various processes based on programs stored in the memory 2720. In a multi-processor system, multiple processing units execute computer executable instructions in parallel so as to improve the parallel processing capability of the computing device 2700. The processing unit 2710 may also be referred to as a central processing unit (CPU), a microprocessor, a controller or a microcontroller.

The computing device 2700 typically includes various computer storage medium. Such medium can be any medium accessible by the computing device 2700, including, but not limited to, volatile and non-volatile medium, or detachable and non-detachable medium. The memory 2720 can be a volatile memory (for example, a register, cache, Random Access Memory (RAM)), a non-volatile memory (such as a Read-Only Memory (ROM), Electrically Erasable Programmable Read-Only Memory (EEPROM), or a flash memory), or any combination thereof. The storage unit 2730 may be any detachable or non-detachable medium and may include a machine-readable medium such as a memory, flash memory drive, magnetic disk or another other media, which can be used for storing information and/or data and can be accessed in the computing device 2700.

The computing device 2700 may further include additional detachable/non-detachable, volatile/non-volatile memory medium. Although not shown in FIG. 27, it is possible to provide a magnetic disk drive for reading from and/or writing into a detachable and non-volatile magnetic disk and an optical disk drive for reading from and/or writing into a detachable non-volatile optical disk. In such cases, each drive may be connected to a bus (not shown) via one or more data medium interfaces.

The communication unit 2740 communicates with a further computing device via the communication medium. In addition, the functions of the components in the computing device 2700 can be implemented by a single computing cluster or multiple computing machines that can communicate via communication connections. Therefore, the computing device 2700 can operate in a networked environment using a logical connection with one or more other servers, networked personal computers (PCs) or further general network nodes.

The input device 2750 may be one or more of a variety of input devices, such as a mouse, keyboard, tracking ball, voice-input device, and the like. The output device 2760 may be one or more of a variety of output devices, such as a display, loudspeaker, printer, and the like. By means of the communication unit 2740, the computing device 2700 can further communicate with one or more external devices (not shown) such as the storage devices and display device, with one or more devices enabling the user to interact with the computing device 2700, or any devices (such as a network card, a modem and the like) enabling the computing device 2700 to communicate with one or more other computing devices, if required. Such communication can be performed via input/output (I/O) interfaces (not shown).

In some embodiments, instead of being integrated in a single device, some or all components of the computing device 2700 may also be arranged in cloud computing architecture. In the cloud computing architecture, the components may be provided remotely and work together to implement the functionalities described in the present disclosure. In some embodiments, cloud computing provides computing, software, data access and storage service, which will not require end users to be aware of the physical locations or configurations of the systems or hardware providing these services. In various embodiments, the cloud computing provides the services via a wide area network (such as Internet) using suitable protocols. For example, a cloud computing provider provides applications over the wide area network, which can be accessed through a web browser or any other computing components. The software or components of the cloud computing architecture and corresponding data may be stored on a server at a remote position. The computing resources in the cloud computing environment may be merged or distributed at locations in a remote data center. Cloud computing infrastructures may provide the services through a shared data center, though they behave as a single access point for the users. Therefore, the cloud computing architectures may be used to provide the components and functionalities described herein from a service provider at a remote location. Alternatively, they may be provided from a conventional server or installed directly or otherwise on a client device.

The computing device 2700 may be used to implement video encoding/decoding in embodiments of the present disclosure. The memory 2720 may include one or more video coding modules 2725 having one or more program instructions. These modules are accessible and executable by the processing unit 2710 to perform the functionalities of the various embodiments described herein.

In the example embodiments of performing video encoding, the input device 2750 may receive video data as an input 2770 to be encoded. The video data may be processed, for example, by the video coding module 2725, to generate an encoded bitstream. The encoded bitstream may be provided via the output device 2760 as an output 2780.

In the example embodiments of performing video decoding, the input device 2750 may receive an encoded bitstream as the input 2770. The encoded bitstream may be processed, for example, by the video coding module 2725, to generate decoded video data. The decoded video data may be provided via the output device 2760 as the output 2780.

While this disclosure has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting.

We claim:

1. A method for video processing, comprising:

determining, during a conversion between a current video block of a video and a bitstream of the video, mode information of a first part of the current video block, the first part being an intra part, and the mode information being indicated in the bitstream; and performing the conversion based on the mode information and a hybrid prediction tool, the hybrid prediction tool being used for determining a prediction of the current video block based on a plurality of candidate predictions of the current video block, wherein the hybrid prediction tool is geometric partition mode (GPM), and the mode information comprises an intra mode index associated with the current video block, or wherein the hybrid prediction tool is multiple hypothesis prediction (MHP), and the mode information comprises an intra mode index associated with the current video block, or wherein the hybrid prediction tool is combined inter and intra prediction (CIIP), and the mode information comprises an intra mode index associated with the current video block.

2. The method of claim 1, wherein at least one syntax element indicating whether a specific intra mode is used for the current video block is indicated in the bitstream.

3. The method of claim 2, wherein the at least one syntax element comprises a flag or a variable, and the specific intra mode comprises decoder-side intra mode derivation (DIMD) or template-based intra mode derivation (TIMD).

4. The method of claim 1, wherein the hybrid prediction tool is geometric partition mode (GPM), the mode information comprises an intra mode used or indicated for a partition of GPM mode, and the intra mode is dependent on one of:

a GPM partition mode, a GPM partition angle, a GPM partition distance, or dimensions of the current video block.

5. The method of claim 1, further comprising:

determining mode information of a second part of the current video block, the second part being an intra part or an inter part, and a mode information of the second part being absent from the bitstream.

6. The method of claim 5, wherein determining the mode information of the second part comprises:

determining a cost for each intra mode in a set of intra mode; and determining the mode information of the second part based on at least one intra mode with the lowest cost, or wherein determining the mode information of the second part comprises:

determining a cost for each inter mode in a set of inter mode; and determining the mode information of the second part based on at least one inter mode with the lowest cost.

7. The method of claim 5, wherein the mode information of the second part comprises a pre-defined intra mode for the hybrid prediction tool, or wherein the hybrid prediction tool comprises GPM, and a fixed intra mode is used for a partition of GPM mode, or wherein an intra mode used for a partition of GPM mode is dependent on at least one of:

a GPM partition mode, a GPM partition angle, a GPM partition distance, or dimensions of the current video block, or wherein an intra mode used for the hybrid coding tool is based on information of neighboring samples of the current video block.

8. The method of claim 1, wherein the conversion includes encoding the current video block into the bitstream, or wherein the conversion includes decoding the current video block from the bitstream.

9. The method of claim 1, further comprising:

storing the bitstream in a non-transitory computer-readable recording medium.

10. An apparatus for processing video data comprising a processor and a non-transitory memory with instructions thereon, wherein the instructions upon execution by the processor, cause the processor to perform acts comprising:

determining, during a conversion between a current video block of a video and a bitstream of the video, mode information of a first part of the current video block, the first part being an intra part, and the mode information being indicated in the bitstream; and performing the conversion based on the mode information and a hybrid prediction tool, the hybrid prediction tool being used for determining a prediction of the current video block based on a plurality of candidate predictions of the current video block, wherein the hybrid prediction tool is geometric partition mode (GPM), and the mode information comprises an intra mode index associated with the current video block, or wherein the hybrid prediction tool is multiple hypothesis prediction (MHP), and the mode information comprises an intra mode index associated with the current video block, or wherein the hybrid prediction tool is combined inter and intra prediction (CIIP), and the mode information comprises an intra mode index associated with the current video block.

11. A non-transitory computer-readable storage medium storing instructions that cause a processor to perform acts comprising:

determining, during a conversion between a current video block of a video and a bitstream of the video, mode information of a first part of the current video block, the first part being an intra part, and the mode information being indicated in the bitstream; and performing the conversion based on the mode information and a hybrid prediction tool, the hybrid prediction tool being used for determining a prediction of the current video block based on a plurality of candidate predictions of the current video block, wherein the hybrid prediction tool is geometric partition mode (GPM), and the mode information comprises an intra mode index associated with the current video block, or wherein the hybrid prediction tool is multiple hypothesis prediction (MHP), and the mode information comprises an intra mode index associated with the current video block, or wherein the hybrid prediction tool is combined inter and intra prediction (CIIP), and the mode information comprises an intra mode index associated with the current video block.

* * * * *